US012135054B2

(12) United States Patent
    Michiwaki

(10) Patent No.: US 12,135,054 B2
(45) Date of Patent: Nov. 5, 2024

(54) RELATIVE ROTATION PREVENTION STRUCTURE FOR SCREW, RELATIVE MOVEMENT PREVENTION STRUCTURE, AND RELATIVE MOVEMENT PREVENTION BODY

(71) Applicant: NejiLaw Inc., Tokyo (JP)

(72) Inventor: Hiroshi Michiwaki, Tokyo (JP)

(73) Assignee: NejiLaw Inc., Tokyo (JP)

( * ) Notice: Subject to any disclaimer, the term of this patent is extended or adjusted under 35 U.S.C. 154(b) by 973 days.

(21) Appl. No.: 16/497,605

(22) PCT Filed: Mar. 20, 2018

(86) PCT No.: PCT/JP2018/010925
§ 371 (c)(1),
(2) Date: Jan. 29, 2021

(87) PCT Pub. No.: WO2018/180737
PCT Pub. Date: Oct. 4, 2018

(65) Prior Publication Data
US 2021/0140465 A1    May 13, 2021

(30) Foreign Application Priority Data

Mar. 27, 2017  (JP) ................. 2017-060816
May 22, 2017  (JP) ................. 2017-100636
Jul. 4, 2017   (JP) ................. 2017-131553

(51) Int. Cl.
F16B 39/04    (2006.01)
F16B 39/12    (2006.01)

(52) U.S. Cl.
CPC ................... *F16B 39/12* (2013.01)

(58) Field of Classification Search
CPC ........ F16B 39/24; F16B 39/36; F16B 39/282;
         F16B 39/26; F16B 39/122; F16B 39/12;
         F16B 39/284
(Continued)

(56) References Cited

U.S. PATENT DOCUMENTS 254,154 A *  2/1882  Preston
328,139 A *  10/1885 Patten
(Continued)

FOREIGN PATENT DOCUMENTS

JP    38-002005 Y    3/1963
JP    56-141416 A    11/1981
(Continued)

OTHER PUBLICATIONS

US 514,316 A, 02/1894, Frenot (withdrawn)*
(Continued)

*Primary Examiner* — Gary W Estremsky
(74) *Attorney, Agent, or Firm* — TraskBritt

(57) ABSTRACT

A relative rotation prevention structure for preventing relative rotation of a screw having a threaded section with respect to a counterpart member, the relative rotation prevention structure being equipped with: a counterpart-side displacement section formed in advance on the counterpart member and capable of displacement in the axial direction or the radial direction; and a screw-side deformation-capable section that is formed on the screw and deforms when pressed into the counterpart-side deformation section by means of fastening force and, due to that deformation, produces a screw-side displacement section that is displaced in the axial direction or the radial direction.

14 Claims, 53 Drawing Sheets

(58) Field of Classification Search
USPC ........ 411/223, 226, 237–240, 332, 394, 225, 411/233
See application file for complete search history.

(56) References Cited

U.S. PATENT DOCUMENTS

| | | | | |
|---|---|---|---|---|
| 330,471 A * | 11/1885 | Desmond | | |
| 514,315 A * | 2/1894 | Frenot | | |
| 647,235 A * | 4/1900 | Sault | | |
| 818,584 A * | 4/1906 | Treatt | ............... | F16B 39/24 |
| 1,257,202 A * | 2/1918 | Emery | ............... | F16B 39/12 |
| | | | | 411/223 |
| 1,303,784 A * | 5/1919 | Emery | ............... | F16B 39/24 |
| | | | | 411/161 |
| 1,329,814 A * | 2/1920 | Suhr | ............... | F16B 39/12 |
| | | | | 411/223 |
| 1,372,525 A * | 3/1921 | McCabe | ............... | F16B 39/36 |
| | | | | 411/266 |
| 1,406,423 A * | 2/1922 | Smith | ............... | F16B 39/24 |
| | | | | 411/964 |
| 1,473,321 A * | 11/1923 | Rumfelt | ............... | F16B 39/36 |
| | | | | 411/223 |
| 1,488,069 A * | 3/1924 | Seago | ............... | F16B 39/32 |
| | | | | 411/964 |
| 1,551,389 A * | 8/1925 | Hanson | ............... | F16B 39/282 |
| | | | | 411/931 |
| 1,926,982 A * | 9/1933 | Kirachbraun | ......... | D21H 17/61 |
| | | | | 162/173 |
| 1,975,815 A * | 10/1934 | Wilson | ............... | F16B 39/282 |
| | | | | 411/277 |
| 1,999,082 A * | 4/1935 | Buechting | ............ | B21F 37/02 |
| | | | | 470/42 |
| 5,938,361 A | 8/1999 | Yasunaga | | |
| 6,113,329 A * | 9/2000 | Moroi | ............... | F16B 39/28 |
| | | | | 411/278 |
| 8,496,421 B1 * | 7/2013 | Burton | ............... | F16B 39/124 |
| | | | | 411/257 |
| 10,107,326 B2 * | 10/2018 | Wilson | ............... | F16B 39/24 |
| 10,125,808 B2 * | 11/2018 | Michiwaki | .......... | F16B 33/006 |
| 2003/0077143 A1 * | 4/2003 | Smolarek | ............ | F16B 39/24 |
| | | | | 411/161 |
| 2005/0286988 A1 * | 12/2005 | Harris | ............... | F16B 39/24 |
| | | | | 411/149 |
| 2007/0196195 A1 * | 8/2007 | Lin | ............... | F16B 39/24 |
| | | | | 411/161 |
| 2012/0063864 A1 * | 3/2012 | Hess | ............... | F16B 39/24 |
| | | | | 411/326 |
| 2012/0219377 A1 * | 8/2012 | Pamer | ............... | F16B 39/282 |
| | | | | 411/188 |

FOREIGN PATENT DOCUMENTS

| | | |
|---|---|---|
| JP | 07-028209 A | 5/1995 |
| JP | 08-300870 A | 11/1996 |
| JP | 11-006516 A | 1/1999 |
| JP | 2000-120635 A | 4/2000 |
| JP | 3790733 B2 | 6/2006 |
| JP | 2009-177078 A | 8/2009 |
| JP | 2013-087947 A | 5/2013 |
| JP | 5406168 B2 | 2/2014 |
| JP | 2014-214761 A | 11/2014 |
| JP | 2016-145607 A | 8/2016 |
| JP | 6096420 B2 | 3/2017 |
| WO | 2012/102401 A1 | 8/2012 |

OTHER PUBLICATIONS

International Search Report for International Application No. PCT/JP2018/010925, mailed May 22, 2018, 05 pages With English Translation.
International Written Opinion for International Application No. PCT/JP2018/010925, mailed May 22, 2018, 11 pages.
Japanese Notice of Reasons for Refusal for Japanese Application No. 2022-002659, dated Dec. 6, 2022, 10 pages with English translation.
Japanese Notice of Reasons for Refusal for Japanese Application No. 2017-131553, dated Apr. 26, 2021, 32 pages with English translation.
Japanese Notice of Reasons for Refusal for Japanese Application No. 2021-148117, dated Jul. 26, 2022, 17 pages with English translation.

* cited by examiner (A)

(B)    (C)    (D)

(A)

(B)

(A)

(B)

(A)

(B)

RELATIVE ROTATION PREVENTION STRUCTURE FOR SCREW, RELATIVE MOVEMENT PREVENTION STRUCTURE, AND RELATIVE MOVEMENT PREVENTION BODY

CROSS-REFERENCE TO RELATED APPLICATIONS

This application is a national phase entry under 35 U.S.C. § 371 of International Patent Application PCT/JP2018/010925, filed Mar. 20, 2018, designating the United States of America and published as International Patent Publication WO 2018/180737 A1 on Oct. 4, 2018, which claims the benefit under Article 8 of the Patent Cooperation Treaty to Japanese Patent Application Serial No. 2017-060816, filed Mar. 27, 2017, Japanese Patent Application Serial No. 2017-100636, filed May 22, 2017, and Japanese Patent Application Serial No. 2017-131553, filed Jul. 4, 2017.

TECHNICAL FIELD

The present disclosure relates to a structure for preventing relative rotation of a screw with respect to a counterpart member.

BACKGROUND

Conventionally, one of fastening structures includes a male screw such as a bolt, and a female screw such as a nut. In a fastening structure using this screw type, two types of spiral grooves having different lead angles and/or lead directions may be formed in one male screw (for example, a male threaded portion is formed by a right spiral groove and a male thread portion is formed by a left spiral groove). Two types of female threaded bodies such as double nuts (for example, a right female screw and a left female screw) may be, respectively, screw-engaged with these two types of spiral grooves. When specific interlocking means prevents relative rotation of the two types of female threaded bodies, axial interference action or axial betrayal action due to the different lead angles and/or lead directions may allow mechanical loosening prevention effect between the female and male threaded bodies (see Patent Document 1).

Further, when two female threaded bodies having the same lead angle and lead direction as double nuts are screw-engaged with one male screw, a concave portion may be formed in a circular form in one female screw, while a convex portion may be formed eccentrically in the other male screw. When the concave and convex portions are screw-engaged with each other, a wedge effect (stress in a shear direction with respect to the male screw) may be caused to obtain an anti-loosening effect (refer patent document 2).

PRIOR ART DOCUMENTS

Patent Literature (Patent Document 1) Japanese Patent No. 5406168
(Patent Document 2) Japanese Patent Application Publication No. 1999-6516

In the structure of Patent Document 1, a ratchet structure may be employed for preventing relative rotation of the two types of female threaded bodies. The ratchet structure may allow relative rotation in a fastening direction of the two types of female threaded bodies, but restrict relative rotation in a loosening direction thereof. However, when it is necessary to loosen the female threaded bodies after the fastening, it is necessary to break the ratchet structure.

Further, in the structure of Patent Document 2, the pair of female threaded bodies may act a shear force acting on a shaft portion of the male screw permanently such that the shaft portion may be fatigued locally, and thus shaft breakage may occur at the local position.

BRIEF SUMMARY

In view of the above problems, the present disclosure is to provide a screw rotation prevention structure, which may exhibit a reliable anti-loosening effect, and reduce fatigue of the shaft of the male screw and, in addition, disallow a mating state of the male and female fastening mechanisms without destroying the fastening member itself such that they are separated from each other.

Further, the present disclosure is to provide a structure for preventing relative movement in not only a screw but also relative movement between a first member and a second member.

The present disclosure to achieve the above purposes provides a relative-rotation prevention structure for preventing relative-rotation of a screw having a threaded portion with respect to a counterpart member, the structure comprising: a counterpart-side displacement section formed in advance in the counterpart member and displacing in an axial or radial direction; and a screw-side deformation-capable section formed on the screw, wherein the screw-side deformation-capable section presses the counterpart-side displacement section using a fastening force and thus is deformed, thereby to produce a screw-side displacement section displacing in an axial or radial direction.

The relative-rotation prevention structure is characterized in that the counterpart-side displacement section includes a plurality of counterpart-side displacement sections arranged in a circumferential direction.

The relative-rotation prevention structure is characterized in that the screw-side deformation-capable section produces a plurality of screw-side displacement sections arranged in the circumferential direction.

The relative-rotation prevention structure is characterized in that when the screw rotates relative to the counterpart member, the screw-side displacement section moves relative to the screw in the circumferential direction.

The relative-rotation prevention structure is characterized in that when the screw rotates relative to the counterpart member, the screw-side displacement section moves relative to the screw in the axial direction.

The relative-rotation prevention structure is characterized in that the screw-side displacement section is elastically deformed and/or plastically deformed.

The relative-rotation prevention structure is characterized in that the screw-side displacement section deforms simultaneously both inwardly and outwardly in the radial direction.

The relative-rotation prevention structure is characterized in that an interference distance between the screw-side deformation-capable section and the counterpart-side displacement section in the axial direction is set to be smaller than an axial distance of the screw-side deformation-capable section.

The relative-rotation prevention structure is characterized in that the structure has an axial stopper section to limit an axial approach distance between the screw-side displacement section and the counterpart-side displacement section.

The relative-rotation prevention structure is characterized in that the screw-side deformation-capable section has a strip-shaped protrusion, and partially deforms the strip-shaped protrusion to produce the screw-side displacement section.

The relative-rotation prevention structure is characterized in that a single or a plurality of screw-side displacement sections are produced in the screw-side deformation-capable section over an axial direction range of 1 pitch or greater of the screw.

The relative-rotation prevention structure is characterized in that a single or a plurality of screw-side displacement sections are produced in the screw-side deformation-capable section over an axial direction range of 3 pitches or greater of the screw.

The relative-rotation prevention structure is characterized in that the counterpart-side displacement section has a deformation-inducing face expanding in the radial direction and displacing to intersect the circumferential direction, wherein the screw-side deformation-capable section abuts the deformation-inducing face to produce the screw-side displacement section.

The relative-rotation prevention structure is characterized in that the deformation-inducing face faces a loosening circumferential direction of the screw.

The relative-rotation prevention structure is characterized in that the deformation-inducing face displaces in the axial direction at an angle different from a loosening lead angle of the screw.

The relative-rotation prevention structure is characterized in that a lead angle of the screw is defined as $\beta$, a direction in which the screw moves in the axial direction when the screw rotates in the loosening circumferential direction is defined as a loosening axial direction, and an angle between the loosening axial direction and the loosening circumferential direction is defined as a right angle, wherein a displacement angle A of the deformation-inducing face satisfies a following relationship: $\beta+135° \geq A \geq \beta+45°$.

The relative-rotation prevention structure is characterized in that the displacement angle A of the deformation-inducing face satisfies a following relationship: $135° \geq A \geq 90°$.

The relative-rotation prevention structure is characterized in that the deformation-inducing face displaces in the axial direction over a range of 1 pitch or greater of the screw.

The relative-rotation prevention structure is characterized in that the deformation-inducing face displaces in the axial direction over a range of 3 pitches or greater of the screw.

The relative-rotation prevention structure is characterized in that each of the counterpart-side displacement section and/or the screw-side displacement section is tapered such that a diameter thereof increases or decreases in the radial direction along the axial direction.

The relative-rotation prevention structure is characterized in that the screw-side deformation-capable section of the screw is flexible compared to the counterpart-side displacement section of the counterpart member.

The relative-rotation prevention structure is characterized in that the screw-side deformation-capable section of the screw has low rigidity compared to the counterpart-side displacement section of the counterpart member.

The relative-rotation prevention structure is characterized in that the counterpart-side displacement section is a first female screw, while the screw is a second female screw.

The relative-rotation prevention structure is characterized in that the first female screw has a first spiral groove having a proper lead angle and/or lead direction, wherein the second female screw has a second spiral groove having a lead angle and/or lead direction different from the lead angle and/or lead direction of the first spiral groove.

The relative-rotation prevention structure is characterized in that the structure includes a male screw screw-engaging with the first female screw and the second female screw to fasten a fastening target member, wherein the first female screw is closer to the fastening target member than the second female screw is.

The present disclosure to achieve the above purposes provides a relative-rotation prevention structure constructed between a screw having a threaded portion and a counterpart member abutting the screw, the relative-rotation prevention structure comprising: a screw-side displacement section formed in advance in the screw and displacing in an axial or radial direction; and a counterpart-side deformation-capable section formed on the counterpart member, wherein the counterpart-side deformation-capable section presses the screw-side displacement section using a fastening force and thus is deformed, thereby to produce a counterpart-side displacement section displacing in an axial or radial direction.

The present disclosure to achieve the above purposes provides a relative-movement prevention structure constructed between a first member and a second member abutting the first member, the relative-movement prevention structure comprising: a first thread as a row protrusion formed on the first member; a second thread as a row protrusion formed on the second member, wherein the second thread extends in a different direction than an extending direction of the first thread, and the second thread abuts the first thread; a first deformation-capable section formed on the first thread in an intersection region between the first thread and the second thread, wherein the first deformation-capable section performs elastic and/or plastic deformation using a pressing force acting between the first thread and the second thread, wherein the deformation produces a first displacement section, wherein the first displacement section restricts relative movement between the first and second members.

The relative-movement prevention structure is characterized in that a plurality of the first threads being arranged in parallel are formed on the first member, wherein a plurality of the second threads being arranged in parallel are formed on the second member, wherein when the plurality of the first threads and the plurality of the second threads intersect with each other, a plurality of the first displacement sections are produced.

The relative-movement prevention structure is characterized in that a plurality of the first threads being arranged in parallel and a plurality of the second threads being arranged in parallel intersect with each other in a grid form.

The relative-movement prevention structure is characterized in that when the first member and the second member move relative to each other, the first displacement section moves relative to the first member.

The relative-movement prevention structure is characterized in that a direction in which the second thread extends is different from a relative movement direction between the first member and the second member.

The relative-movement prevention structure is characterized in that the first displacement section is configured to be depressed at a portion thereof intersecting with the second thread, thereby producing a first produced face to be engaged with the second thread, wherein when a side of the second thread extends in a plurality of different directions, a plurality of the first produced faces abutting the side of the second thread are produced in different directions.

The relative-movement prevention structure is characterized in that a depression depth of the first displacement section produced on the first thread is set to be smaller than a protrusion height of the first thread.

The relative-movement prevention structure is characterized in that the structure has a stopper section to limit an interference distance between the first thread and the second thread.

The relative-movement prevention structure is characterized in that the stopper section includes: a first stopper; and a second stopper placed in a different position than a position of the first stopper.

The relative-movement prevention structure is characterized in that an angle defined between a virtual straight line connecting the first stopper and the second stopper and a longitudinal direction of the first thread is greater than or equal to 20° and is smaller than or equal to 70°.

The relative-movement prevention structure is characterized in that the structure has a plurality of base materials, each base material having a base thread as a row protrusion formed on a surface thereof, wherein one of the base materials is the first member, wherein the other of the base materials is the second member.

The relative-movement prevention structure is characterized in that a distal end of the first thread is curved or flat or uneven.

The relative-movement prevention structure is characterized in that the structure has a second deformation-capable section formed on the second thread in an intersection region between the first thread and the second thread, wherein the second deformation-capable section elastically and/or plastically deforms using a pressing force acting between the first thread and the second thread, such that the deformation produces a second displacement section.

The present disclosure to achieve the above purposes provides a relative movement prevention assembly comprising: a first restricting target; a second restricting target; and an interposed member constructed to span both the first restricting target and the second restricting target, wherein a first relative-movement prevention structure is formed between the first restricting target and the interposed member, wherein the first relative-movement prevention structure includes the above defined relative-movement prevention structure, wherein a second relative-movement prevention structure is formed between the second restricting target and the interposed member, wherein the second relative-movement prevention structure includes the above defined relative-movement prevention structure.

The relative movement prevention assembly is characterized in that the assembly includes an urging mechanism to apply a pressing force to between the first restricting target and the interposed member, and to between the second restricting target and the interposed member.

In accordance with the present disclosure, the screw rotation prevention structure may exhibit a reliable anti-loosening effect, and reduce fatigue of the shaft of the male screw.

Further, in accordance with the present disclosure, the structure may prevent relative movement not only in a screw but also relative movement between a first member and a second member.

DETAILED DESCRIPTION

Hereinafter, embodiments of the present disclosure will be described with reference to the accompanying drawings.

Figure 1:
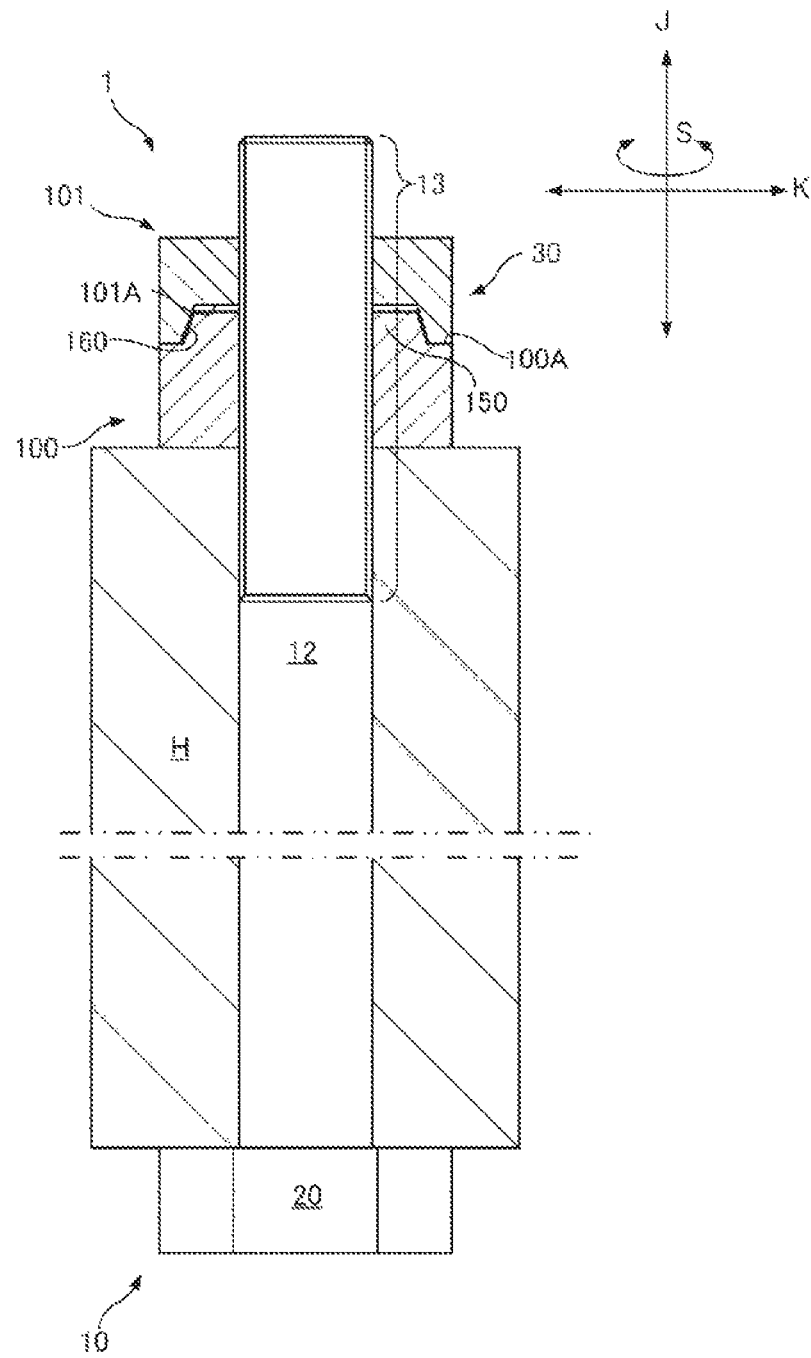
FIG. 1 is a front partial cross-sectional view showing a screw-based fastening mechanism to which a relative-rotation prevention structure for a screw according to a first embodiment of the present disclosure is applied.
Figure 2:
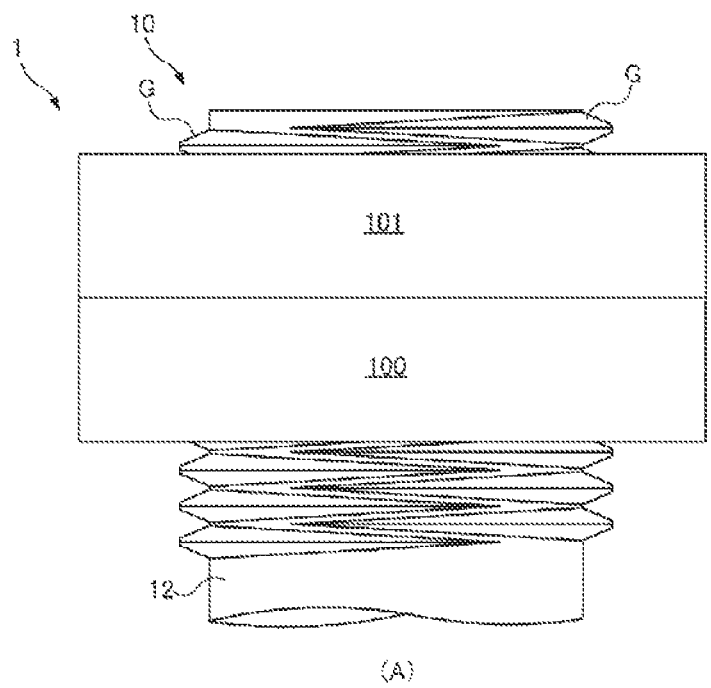
FIG. 2 is a front view (A) and a plan view (B) showing an enlarged fastening state of a male screw and a female screw in the screw-based fastening mechanism.
Figure 2:
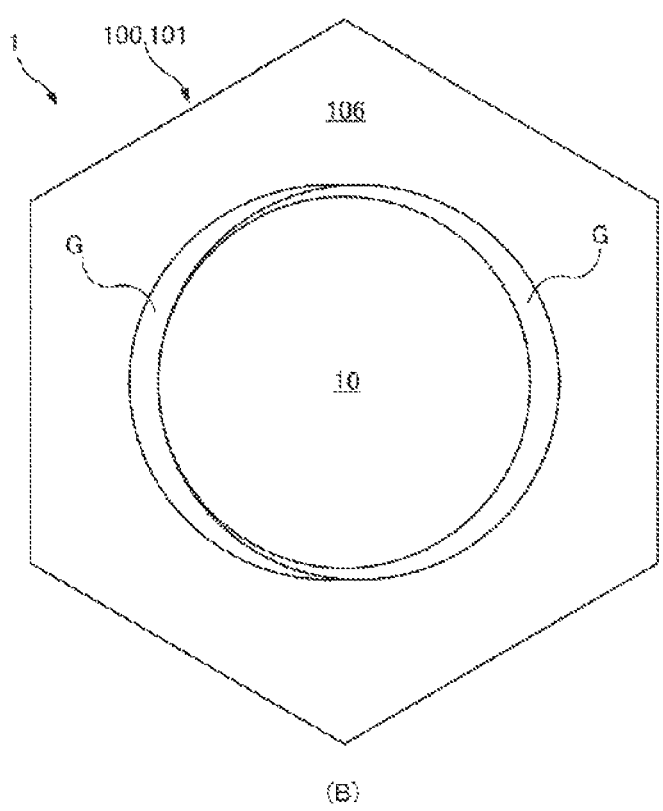
Figure 3:
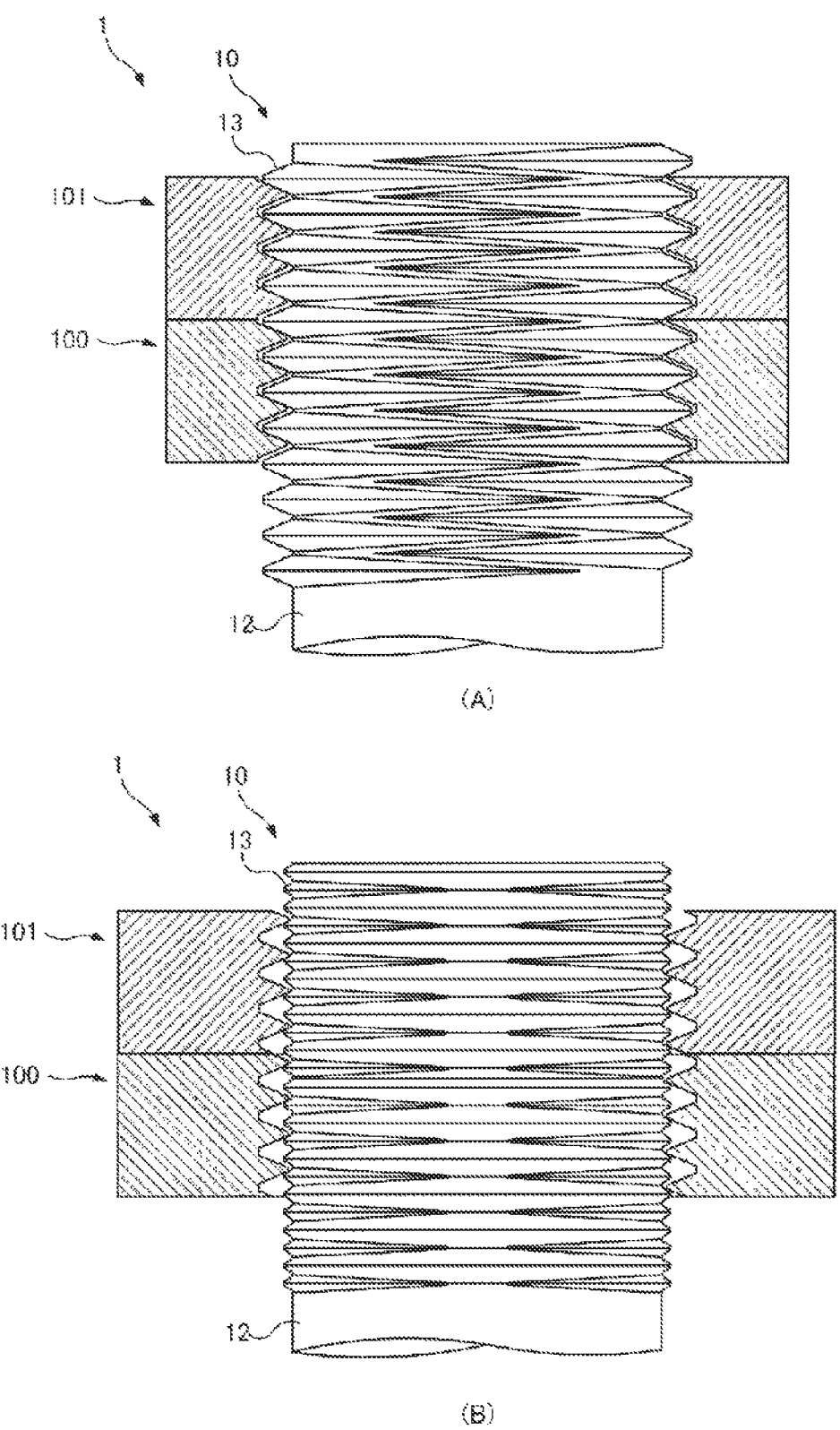
FIG. 3 is a front cross-sectional view (A) and a side cross-sectional view (B) showing an enlarged fastening state of the male screw and female screw.

FIG. 1 shows a screw-based fastening mechanism 1 to which a relative-rotation prevention structure 30 according to a first embodiment of the present disclosure is applied. The screw-based fastening mechanism 1 includes a first female screw 100, a second female screw 101, and a male screw 10. The screw-based fastening mechanism 1 may fasten a fastening target member H. In the present embodiment, the first female screw 100 and the second female screw 101 adjacent thereto outwardly in an axial direction constitute a so-called double nut structure such that they prevent from loosening from each other. The relative-rotation prevention structure 30 is provided between the first female screw 100 and the second female screw 101.

A basic structure of the screw-based fastening mechanism 1 will be described. As shown in (A) of FIG. 5, in a male threaded portion 13 of the male screw 10, two types of male threaded spiral grooves including a first spiral groove 14 formed as a right direction screw configured to be screw-engaged with a female threaded spiral thread formed as a corresponding right direction screw, and a second spiral groove 15 formed as a left direction screw configured to be screw-engaged with a female threaded spiral thread formed as a corresponding left direction screw are formed in an overlapping manner on the same region in an axial direction of the male screw 10. Further, in addition to the overlapping region, a single direction spiral groove region in one directional spiral groove may be provided.

The first spiral groove 14 may be screw-engaged with a female threaded spiral thread formed as a right direction screw of the first female screw 100 corresponding thereto. The second spiral groove 15 may be screw-engaged with a female threaded spiral thread formed as a left direction screw of the second female screw 101 corresponding thereto.

Figure 5:
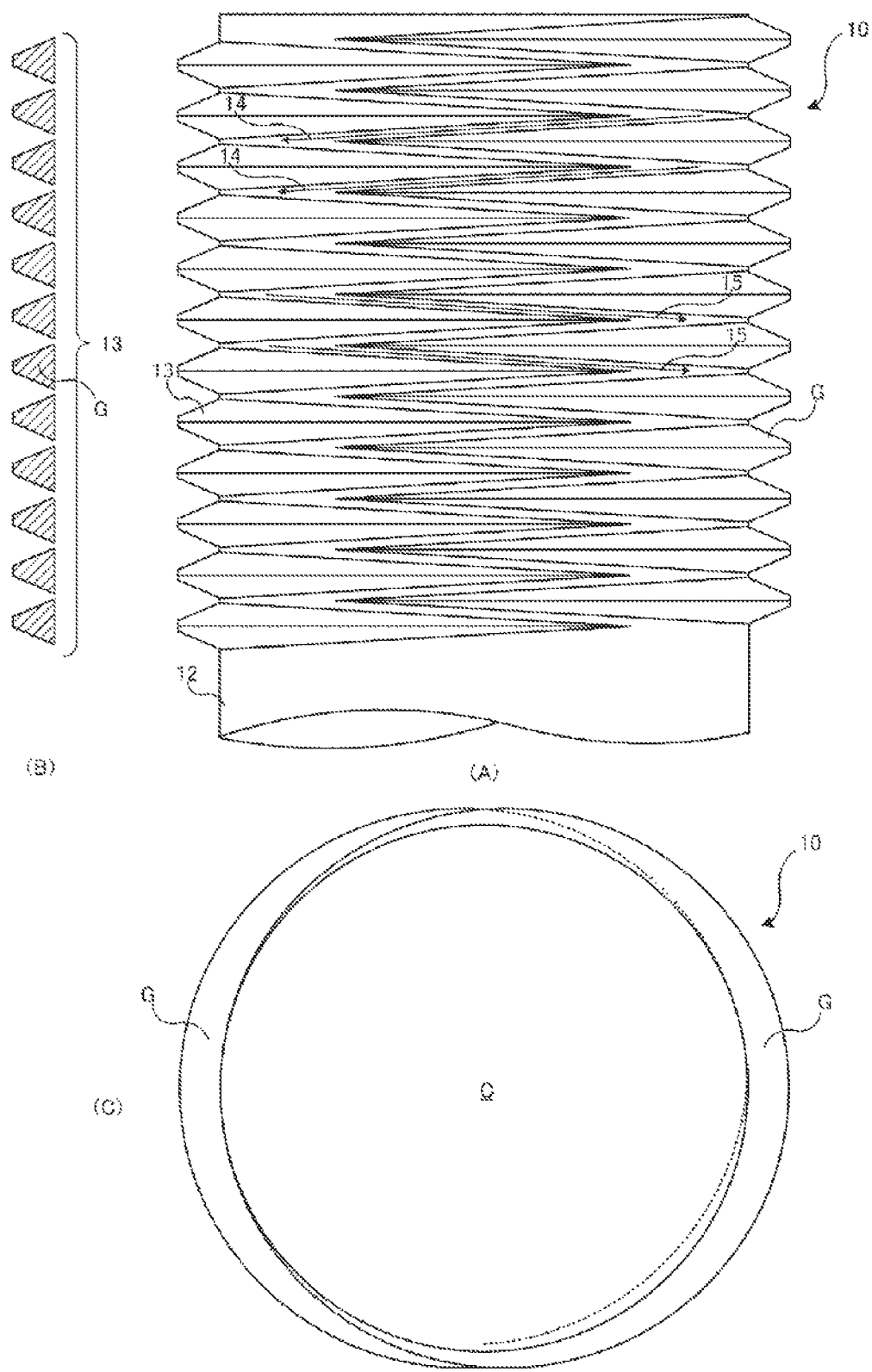
FIG. 5 is a front view (A) of the male screw, a cross-sectional view (B) of a thread only, and a plan view (C) thereof.
Figure 6:
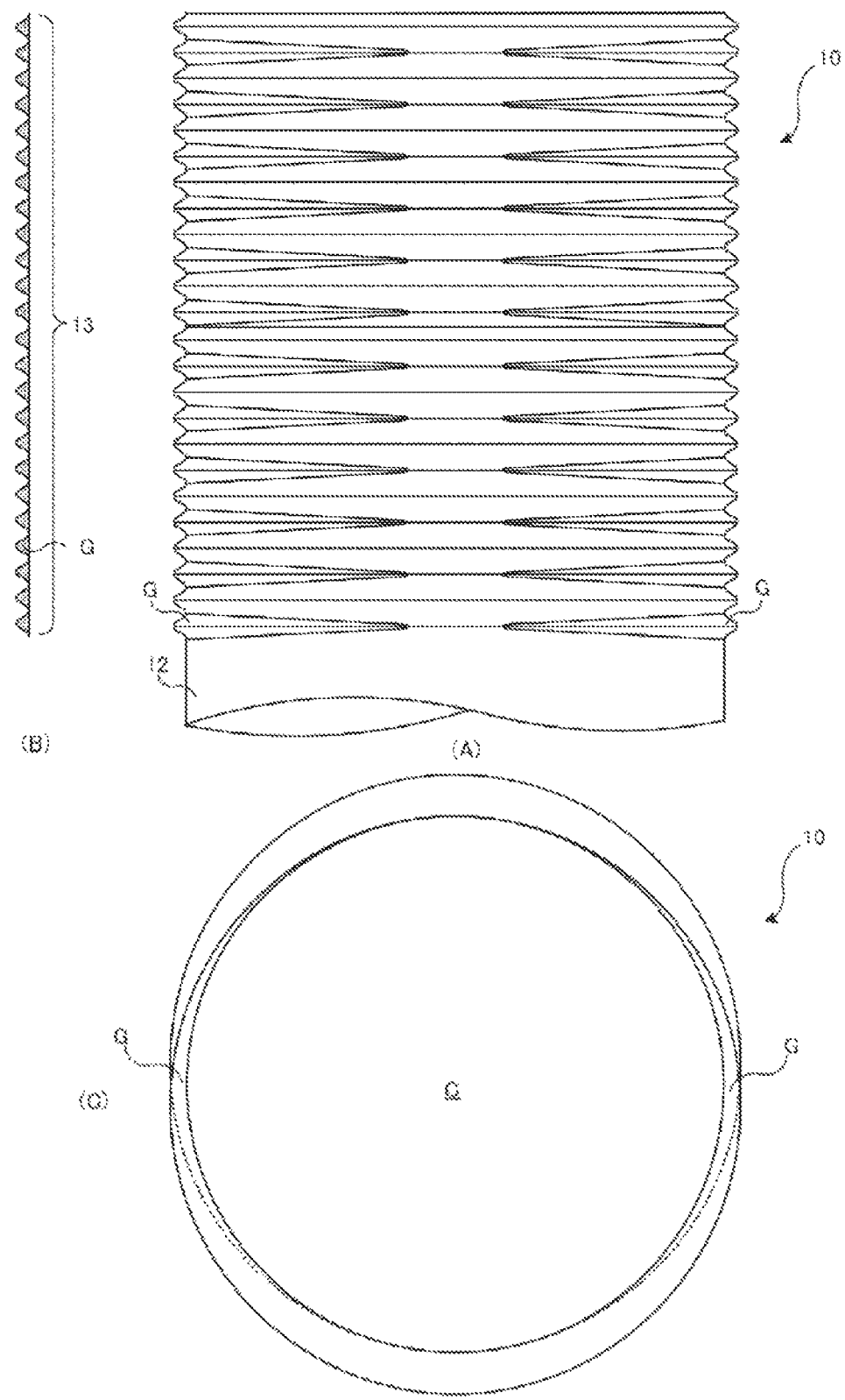
FIG. 6 is a side view (A) of the male screw, a cross-sectional view (B) of a thread only, and a plan view (C) thereof.

In the male threaded portion 13, as shown in (C) of FIG. 5 and (C) of FIG. 6, substantially crescent-shaped threads G extending in a circumferential direction in a direction of a plane perpendicular to an axis (screw axis) (C) may be alternately formed on one side (left side of a figure) and the other side (right side of a figure) in a radial direction of the male threaded portion 13. That is, a peak of the thread G extends perpendicularly to the axis. A height of the thread G may vary such that a center in a circumferential direction becomes high and both ends in the circumferential direction become low gradually. Configuring the thread G in this way may allow two types of spiral grooves including a virtual spiral groove structure turning in a right turn (see arrow 14 in (A) of FIG. 5) and a virtual spiral groove structure turning in a left turn (see arrow 15 in (A) of FIG. 5) may be formed between the threads G.

In this embodiment, the two types of male threaded spiral grooves including the first spiral groove 14 and the second spiral groove 15 are formed in a superposed manner in the male threaded portion 13. Accordingly, the male threaded portion 13 may be screw-engaged with both of the two female threaded bodies as the right direction screw and the left direction screw, respectively. Further, details of the male threaded portion 13 in which the two types of male threaded spiral grooves are formed may refer to Japanese Patent No. 4663813 by the inventor of the present application.

Figure 4:
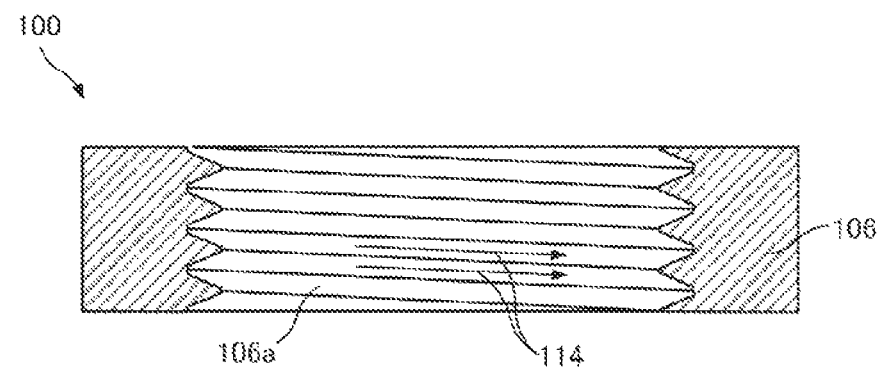
FIG. 4 is a front cross-sectional view (A) of a first female screw, and a front cross-sectional view (B) of a second female screw having an opposite spiral direction to a spiral direction of the first female screw.
Figure 4:
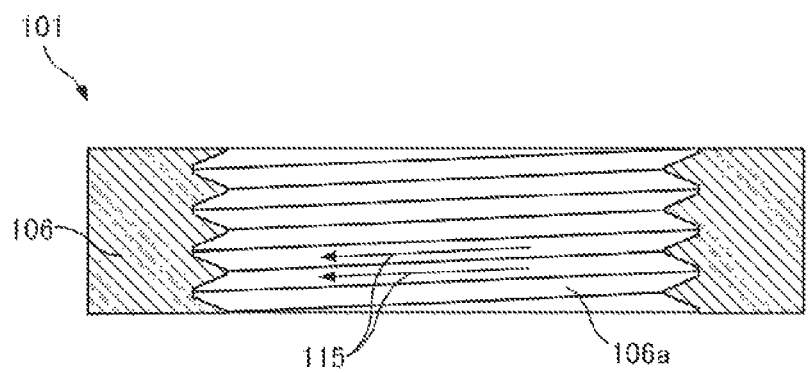

As shown in (A) of FIG. 4, in a through-hole 106a of the first female screw 100 (illustration of the relative-rotation prevention structure is omitted in this drawing for convenience of description), a first female threaded spiral thread 114 is formed as a right direction screw. That is, the first female threaded spiral thread 114 of a tubular member 106 of the first female screw 100 is screw-engaged with the first spiral groove 14 in the male threaded portion 13 of the male screw 10. As shown in (B) of FIG. 4, in the through-hole 106a of the second female screw 101 (illustration of the relative-rotation prevention structure is omitted in this drawing for convenience of description), a second female threaded spiral thread 115 is formed as a left direction screw. That is, the second female threaded spiral thread 115 is screw-engaged with the second spiral groove 15 in the male threaded portion 13 of the male screw 10.

As such, when the two types of female screw 100 and 101 having different lead angles and/or lead directions, such as the double nuts are screw-engaged with the male screw 10 to fasten the target fastening member, the fastening may be maintained unless the female screw 100 and 101 rotate with respect to each other. A principle thereof will be described.

Figure 7:
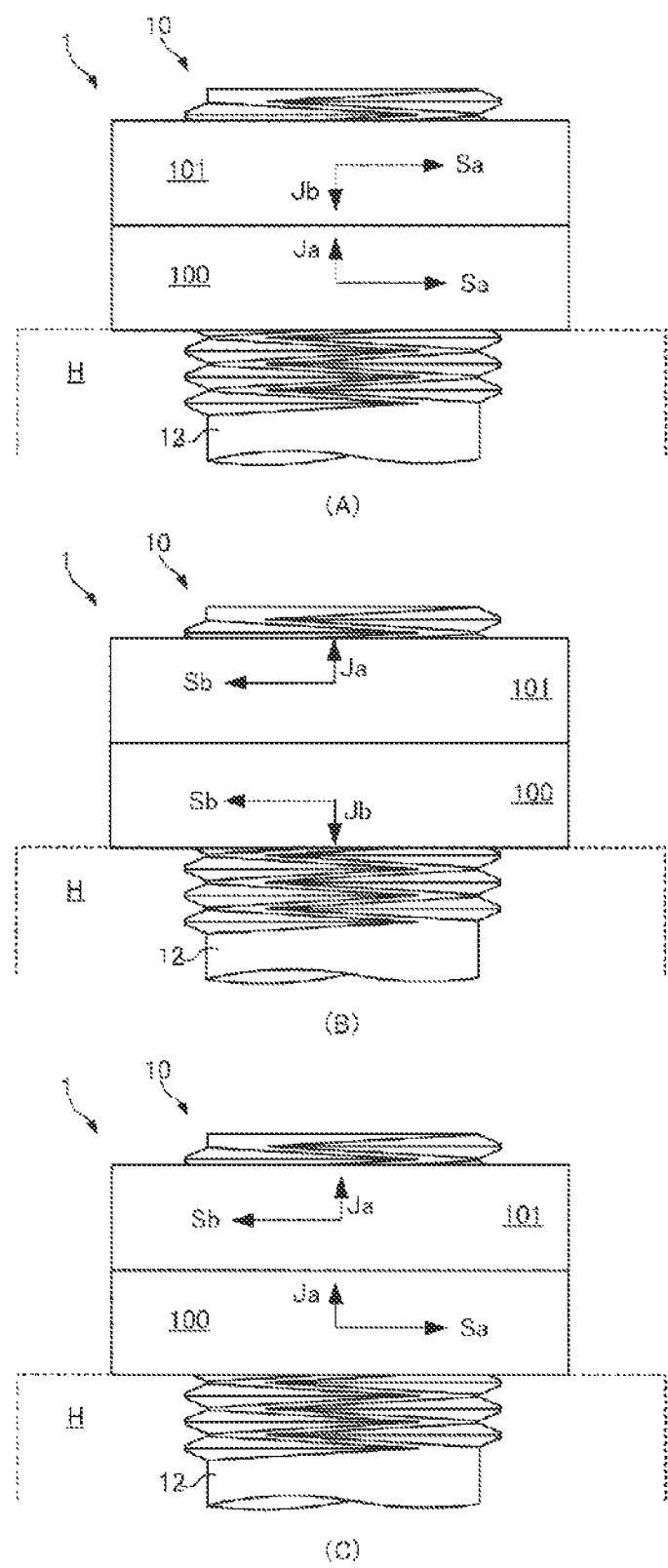
FIG. 7 is front views (A to C) showing relative rotation of the first female screw and the second female screw in the screw-based fastening mechanism.

As shown in (A) of FIG. 7, when trying to rotate the first female screw 100 as the right direction screw in a release direction (left rotation direction) Sa, the first female screw 100 attempts move in an axial direction Ja to be away from the fastening target member H. The second female screw 101 as a left direction screw idle-rotating in the Sa direction together with the first female screw 100 attempts to move in an axial direction Jb to be close to the fastening target member H. Therefore, because the first female screw 100 and the second female screw 101 interfere with each other in the axial direction, they are not removed.

On the other hand, as shown in (B) of FIG. 7, when trying to rotate the second female screw 101 as the left direction screw in a release direction (right direction) Sb, the second female screw 101 attempts to move in the axial direction Ja to be away from the fastening target member H. The first female screw 100 as the right direction screw idle-rotating together with the second female screw 101 in the Sb direction tries to move in the axial direction Jb to be close to the fastening target member H. Thus, the first female screw 100 interferes with the fastening target member H (already fastened) and may not rotate. Thus, the second female screw 101 is not removed.

Eventually, as shown in (C) of FIG. 7, rotating the second female screw 101 as the left direction screw alone in the release direction (right direction) Sb without rotating the first female screw 100 may not allow this double nut structure to be loosened. Otherwise, only when the second female screw 101 rotates in the release direction (right direction) Sb and at the same time, the first female screw 100 as the right direction screw rotates in the opposite loosening direction (left rotational direction) Sa, this double nut structure may not be loosened. That is, in order to loosen the first female screw 100 and the second female screw 101, the relative rotation therebetween is required.

Next, the relative-rotation prevention structure 30 will be described.

Returning to FIG. 1, the relative-rotation prevention structure 30 includes an annular protrusion 150 formed on an outer transverse face 100A of the first female screw 100, and an annular concave portion 160 formed in an inner transverse face 101A of the second female screw 101 and receiving the annular protrusion 150.

An outer circumferential face of the annular protrusion 150 of the first female screw 100 acts as a tapered face that is enlarged or reduced in a radial direction K along an axial direction J. In this example, the outer circumferential face acts as a tapered face, which is reduced outwardly in the axial direction J (toward the second female screw 101).

Figure 8:
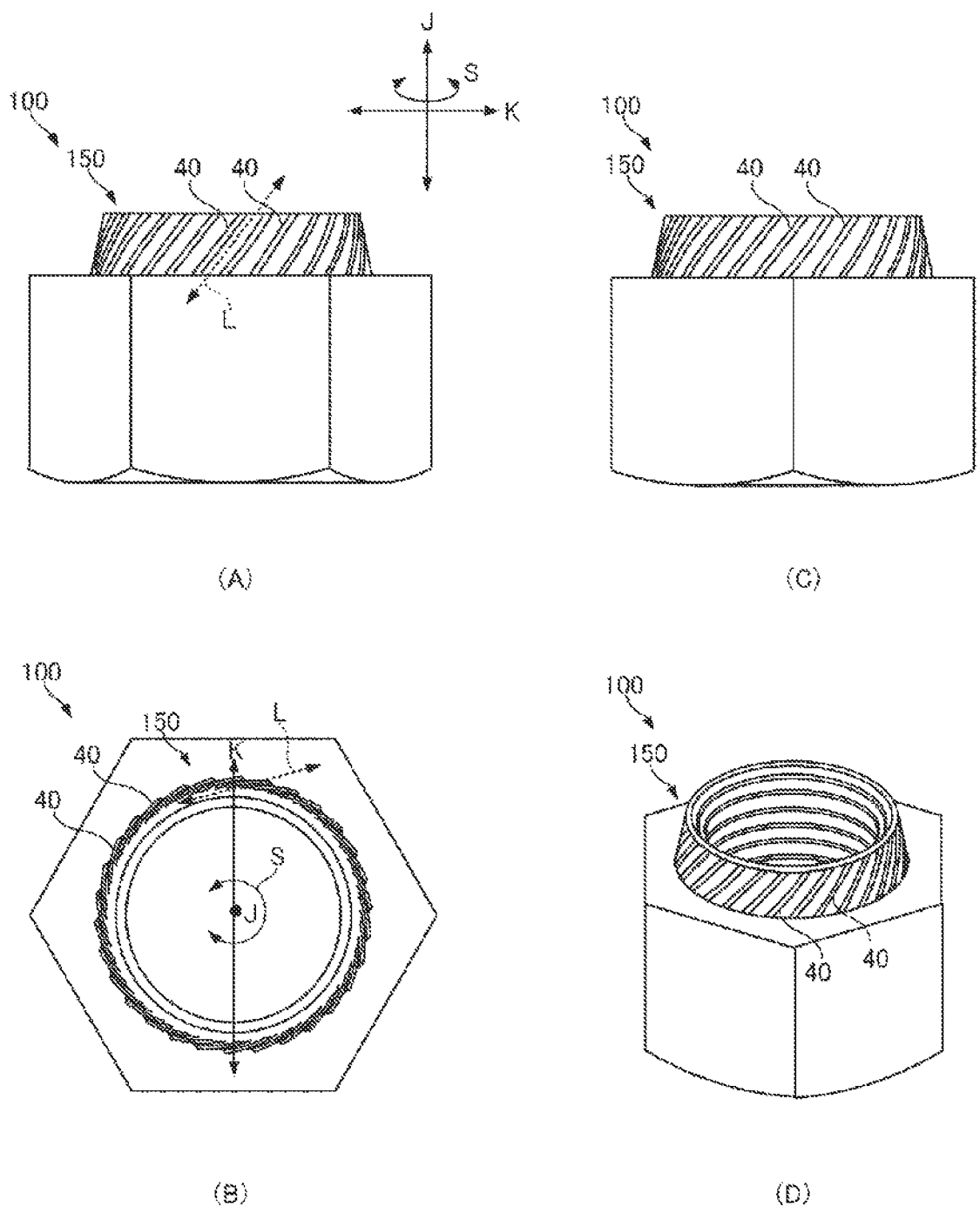
FIG. 8 is a front view (A), a plan view (B), a side view (C), and a perspective view (D) of the first female screw.

As shown in FIG. 8, a first (counterpart-side) displacement section 40 is formed on the outer circumferential face of the annular protrusion 150 of the first female screw 100. The first (counterpart-side) displacement section 40 displaces in the axial direction J or radial direction K as it moves in the circumferential direction S.

The first displacement section 40 is embodied as a strip-shaped protrusion (or groove). As shown in (A) of FIG. 8, the first displacement section 40 is displaced in the axial direction J as a longitudinal direction L of the strip moves in the circumferential direction S. At the same time, as shown in (B) of FIG. 8, the first displacement section 40 is displaced in the radial direction K as the longitudinal direction L of the strip moves in the circumferential direction S. In other words, the first displacement section 40 is embodied as a protrusion displaced in both the axial direction J and the radial direction K.

A plurality of first displacement sections 40 are arranged and evenly spaced from each other in the circumferential direction. In this example, thirty first displacement sections 40 are arranged and evenly spaced from each other in the circumferential direction at a relative phase difference of 12°.

Figure 9:
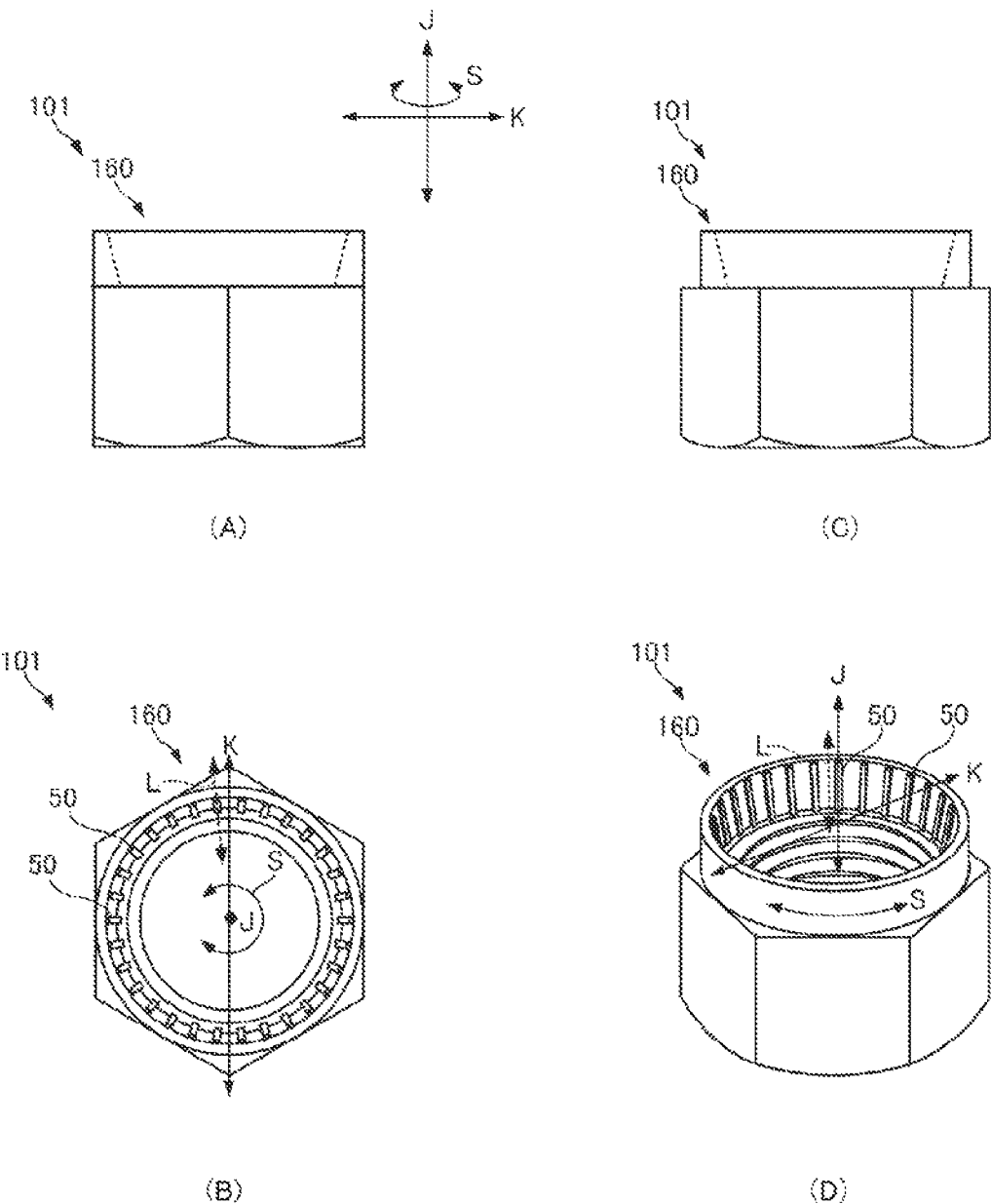
FIG. 9 is a front view (A), a plan view (B), a side view (C), and a perspective view (D) of the second female screw.

As shown in FIG. 9, an inner circumferential face of the annular concave portion 160 of the second female screw 101 is a tapered surface that is enlarged or reduced in the radial direction K along the axial direction J. In this example, the inner circumferential face is a tapered surface that is enlarged inwardly in the axial direction J (toward the first female screw 100) and is parallel to the outer circumferential face of the annular convex portion or protrusion 150.

In the inner circumferential face thereof, a second (screw-side) deformation-capable section 50 is formed. This second deformation-capable section 50 is embodied as a strip-shaped protrusion (or groove). As shown in (D) of FIG. 9, a longitudinal direction L of the strip of the protrusion is approximately coincident with the axial direction J. At the same time, the longitudinal direction L of the strip of protrusion of the second deformation-capable section 50 displaces in the radial direction K as shown in (B) of FIG. 9. That is, the second deformation-capable section 50 is embodied as the protrusion displacing in both the axial direction J and the radial direction K.

The plurality of second deformation-capable sections 50 are arranged and spaced from each other at an equal spacing in the circumferential direction. In this example, 30 second deformation-capable sections 50 are arranged and spaced from each other at an equal spacing of a relative phase difference of 12° in the circumferential direction.

Figure 10:
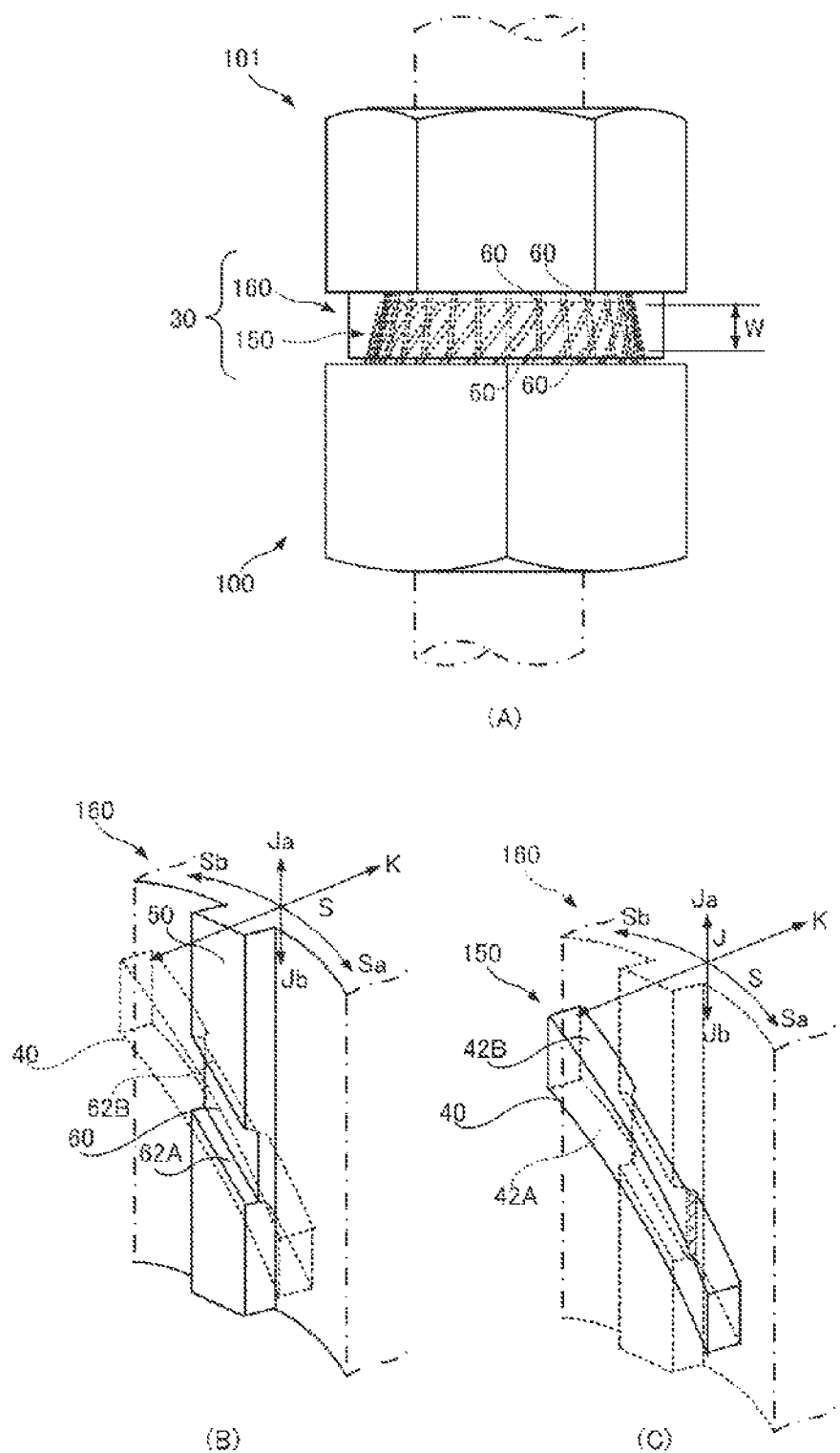
FIG. 10 is a front view (A) showing a relative-rotation prevention structure in a fastening state of the first female screw and the second female screw, a partial enlarged perspective view (B) showing the second female screw, and a partial enlarged perspective view (C) showing the first male screw.

As shown in (B) of FIG. 10, the second deformation-capable section 50 is pressed against the first displacement section 40 of the first female screw 100 using a fastening force. As a result, a part thereof deforms to be depressed outwardly in the radial direction. This deformation allows a second (screw-side) displacement section 60 to be produced. Further, in FIG. 9, a state before the fastening is shown, and, thus, the second displacement section 60 has not been produced.

The second deformation-capable section 50 of the second female screw 101 is made of a flexible material, compared to the first displacement section 40 of the first female screw 100. In this way, the first displacement section 40 that interferes with the second deformation-capable section 50 may actively deform the second deformation-capable section 50. Further, the second deformation-capable section 50 has low rigidity compared to the first displacement section 40. In this way, a side of the second deformation-capable section 50 in contact with the first displacement section 40 may actively elastically and/or plastically deform. Further, in the present embodiment, the first female screw 100 is made of a high strength material as compared with the second female screw 101. In this connection, the first female screw 100 may employ a material having increased strength by adding an additive to iron or by performing a heat treatment. Further, in this embodiment, a thickness of the annular protrusion 150 of the first female screw 100 in the radial direction is larger than a thickness of the annular concave portion 160 of the second female screw 101 in the radial direction. As a result, rigidity of the annular protrusion 150 is higher than that of the annular concave portion 160.

Opposite produced faces 62A and 62B to determine the depressed shape of the second displacement section 60 may have (displace) a predetermined width in the radial direction K. However, the produced faces 62A and 62B displaces in the axial direction J as it moves in the circumferential direction S. That is, the second displacement section 60 becomes a space displacing in both the radial direction K and the axial direction J. Further, this example in which the second displacement section 60 deforms into a concave shape is illustrated. However, the second displacement section 60 deforms into a convex shape.

In addition, (B) of FIG. 10 schematically shows that the second deformation-capable section 50 that becomes a strip-like protrusion intersects with a single first displacement section 40 to form the depression (second displacement section 60). However, actually, the second deformation-capable section 50 may intersect with a plurality of first displacement sections 40. Accordingly, a plurality of second displacement sections 60 may be formed in each second deformation-capable section 50.

As shown in (A) of FIG. 10, on a surface of the second deformation-capable section 50, a plurality of second displacement section 60 expand into an axial range (region) W of one pitch or greater of the screw and thus are produced. The second displacement section 60 exhibiting the prevention effect of the relative rotation is formed in a range having an enlargement of 1 pitch or greater in the axial direction. Thus, when the second female screw 101 rotates once in the release direction, the relative rotation prevention effect may be always achieved in all phases. Further, specifically, it is preferable that the second displacement section 60 expands in the axial range of 3 pitches or greater and is produced. This axial range W may be defined as an axial interference distance W of the second deformation-capable section 50 and the first displacement section 40.

Further, when viewing the annular concave portion 160 axially, a plurality of (in this example, at least 30) second displacement sections 60 are produced in the circumferential direction. In particular, when the second displacement sections 60 are arranged at an even spacing (or every predetermined period), radial reaction forces in the deformation of the plurality of second displacement sections 60 cancel each other out. Thus, a relative eccentric force may be prevented from working between the first female screw 100 and the second female screw 101. As a result, the first female screw 100 and the second female screw 101 may be prevented from so-called biased contact with the male screw 10. Further, even when the arrangement spacings in the circumferential direction between the plurality of second displacement sections 60 are random, but when the number thereof is large, the reaction forces in the radial direction cancel each other out.

As shown in (C) of FIG. 10, the strip-shaped protrusion of the first displacement section 40 as a counterpart to the second displacement section 60, has a pair of first deformation-inducing faces 42A and 42B. Each of these first deformation-inducing faces 42A and 42B has an extension (width) in the radial direction and displaces to intersect the circumferential direction S (i.e., displace in the axial direction J).

The second deformation-capable section 50 abuts the first deformation-inducing faces 42A and 42B to produce the produced faces 62A and 62B of the second displacement section 60. That is, one first deformation-inducing face 42A and one produced face (62A) abut each other, while the other first deformation-inducing face 42B and the other produced face 62B abut each other.

One first deformation-inducing face 42A faces a loosening (right-rotational) circumferential direction Sa in the second female screw 101 as the left direction screw. Further, the other first deformation-inducing face 42B faces a fastening (left-rotational) circumferential direction Sb in the second female screw 101.

The first deformation-inducing faces 42A and 42B are directed in the axial direction J, and displace by at least one pitch of the second female screw 101. Specifically, the first deformation-inducing faces 42A and 42B displace in a range of 3 pitches or greater. In this manner, the second displacement section 60 produced by the first deformation-inducing faces 42A and 42B may be formed or moved in an extending range of 1 pitch or greater (preferably, 3 pitches or greater) in the axial direction.

Next, referring to FIG. 11, an angle of one first deformation-inducing face 42A will be described. Further, in FIG. 11, the first deformation-inducing face 42A is viewed outwardly in the radial direction.

A lead angle of the second female screw 101 is defined as β. A fastening circumferential direction of the second female screw 101 is defined as Sb. Further, when the second female screw 101 rotates in the loosening circumferential direction Sa, a direction in which the second female screw 101 moves in the axial direction J is defined as a loosening axial direction Ja. Further, regarding an "angle" as described below, an angle in the loosening axial direction Ja when the loosening circumferential direction Sa is defined as a reference angle (0°) is defined as a right angel.

An angle of the first deformation-inducing face 42A (defined as a displacement angle A) is different from a loosening lead angle β in the second female screw 101. Specifically, in this embodiment, the displacement angle A is set to about 120 degrees.

Figure 11:
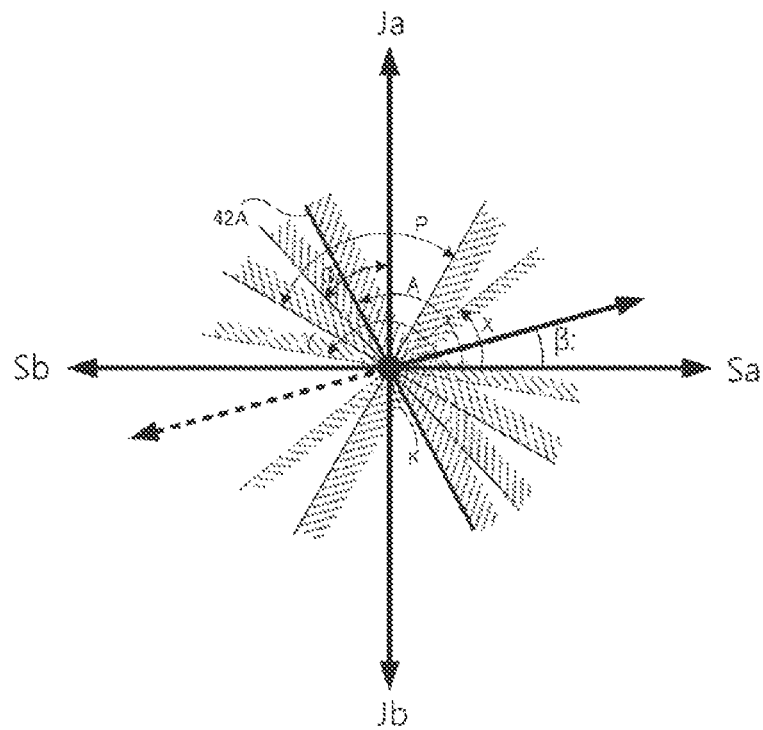
FIG. 11 is an explanatory diagram for explaining an angular range of a displacement angle of a first displacement section in the relative-rotation prevention structure.

In this embodiment, a preferred range of the displacement angle A of one first deformation-inducing face 42A satisfies a following condition (see an angle range P in FIG. 11).

$$\beta+135°\geq A\geq\beta+45°$$

In this manner, even when the second female screw 101 tries to rotate in the loosening direction (that is, in the direction of the loosening lead angle (β)), the relative rotation may be prevented more reliably because the first deformation-inducing face 42A is engaged with the produced face 62A in a direction in which movement in both the circumferential direction and the lead direction is suppressed.

Further, in order to enhance the relative rotation prevention effect, preferably, the displacement angle A of one first deformation-inducing face 42A is in a following range (see an angle range Q of FIG. 11).

$$135°\geq A\geq 90°$$

Further, when this displacement angle A exceeds 180°, the first deformation-inducing face 42A is directed in the same direction as the fastening circumferential direction Sb, and, thus, it may be difficult to exert the effect of preventing rotation of the second female screw 101 in the loosening direction. Further, as in an angle X or angle Y in FIG. 11, the first deformation-inducing face 42A may not reach the lead angle β or fastening circumferential direction Sb (close to parallel thereto), and the rotation prevention effect of the second female screw of 101 may not be achieved.

Figure 12:
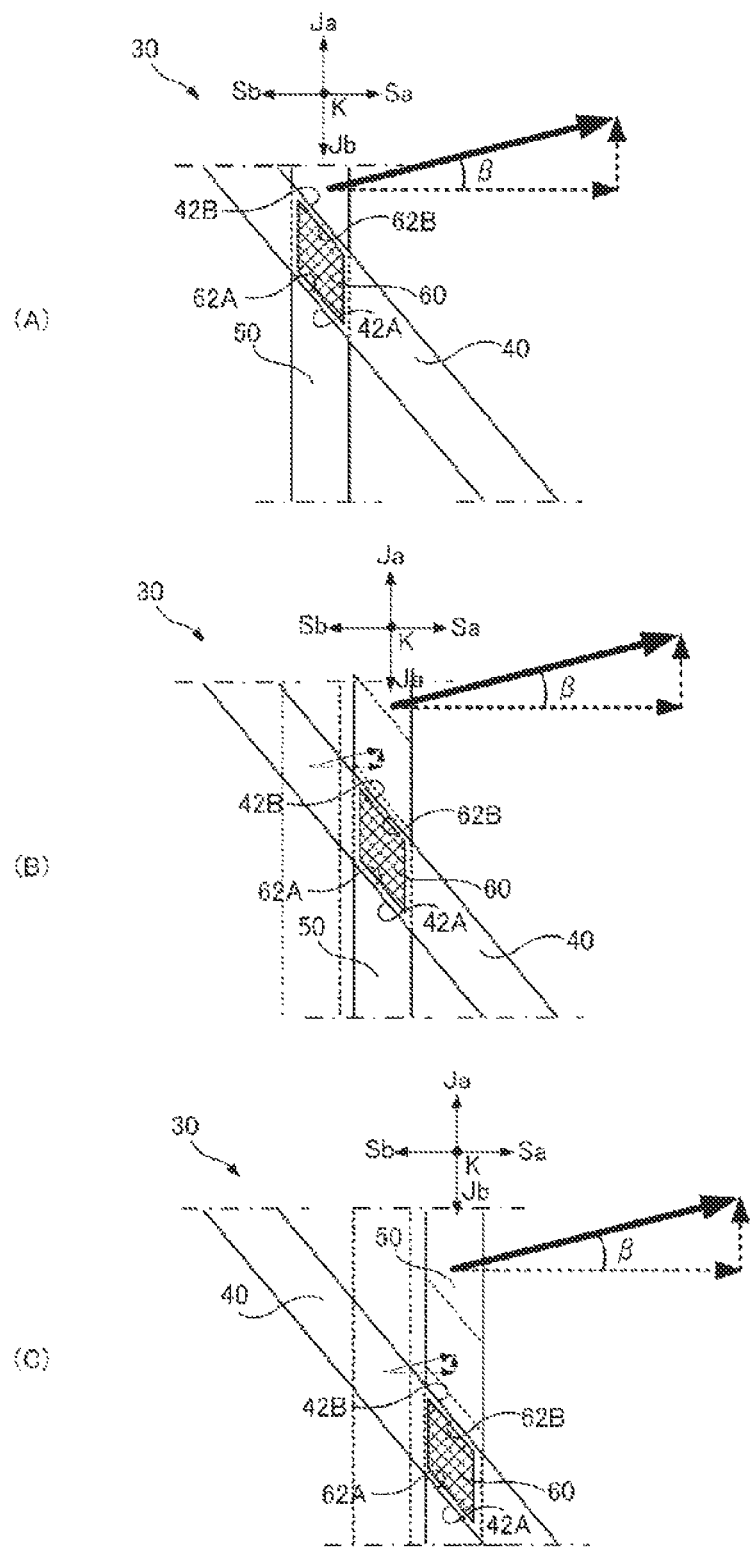
FIG. 12 is partial enlarged views (A to C) showing the relative-rotation prevention structure as viewed radially outwardly from an axis in order to explain a transition state of a second displacement section.

Next, with reference to FIG. 12, the effect of the movement of the second displacement section 60 will be described. Further, in FIG. 12, the second displacement section 60 is viewed outwardly in the radial direction. As shown in a transition of (A) to (C) in FIG. 12, when assuming that the second female screw 101 rotates with respect to the first female screw 100 in the loosening circumferential direction Sb, a point where the second deformation-capable section 50 and the first displacement section 40 intersect, that is, the second displacement section 60 moves. Specifically, the second displacement section 60 moves with reference to the second female screw 101 itself in the axial direction J.

In other words, in order to rotate the second female screw 101 in the loosening direction, it is necessary to deform the second deformation-capable section 50 to move the second displacement section 60. To this end, a corresponding external force (energy) is required. Therefore, relative rotation is prevented due to resistance in the deformation. To the contrary, when a user exerts the corresponding external force (energy), the relative rotation may be enabled to loosen the screw when needed.

Further, a movement range (movement amount) in the axial direction J of the second displacement section 60 in the second deformation-capable section 50 is greater than or equal to one pitch of the second female screw 101, preferably a plurality of pitches (more preferably, at least 3 pitches). It becomes possible to continue to exercise the relative rotation prevention effect in rotation thereof in a long distance.

Figure 13:
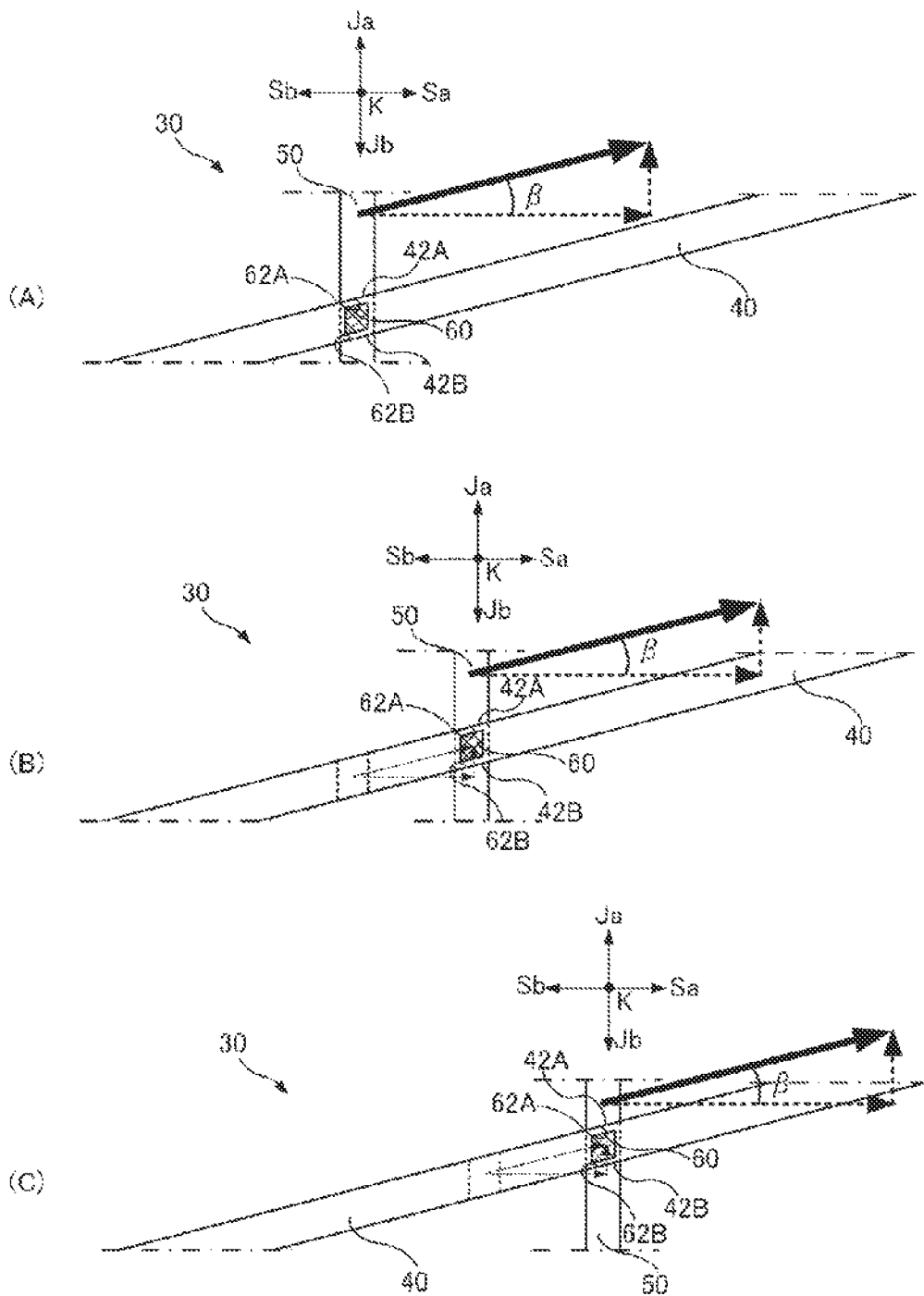
FIG. 13 is partial enlarged views (A to C) showing the relative-rotation prevention structure as viewed radially outwardly from an axis in order to explain a transition state of a variant of the second displacement section.

The second displacement section 60 moves in the axial direction J because, as already said, the displacement angle A of the first deformation-inducing face 42A is different from the lead angle β. When the displacement angle A of the first deformation-inducing face 42A coincides with the lead angle β as shown in FIG. 13, the second displacement section 60 as an intersection point of the second deformation-capable section 50 and the first displacement section 40 rotates together with the second female screw 101, and moves in the same direction as the lead angle β, as shown in the transition of (A) to (C) of FIG. 13. As a result, the second displacement section 60 does not move at all based on the second female screw 101 herself.

Figure 14:
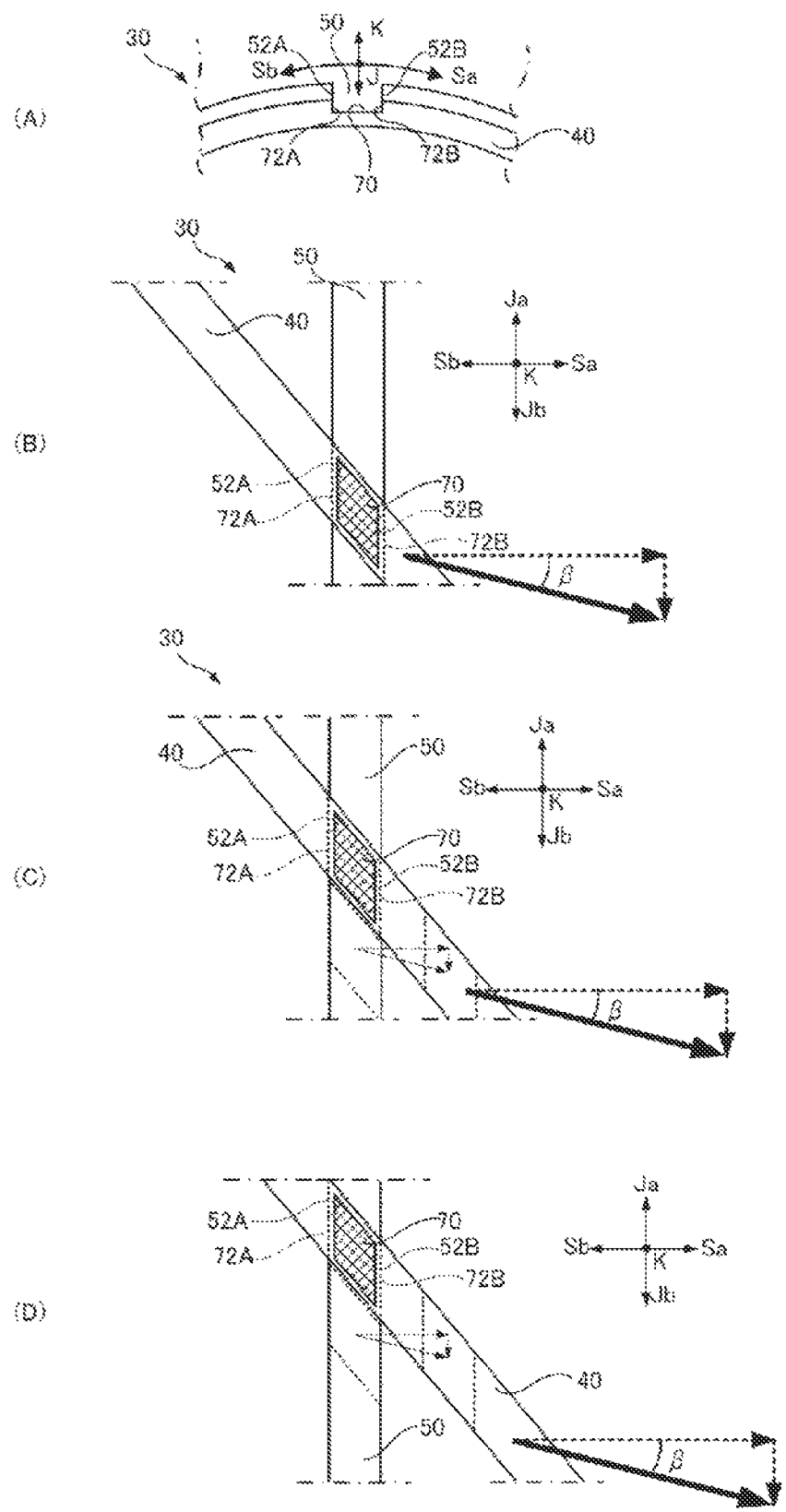
FIG. 14 is a partial enlarged plan view (A) of the relative-rotation prevention structure, and partial enlarged views (B to D) showing the relative-rotation prevention structure as viewed radially outwardly from an axis in order to explain a transition state of a variant of the second displacement section.

Further, in this first embodiment, as shown in (A) of FIG. 14, while forming the second displacement section 60 in the second deformation-capable section 50, a portion of the first displacement section 40 in a length direction thereof (a range in which the displacement section 40 intersects with the second deformation-capable section 50) is depressed inwardly in the radial direction, and thus an auxiliary displacement section 70 is being produced. That is, the first displacement section 40 of the first female screw 100 serves as a "screw-side deformation-capable section" in the present disclosure and presses the second deformation-capable section 50 as a counterpart-side member using a fastening force, such that a portion of the first displacement section 40 is deformed to be depressed inwardly in the radial direction. This deformation produces the auxiliary displacement section 70.

Accordingly, the second deformation-capable section 50 as the counterpart-side to the auxiliary displacement section 70 has a pair of second deformation-inducing faces 52A and 52B. Each of the second deformation-inducing faces 52A and 52B has an expansion (width) in the radial direction, and displaces to intersect the circumferential direction S (i.e., displace in the axial direction J).

The first displacement section (first deformation-capable section) 40 abuts the second deformation-inducing faces 52A and 52B to produce produced faces 72A and 72B of the auxiliary displacement section 70, respectively. That is, one second deformation-inducing face 52A and one produced face 72A abut each other, while the other second deformation-inducing face 52B and the other produced face 72B abut each other.

One second deformation-inducing face 52A faces the fastening (right-rotational) circumferential direction Sa in the first female screw 100 as the right direction screw. Further, the fastening (right-rotational) direction may be defined as a "loosening" direction as a betraying direction from the second female screw 101 based on a direction toward the second female screw 101.

The other second deformation-inducing face 52B faces the loosening (left-rotational) circumferential direction Sb in the first female screw 100.

The second deformation-inducing faces 52A and 52B are directed in the axial direction J, and displace over a 1 pitch or greater of the first female screw 100. Specifically, the second deformation-inducing faces 52A and 52B displace in a range of 3 pitches or greater. In this manner, the auxiliary displacement section 70 produced by the second deformation-inducing faces 52A and 52B may be formed or moved in a range with an enlargement of 1 pitch or greater (preferably 3 pitches or greater) in the axial direction.

As shown in a transition of (B) to (D) of FIG. 14, when assuming that the first female screw 100 rotates in the fastening circumferential direction Sb relative to the second female screw 101 (i.e., when betraying the first female screw 100 in the axial direction Jb from the second female screw 101), a point where the second deformation-capable section 50 and the first displacement section 40 intersect each other, that is, the auxiliary displacement section 70 moves. Specifically, the auxiliary displacement section 70 moves in the axial direction J with reference to the first female screw 100 itself. At the same time, in this example, because the first displacement section 40 is inclined, the auxiliary displacement section 70 also moves in the circumferential direction Sb with respect to the first female screw 100 itself.

In other words, in order to rotate the first female screw 100 in the fastening direction, and in order to betray the first female screw 100 from the second female screw 101 in the axial direction, deformation to move the auxiliary displacement section 70 is required. Thus, a corresponding external force (energy) is required. Therefore, relative rotation is prevented due to a resistance in the deformation.

Figure 15:
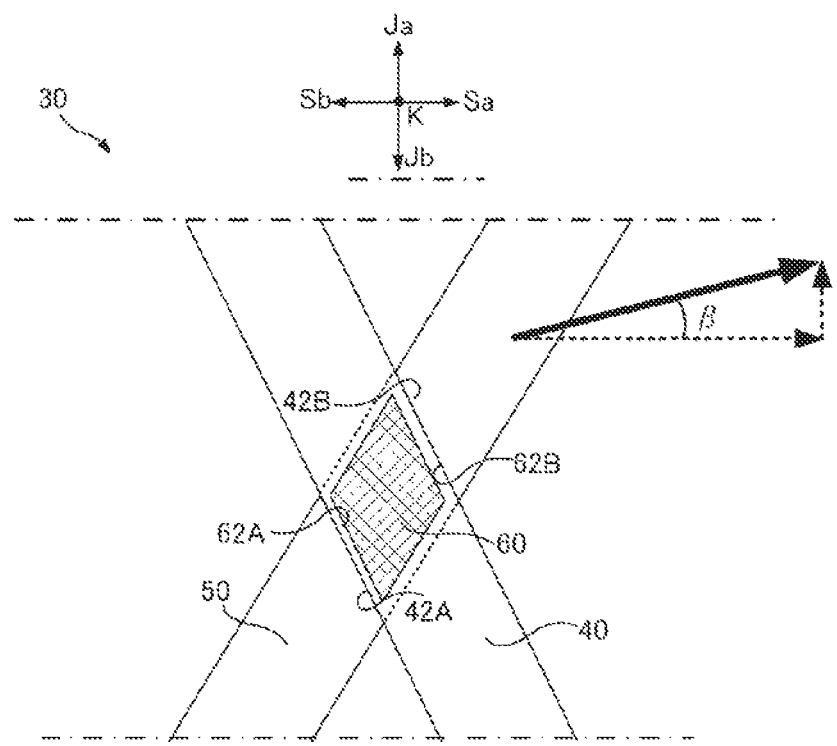
FIG. 15 is a partial enlarged view showing the relative-rotation prevention structure as viewed radially outwardly from an axis in order to explain a variant of the second displacement section.

In the first embodiment, a configuration that the first displacement section 40 is inclined in the circumferential direction S with respect to the axial direction J, and the second deformation-capable section 50 is parallel to the axial direction J is set forth. However, the present disclosure is not limited thereto. For example, as shown in FIG. 15, the second deformation-capable section 50 may be inclined in the circumferential direction S with respect to the axial direction J. When performing relative rotation of the second female screw 101 in the loosening circumferential direction Sa, the second displacement section 60 tries to move both in the axial direction J and the circumferential direction S with respect to the second female screw 101, and thus a stronger relative rotation prevention structure may be exhibited.

Figure 16:
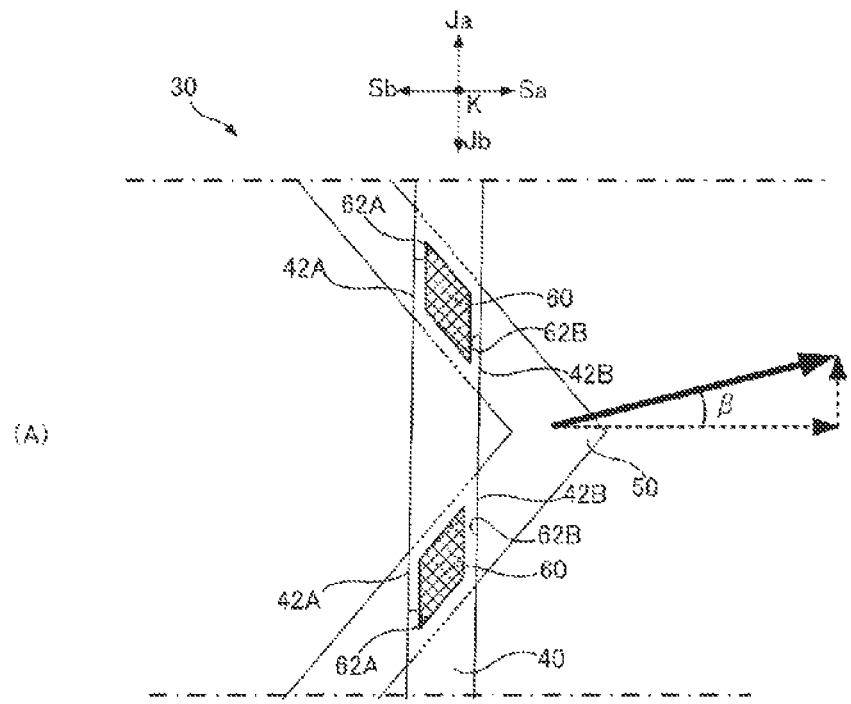
FIG. 16 is partial enlarged views (A and B) showing the relative-rotation prevention structure as viewed radially outwardly from an axis in order to explain a variant of the second displacement section.
Figure 16:
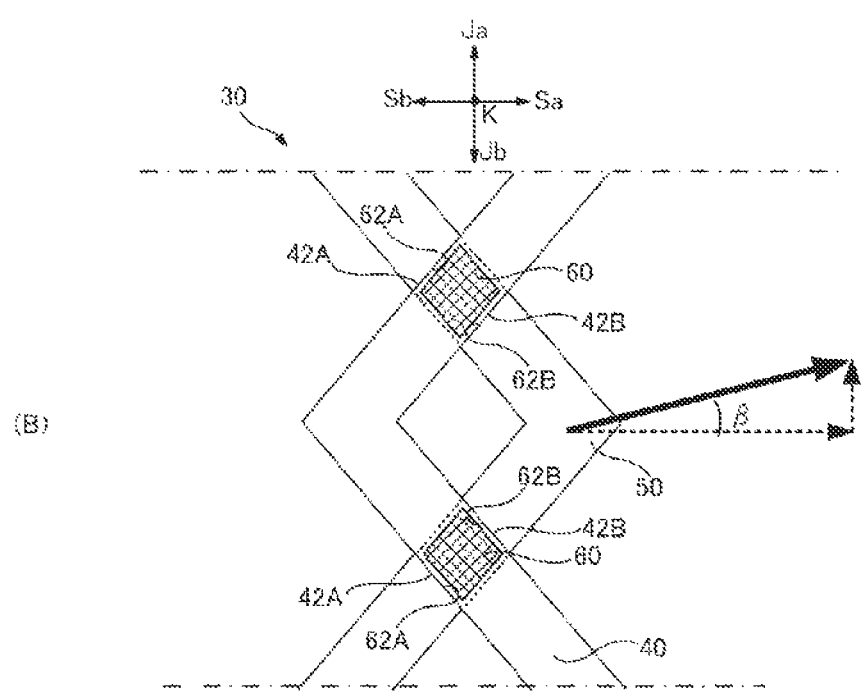

Further, as shown in (A) FIG. 16, the first displacement section 40 may be parallel to the axial direction J, and the second deformation-capable section 50 may be inclined in the circumferential direction S with respect to the axial direction J. In this connection, the second deformation-capable section 50 may have both a portion that inclines in one circumferential direction, and a portion that inclines in an opposite circumferential direction. Furthermore, as shown in (B) of FIG. 16 as an application of (A) of FIG. 16, the first displacement section 40 may have both a portion inclined in one circumferential direction and a portion inclined in an opposite circumferential direction.

Next, with reference to FIG. 17 and subsequent drawings, a relative-rotation prevention structure 30 used in a screw-based fastening mechanism according to a second embodiment of the present disclosure will be described. Further, other parts and members except for the relative-rotation prevention structure 30 are the same as those of the first embodiment, and descriptions thereof are omitted.

Figure 17:
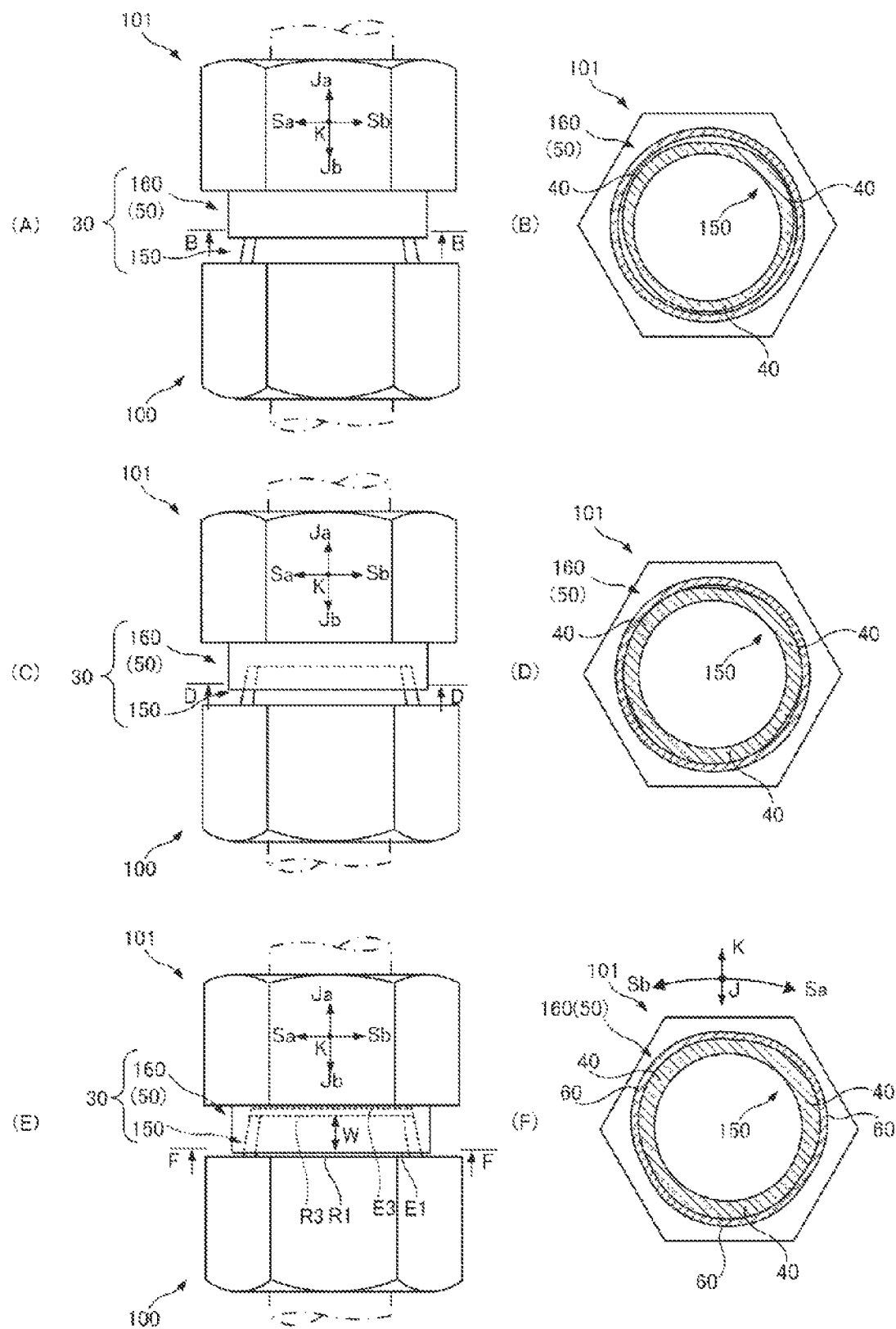
FIG. 17 is a front view (A) for explaining transition of a relative rotation state of a relative-rotation prevention structure according to a second embodiment, a cross-sectional view (B) along a B-B arrow of (A), a front view (C) thereof, a cross-sectional view (D) along a D-D arrow of (C), a front view (E) thereof, and a cross-sectional view (F) along a F-F arrow of (E).

As shown in FIG. 17, the relative-rotation prevention structure 30 includes an annular protrusion 150 formed on a first female screw 100 and an annular concave portion 160 for receiving the annular protrusion 150 and formed on the second female screw 101.

Figure 19:
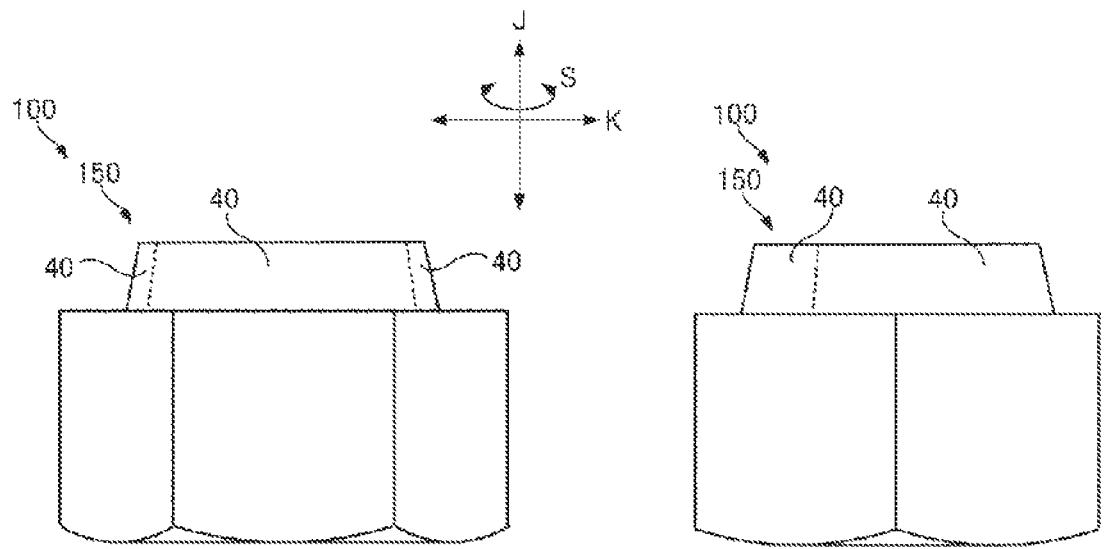
FIG. 19 is a front view (A), a plan view (B), a side view (C), and a perspective view (D) of a first female screw to which the relative-rotation prevention structure is applied.
Figure 19:
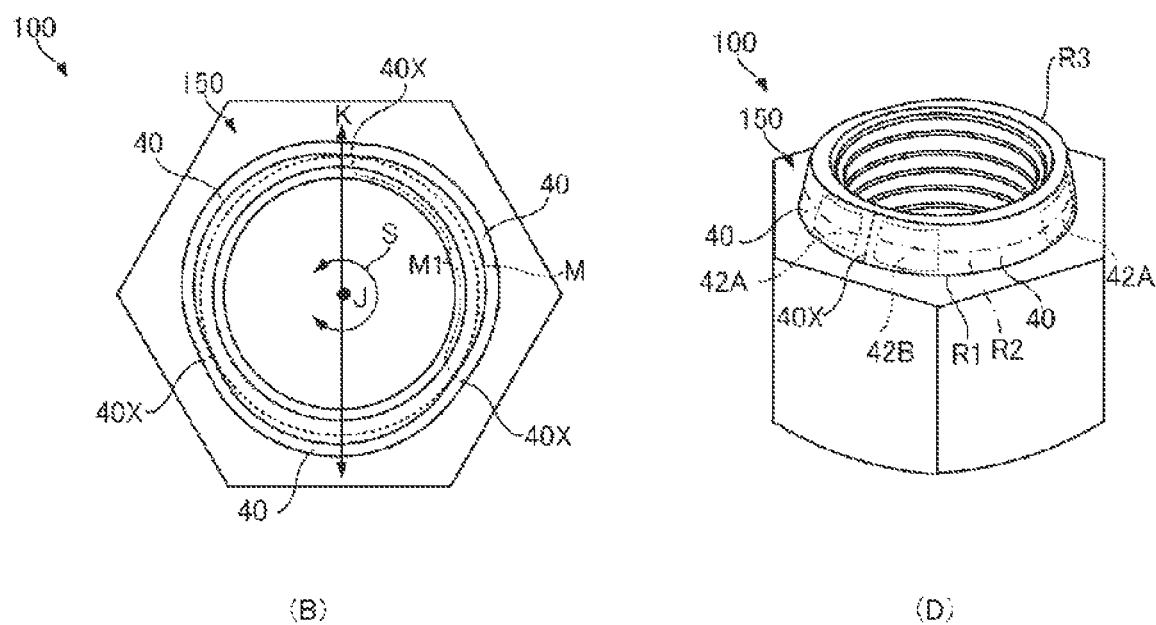

As shown in FIG. 19, an outer circumferential face of the annular protrusion 150 of the first female screw 100 is a tapered surface that is expanded or reduced in the radial direction K along the axial direction J. In this example, the outer circumferential face is a tapered surface that is reduced outwardly in the axial direction J (toward the second female screw 101).

Figure 18:
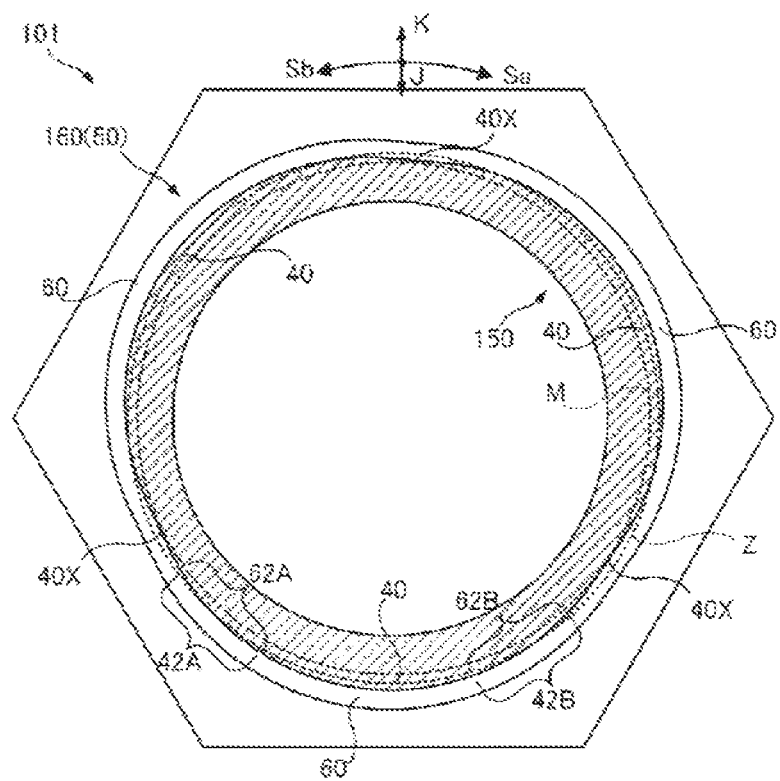
FIG. 18 is an enlarged cross-sectional view (A) of (F) of FIG. 17, and a cross sectional view (B) showing a state, which relative rotation of the second female screw is carried out based on (A).
Figure 18:
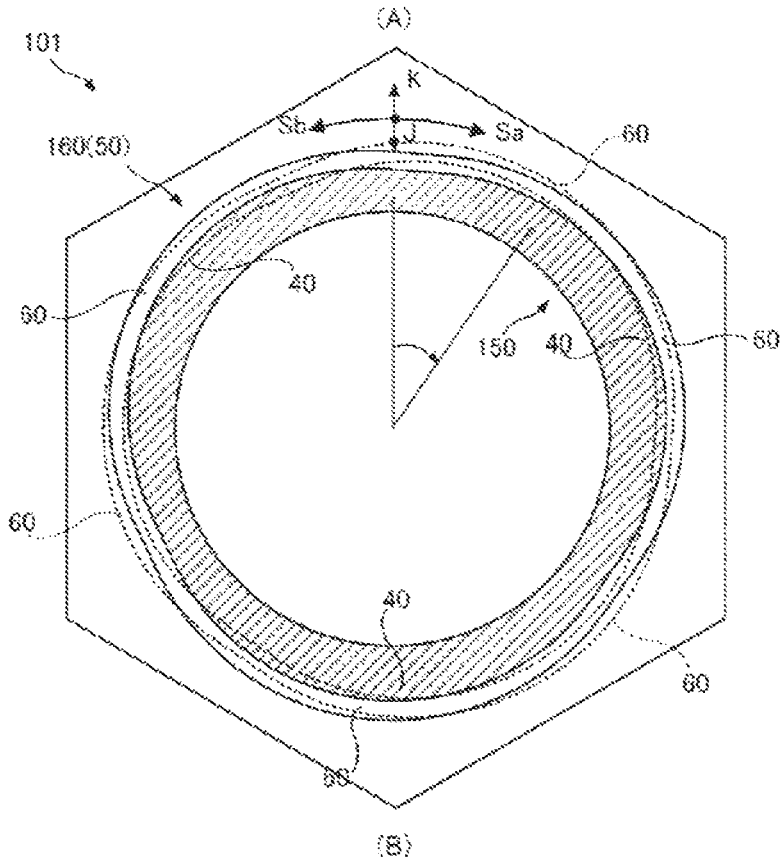

As shown in (B) of FIG. 19, a first (counterpart-side) displacement section 40, which displaces in the radial direction K as it moves in the circumferential direction S is formed on the outer circumferential face of the annular protrusion 150. The first displacement section 40 is embodied as a protrusion protruding outwardly in the radial direction K with respect to a partial arc M1 of a virtual full-circle M (a virtual full-cone) that is coaxial with a center of rotation, when viewed in the axial direction. Thus, a curvature of an outer circumferential face of a protruding portion of the first displacement section 40 becomes smaller than a curvature of the virtual full-circle M. Further, in this example, a center of curvature of the outer circumferential face of the annular protrusion 150 when viewed in the axial direction is always located inwardly of an outer circumferential face (or inwardly of the virtual full-circle M). That is, the curvature of the outer circumferential face of the first displacement section 40 is set so that positive and negative sides are not reversed along the circumferential direction. In this manner, as shown in FIG. 18, the outer circumferential face of the annular protrusion 150 becomes convex outwardly in the radial direction or at least a flat surface circumscribed with the virtual full-circle M. Thus, an entirety of the outer circumferential face of the annular protrusion 150 may be in close contact with the second deformation-capable section 50 elastically and plastically deformed in the second female screw 101. As a result, a high frictional force may be exhibited and thus a high relative rotation suppression effect may be obtained.

Further, in this embodiment, each protrusion of the first displacement section 40 occupies a phase range of 120° in the circumferential direction. Three first displacement sections 40 are evenly divided and arranged in the circumferential direction. As a result, when viewing the annular protrusion 150 in the axial direction, the annular protrusion 150 has an equilateral triangle shape having a round peak. A virtual boundary 40X between a pair of adjacent first displacement sections 40 becomes a straight shaped plane. Further, the present disclosure is not limited thereto. Various shapes, such as a square and an equilateral pentagon having a round peak may be employed.

Further, the first displacement section 40 extends in the axial direction J. The cross-sectional shape in a direction perpendicular to the axial direction of the first displacement section 40 has a tapered shape such that a distal end of the annular protrusion 150 is small, while a proximal end thereof is large. Further, a circumferential length of the outer circumferential face of the annular protrusion 150 is sized such that the proximal end thereof is the largest and R1 while the distal end thereof is the smallest and R3 while a middle portion is R2 (R1>R2>R3). Further, a partial arc-shaped outer surface of the first displacement section 40 is displaced in the radial direction K as it moves in the circumferential direction S.

Figure 20:
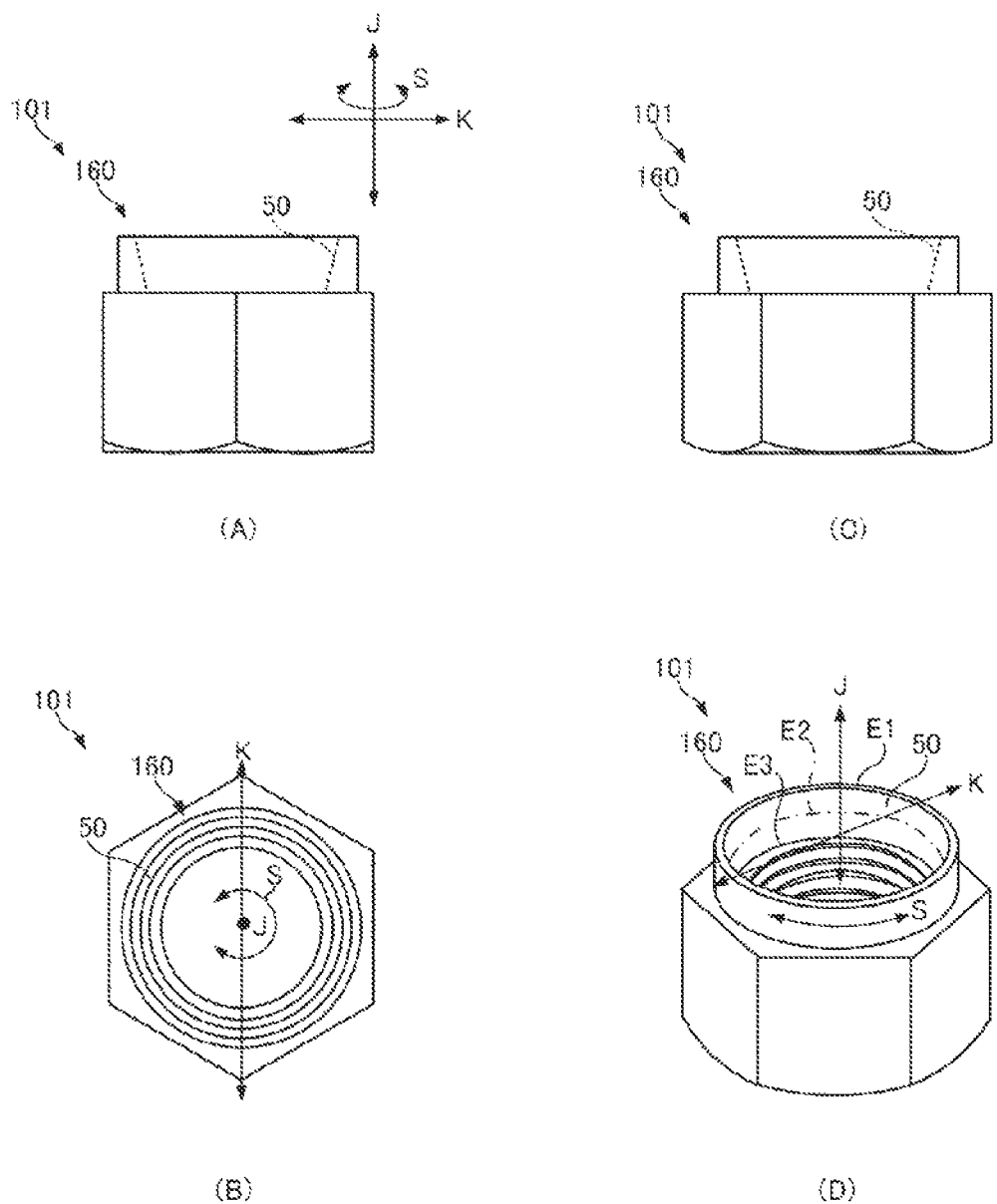
FIG. 20 is a front view (A), a plan view (B), a side view (C), and a perspective view (D) of a second female screw to which the relative-rotation prevention structure is applied.

As shown in FIG. 20, a conical inner circumferential face (cylindrical face) of the annular concave portion 160 of the second female screw 101 has a full-circle shape, and, further, is a tapered surface, which is expanded or reduced in the radial direction K along the axial direction J. In this example, the inner circumferential face is a tapered surface, which is expanded toward the first female screw 100 and is parallel to the outer circumferential face of the annular protrusion 150. The inner circumferential face is a smooth surface. An inner circumferential length of the inner circumferential face is sized such that a distal end is E1 and the largest, while a proximal end is the smallest and E3, while a middle portion is E2 (E1>E2>E3). When comparing these inner circumferential lengths (E1, E2, E3) with the outer circumferential lengths (R1, R2, R3) of the outer circumferential face of the annular protrusion 150, a following condition is satisfied.

$$R1 \geq E1 > R2 \geq E2 > R3 \geq E3 \text{ (see } (E) \text{ in FIG. 17)}$$

That is, as shown in (E) and (F) of FIG. 17 and FIG. 18 to be described later, while the annular protrusion 150 and the annular concave portion 160 are eventually engaged (fitted) with each other, the outer circumferential length of the annular protrusion 150 and the inner circumferential length of the annular concave portion 160 are approximately equal to each other at the same position in the axial direction. In other words, when the above setting is achieved, unless the second deformation-capable section 50 of the annular concave portion 160 is elastically and/or plastically deformed (elastoplastic deformation), the first displacement section 40 of the annular protrusion 150 may not be accepted therein. In other words, as shown in (A) of FIG. 18, the second deformation-capable section 50 has both a region deforming inwardly in the radial direction and a region deforming outwardly in the radial direction with respect to a virtual full-circle Z as an inner circumferential face before deformation. This elastoplastic deformation provides a structure that effectively prevents relative rotation.

In this second embodiment, as shown in FIG. 17, an entirety of the annular concave portion 160 becomes the second (screw-side) deformation-capable section 50. Therefore, using a fastening force when the first female screw 100 and the second female screw 101 approach each other, this second deformation-capable section 50 presses the first displacement section 40 of the first female screw 100 and thus is deformed so that a portion thereof is depressed outwardly in the radial direction. This deformation produces the second (screw-side) displacement section 60. Further, in FIG. 20, the second displacement section 60 is not produced because FIG. 20 shows a state before fastening.

The second deformation-capable section 50 of the second female screw 101 is made of a flexible material, compared to the first displacement section 40 of the first female screw 100. Further, the second deformation-capable section 50 has low rigidity compared to the first displacement section 40. In this manner, the first displacement section 40 deforms to actively expand the second deformation-capable section 50 outwards (see (D) of FIG. 17). As a result, a shape of the outer circumferential face of the first displacement section 40 and a shape of the inner circumferential face of the second deformation-capable section 50 are almost identical with each other (see (E) of FIG. 17). In this connection, a side of the second deformation-capable section 50 in contact with the first displacement section 40 is actively elastically and/or plastically deformed. Further, in this example, the second displacement section 60 deforms into a concave shape outwardly in the radial direction. However, the second displacement section 60 may be deformed inwardly in the radial direction.

As shown in FIG. 18, a pair of produced faces 62A and 62B, which determine a depression shape of the second displacement section 60 after the deformation, has a width (displace) in the radial direction K. Further, these produced faces 62A and 62B extend in the axial direction J. As a result, as shown in (E) of FIG. 17, the second displacement section 60 expands into an axial direction range (region) W of one pitch or greater of the screw and is produced on the surface of the second deformation-capable section 50. As a result, when the second female screw 101 rotates once in the loosening direction, this may always prevent the relative rotation in all phases. Further, specifically, the second displacement section 60 may expand into an axial direction range of 3 pitches or greater of the screw and may be produced. This axial direction range (region) W may be defined as an interference distance W in the axial direction between the second deformation-capable section 50 and the first displacement section 40.

Further, when viewing the annular concave portion 160 axially, 3 second displacement sections 60 are produced in the circumferential direction at an equal spacing. Thus, radial reaction forces in the deformation of the second displacement sections 60 cancel each other out, thereby to prevent an eccentric force from acting between the first female screw 100 and the second female screw 101.

As shown in (A) of FIG. 18, the first displacement section 40 as a counterpart-side to the second displacement section 60 has a pair of first deformation-inducing faces 42A and 42B. The first deformation-inducing faces 42A and 42B have an expanding (width) in the radial direction K and at the same time, extending substantially in parallel with the axial direction J, thereby to intersect the circumferential direction S.

The second deformation-capable section 50 abuts the first deformation-inducing faces 42A and 42B to produce the produced faces 62A and 62B of the second displacement section 60. That is, one first deformation-inducing face 42A and one produced face 62A abut each other, while the other first deformation-inducing face 42B and the other produced face 62B abut each other.

One first deformation-inducing face 42A faces the loosening (right-rotational) circumferential direction Sa in the second female screw 101 as the left direction screw. Further, the other first deformation-inducing face 42B faces the fastening (left-rotational) circumferential direction Sb in the second female screw 101.

The first deformation-inducing faces 42A and 42B are directed in the axial direction J and displace the second female screw 101 by 1 pitch or greater, and, specifically, displace in a range of 3 pitches or greater. In this manner, the second displacement section 60 produced by these first deformation-inducing faces 42A and 42B may be formed in a wide range of 1 pitch or greater (preferably, 3 pitches or greater) in the axial direction.

As shown in (B) of FIG. 18, when considering an example where the second female screw 101 performs a relative rotation in the loosening circumferential direction Sb with reference to the first female screw 100, the second displacement section 60 moves in the fastening circumferential direction Sa with respect to the second female screw 101 itself. In other words, to rotate the second female screw 101 in the loosening direction, it is necessary to deform the second deformation-capable section 50 to move the second displacement section 60. Thus, a corresponding external force (energy) is required. Therefore, relative rotation is prevented due to a resistance at the time of deformation.

Figure 21:
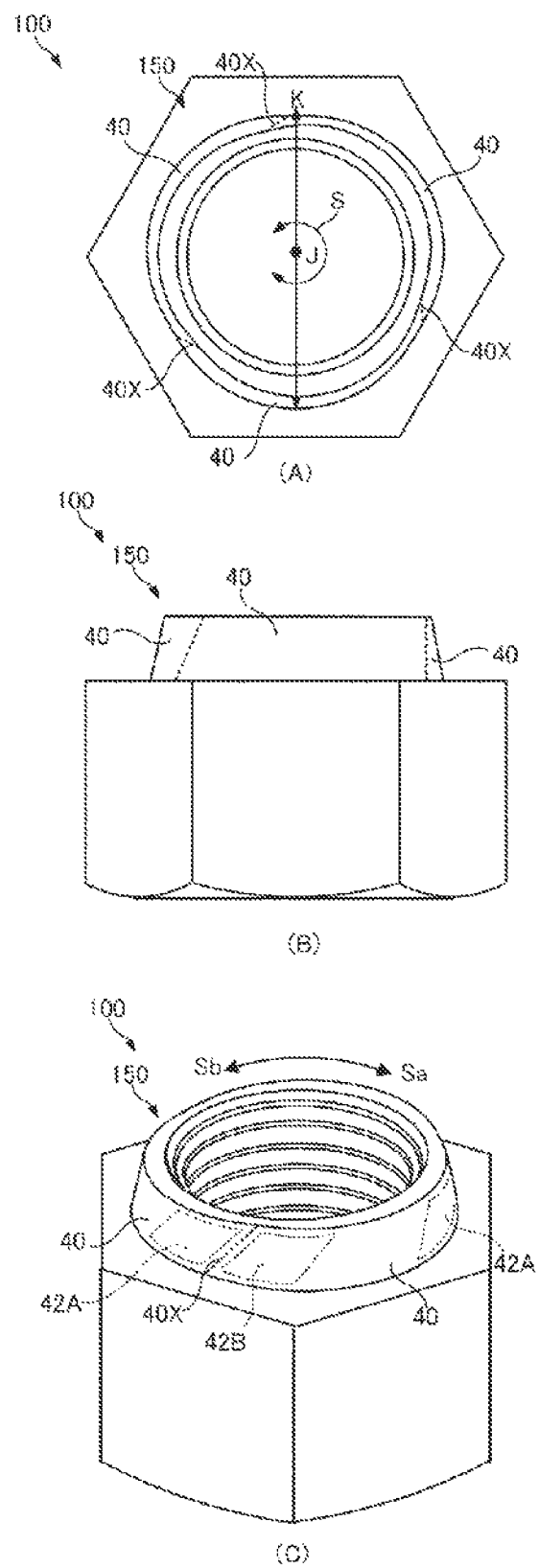
FIG. 21 is a plan view (A), a front view (B), and a perspective view (C) showing a variant of the first female screw.

Further, in this second embodiment, a configuration that the first deformation-inducing faces 42A and 42B of the first female screw 100 extend substantially parallel to the axial direction J is set forth. However, the present disclosure is not limited thereto. For example, as shown in FIG. 21, the first deformation-inducing faces 42A and 42B may be formed so as to be distorted in the circumferential direction along the axial direction J. Specifically, the first deformation-inducing faces 42A and 42B may be directed in a direction from the proximal end of the annular protrusion 150 to the distal end thereof. A phase of a partial arc (partial elliptical arc) of the first displacement section 40 may gradually displace in the fastening (left-rotational) circumferential direction Sb of the second female screw 101. In this manner, as in the first embodiment, one first deformation-inducing face 42A is inclined with respect to the axial direction J. Even when the second female screw 101 tries to rotate in the loosening direction, the first deformation-inducing face 42A engages therewith in a direction that inhibits the movement of the produced face 62A, so that relative rotation may be more reliably suppressed. In another example, the first deformation-inducing face is not necessarily inclined with respect to the perpendicular direction to a screw axis and may form a circumferential thread shape parallel to the perpendicular direction to a screw axis.

Figure 22A:
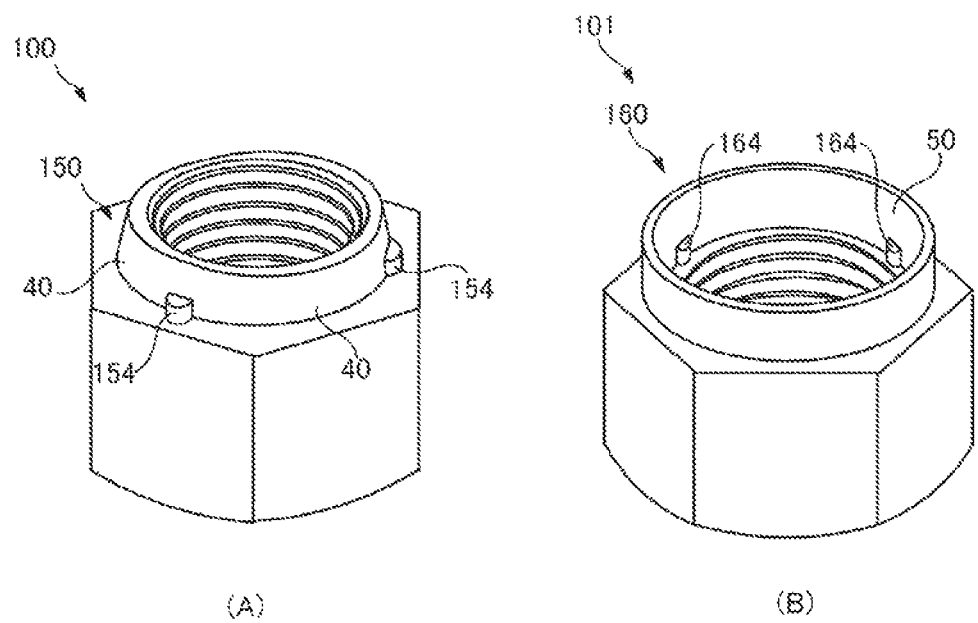
FIG. 22A is a perspective view (A) showing a variant of the first female screw, a perspective view (B) showing a variant of the second female screw, and a front view (C) showing a fastening state of the variant.
Figure 22A:
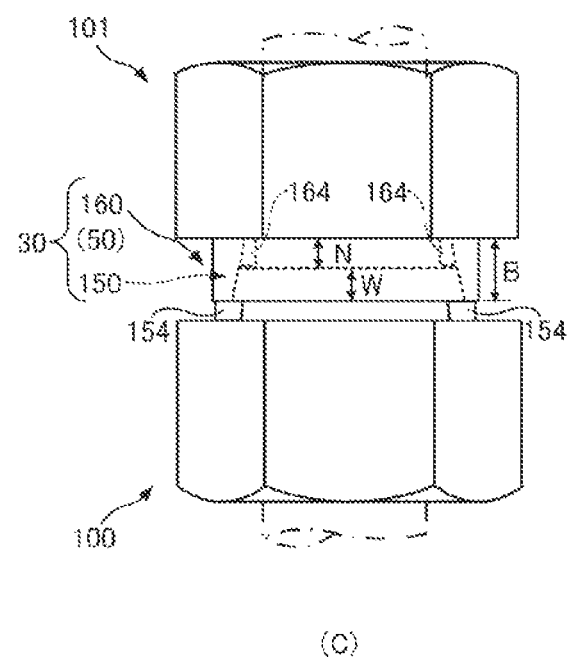

As shown in (A) of FIG. 22A as a variant of this second embodiment, an axial stopper section 154 may be formed at a proximal end near an outer circumference of the annular protrusion 150 of the first female screw 100. This axial stopper section 154 abuts a distal end of the annular concave portion 160 of the second female screw 101, and defines an approach distance in the axial direction between the first female screw 100 and the second female screw 101. Similarly, as shown in (B) of FIG. 22A, an axial stopper section 164 may be formed at a proximal end near an inner circumference of the annular concave portion 160 of the second female screw 101. This axial stopper section 164 is in contact with a distal end of the annular protrusion 150 of the first female screw 100, and defines an approach distance in the axial direction between the first female screw 100 and the second female screw 101.

In this manner, as shown in (B) of FIG. 22A, in fastening, an amount (an interference distance W in the axial direction) by which the second deformation-capable section 50 of the annular concave portion 160 receives the first displacement section 40 of the annular protrusion 150 in the axial direction may be defined (limited), thereby to stabilize the relative rotation prevention effect. In this connection, when a maximum axial direction dimension of the second deformation-capable section 50 of the annular concave portion 160 is defined as B, the interference distance W may be set to be smaller than the maximum axial direction dimension B. In this manner, a clearance N in the axial direction may be secured at the proximal end of the second deformation-capable section 50. Because of the clearance N, the proximal end of the second deformation-capable section 50 may be freely and elastoplastically deformed in the radial direction. Thus, it is possible to prevent the proximal end of the second deformation-capable section 50 from being extremely plastically deformed and damaged when the second deformation-capable section 50 receives therein the annular protrusion 150 and interferes therewith.

Further, in this example, an example where the first female screw 100 or the second female screw 101 is integral with the axial stopper section 154 or 164 is set forth. However, the present disclosure is not limited thereto. The axial stopper section as a separate member such as an annular ring may be interposed between the first female screw 100 and the second female screw 101 so that the approach distance (minimum access distance) therebetween may be kept constant.

Further, in this example, an example where the axial stopper sections 154 and 164 are formed continuously on the outer periphery of the annular protrusion 150 and the inner periphery of the annular concave portion 160 is set forth. However, the present disclosure is not limited thereto. For example, as shown in (A) of FIG. 22B, a first annular axial stopper section 154 may be formed independently on an outer circumferential side away from the annular protrusion 150 of the first female screw 100. As shown in (B) of FIG. 22B, a second annular axial stopper section 164 may be formed independently on an outer circumferential side away from the annular concave portion 160 of the second female screw 101.

Figure 22B:
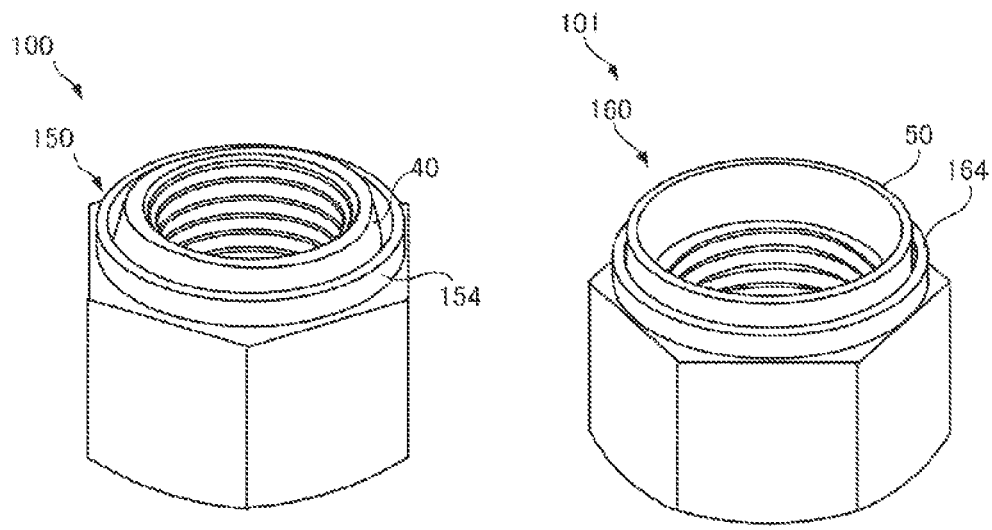
FIG. 22B is a perspective view (A) showing a variant of the first female screw, a perspective view (B) showing a variant of the second female screw, and a front view (C) showing a fastening state of the variant.
Figure 22B:
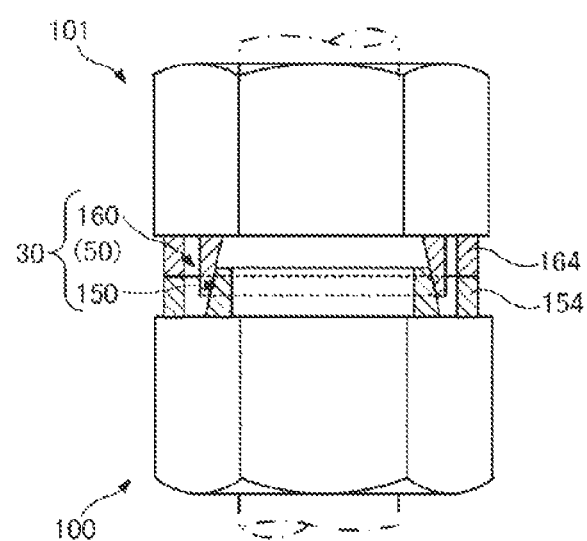

As shown in (C) of FIG. 22B, contacting a seated face of the first axial stopper section 154 and a seated face of the second axial stopper section 164 with each other may allow the approach distance in the axial direction between the first female screw 100 and the second female screw 101 to be defined.

In this manner, due to the presence of the first axial stopper section 154 and the second axial stopper section 164, the rigidity of the annular protrusion 150 or the annular concave portion 160 does not change. As a result, the proximal end of the second deformation-capable section 50 may freely perform elastoplastic deformation in the radial direction, before and after abutment between the first axial stopper section 154 and the second axial stopper section 164. Further, making the first axial stopper section 154 and the second axial stopper section 164 annular may allow durability against a surface pressure at the time of the abutment to be increased. Further, the height of each of the axial direction of the first axial stopper section 154 and the second axial stopper section 164 may not be particularly limited and may be appropriately set. Further, the height of the first axial stopper section 154 may be 0 (no the first axial stopper section 154), while only the second axial stopper section 164 may be formed. On the contrary, while the second axial stopper section 164 has a height of 0 (no the second axial stopper section 164), only the first axial stopper section 154 may be formed.

Further, in the second embodiment, an example where the shape of the outer circumferential face of the annular protrusion 150 of the first female screw 100 is an equilateral triangle having a round peak is set forth. In another example, as shown in (A) of FIG. 23, the shape of the outer circumferential face of the annular protrusion 150 of the first female screw 100 may be a constant-width shape. In this case, a distance between two parallel lines circumscribed on both sides of the constant-width shape is always constant (that is, a diameter is always constant). A representative example thereof may be a Reuleaux triangle. When the outer circumferential length of this constant width shape and the inner circumferential length of the second deformation-capable section 50 substantially match each other, they may be brought into close contact with each other over an entire circumference after elastic deformation.

Figure 23:
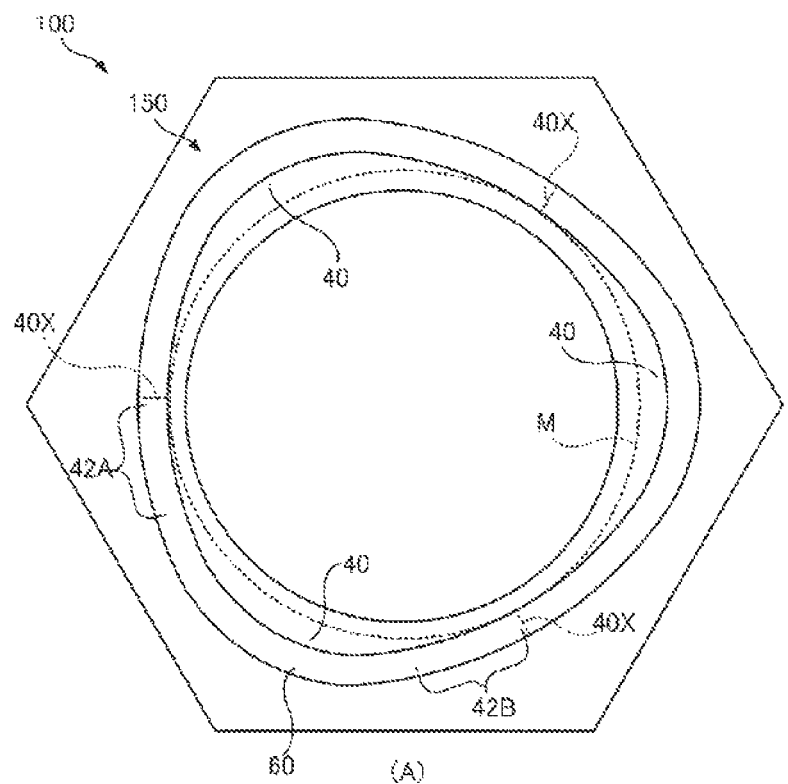
FIG. 23 is a perspective view (A) showing a variant of the first female screw, and a perspective view (B) showing another variant of the first female screw.
Figure 23:
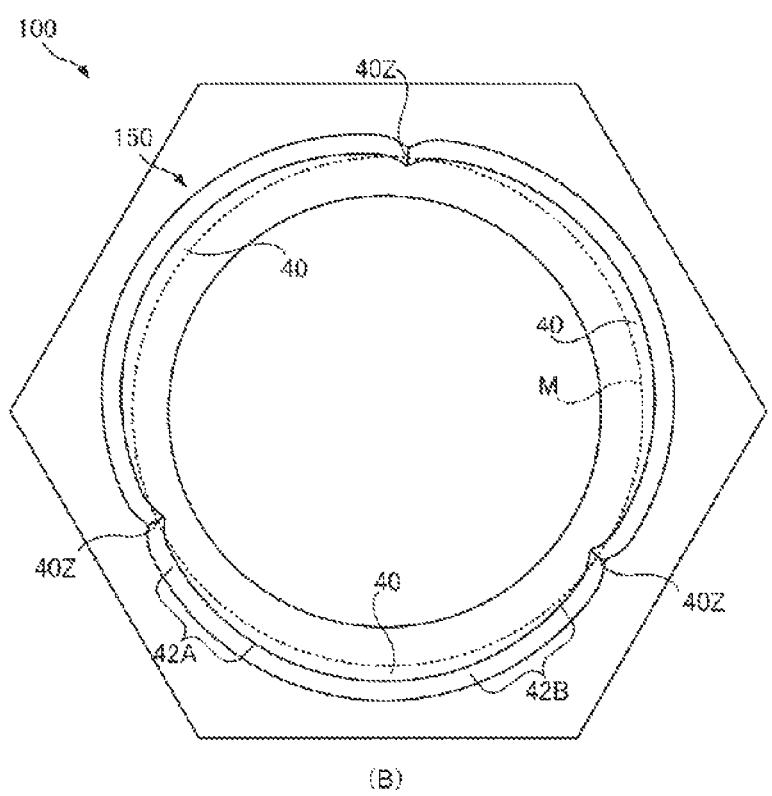

For example, as shown in (B) of FIG. 23, a valley 40Z depressed inwardly of the radial direction K may be deformed at a boundary between a pair of adjacent first displacement sections 40. A gap may be actively formed between the annular protrusion 150 and the annular concave portion 160.

Figure 24:
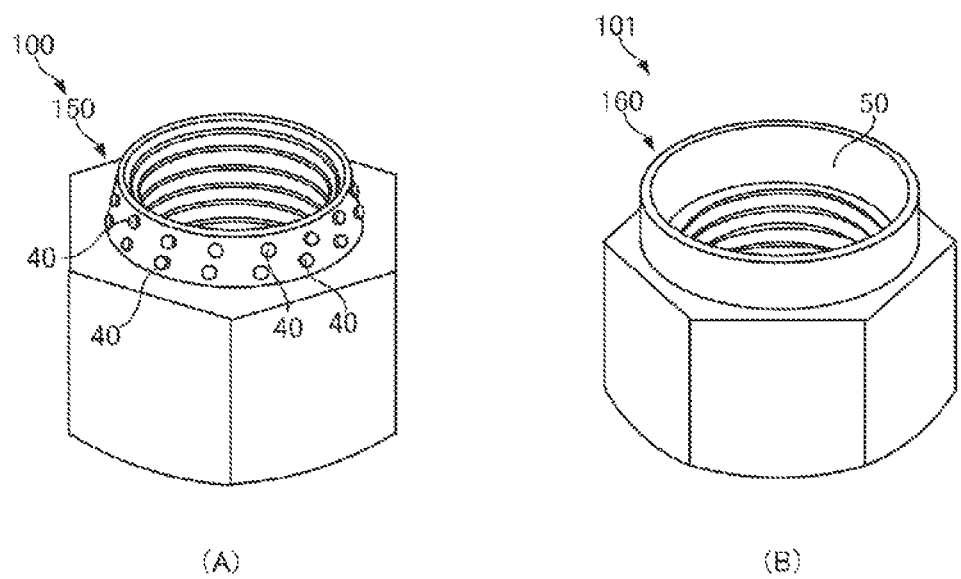
FIG. 24 is a perspective view (A) showing a variant of the first female screw, and a perspective view (B) showing a variant of the second female screw.

Further, in the second embodiment, an example where a partial arc-shaped protrusion is formed on the outer circumferential face of the annular protrusion 150 of the first female screw 100 is set forth. The present disclosure is not limited thereto. For example, like the first female screw 100 shown in FIG. 24, a dot-shaped fine protrusion may be formed on the outer circumferential face of the annular protrusion 150 and may act as the first displacement section 40.

Further, in the first and second embodiments, an example where the first displacement section 40 is formed on the annular tapered surface formed on the outer periphery of the annular protrusion 150 is set forth. The present disclosure is not limited thereto. For example, as shown in (A) of FIG. 25, the first displacement section 40 may be formed on a plane perpendicular to an axial direction J of the first female screw 100, that is, on the axial cross section of the first female screw 100. In this example, as the first displacement section 40, a plurality of strip-shaped protrusions extending in the radial direction are arranged in the circumferential direction. As shown in (B) of FIG. 25, the second deformation-capable section 50 may be formed on a plane perpendicular to the axial direction J of the second female screw 101, that is, in the axial cross section of the second female screw 101. In this example, as the second deformation-capable section 50, a strip-shaped protrusion extending in the circumferential direction may be formed. In particular, in this example, a strip-shaped protrusion extending in the circumferential direction may extend in a meandering manner in the radial direction.

Figure 25:
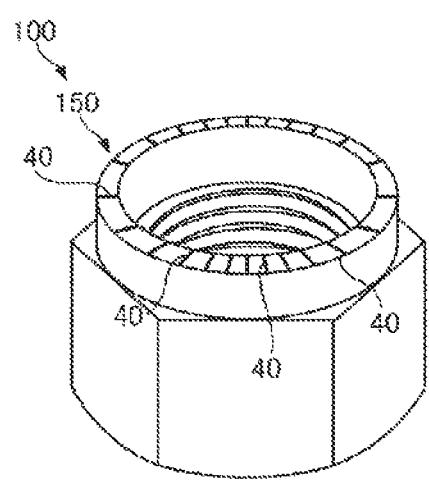
FIG. 25 is a perspective view (A) showing a variant of the first female screw, a perspective view (B) showing a variant of the second female screw, and an enlarged plan view (C) showing a relative-rotation prevention structure.
Figure 25:
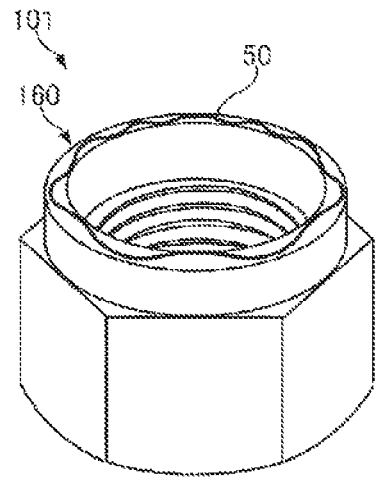
Figure 25:
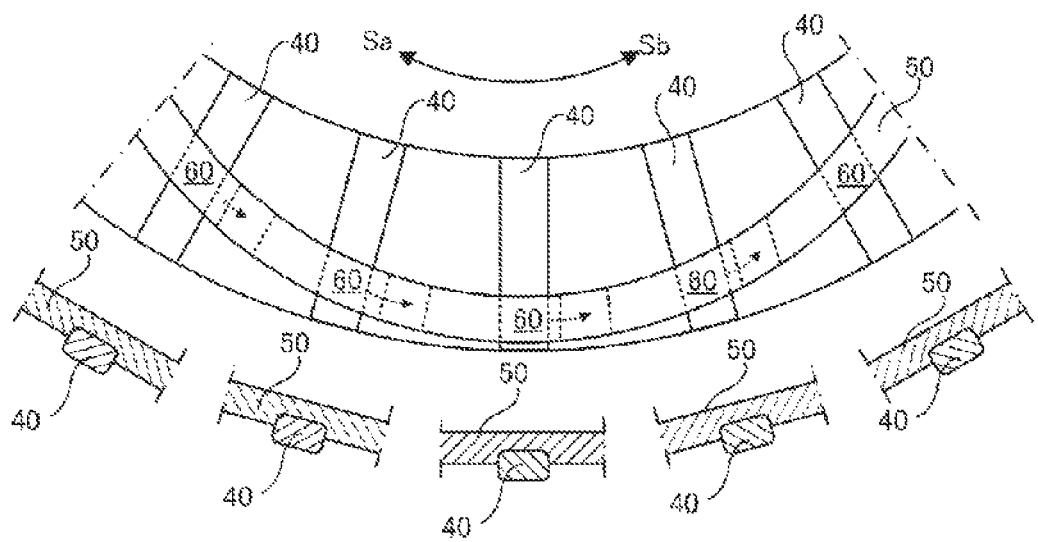

When the axial cross sections of the first female screw 100 and the second female screw 101 abut each other, as shown in (C) of FIG. 25, the second displacement section 60 is formed at an intersection region between the first displacement section 40 and the second deformation-capable section 50 and on the second deformation-capable section 50. When relative-rotating the second female screw 101 in the loosening circumferential direction Sa, the second displacement section 60 moves in the radial direction while simultaneously moving in the circumferential direction along the length direction of the second deformation-capable section 50. In other words, to rotate the second female screw 101 in the loosening direction, it is necessary to deform the second deformation-capable section 50 to move the second displacement section 60. Thus, a corresponding external force (energy) is required. Therefore, relative rotation is prevented due to a resistance at the time of deformation.

Figure 26:
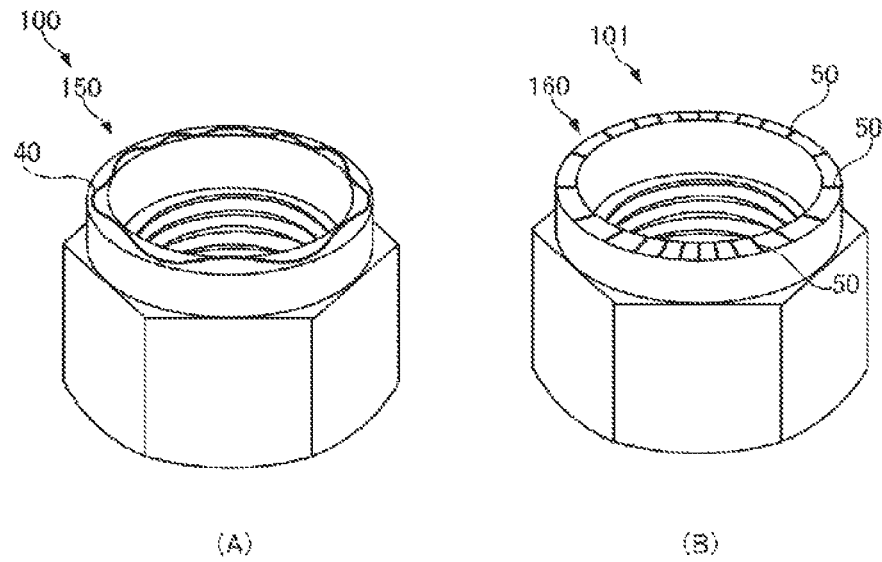
FIG. 26 is a perspective view (A) showing a variant of the first female screw, a perspective view (B) showing a variant of the second female screw, and an enlarged plan view (C) showing a relative-rotation prevention structure.
Figure 26:
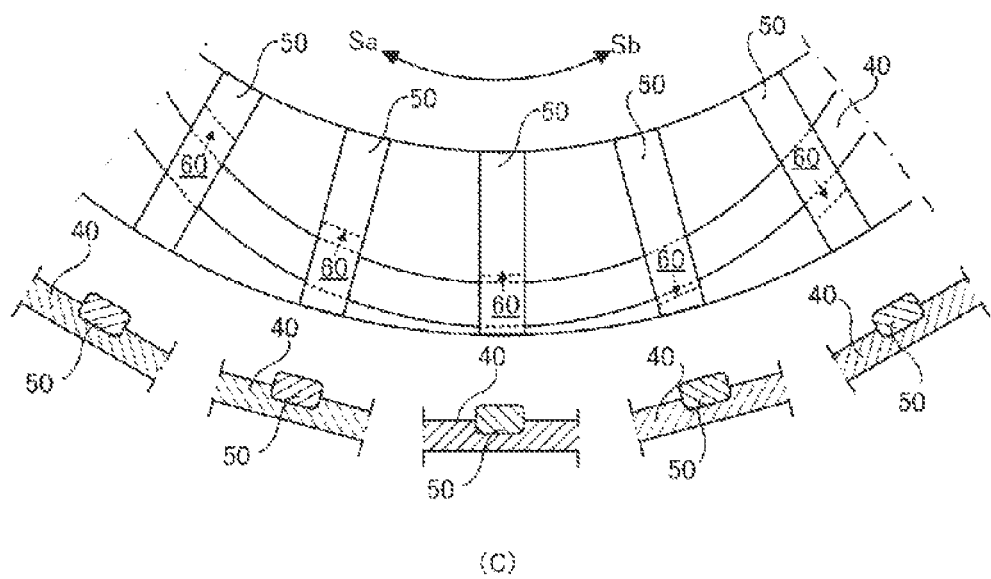

Further, as shown in FIG. 26, the first female screw and the second female screw in (A) of FIG. 25 may be reversed. As the first displacement section 40, a strip-shaped protrusion extending in the circumferential direction and meandering in the radial direction may be formed on the axial cross section of the first female screw 100. As the second deformation-capable section 50, a plurality of strip-shaped protrusions extending in the radial direction may be arranged in the circumferential direction on the axial cross section of the second female screw 101. As shown in (B) of FIG. 26, when the axial cross sections of the first female screw 100 and the second female screw 101 are in contact with each other, the second displacement section 60 is formed at the intersection region between the second deformation-capable section 50 and the first displacement section 40 and on the second deformation-capable section 50. When rotating the second female screw 101 in the loosening circumferential direction Sa, the second displacement section 60 moves along the radial direction K of the second deformation-capable section 50. In other words, to rotate the second female screw 101 in the loosening direction, it is necessary to deform the second deformation-capable section 50 to move the second displacement section 60 in the radial direction K. Thus, a corresponding external force (energy) is required. Therefore, relative rotation is prevented due to a resistance at the time of deformation.

Figure 27:
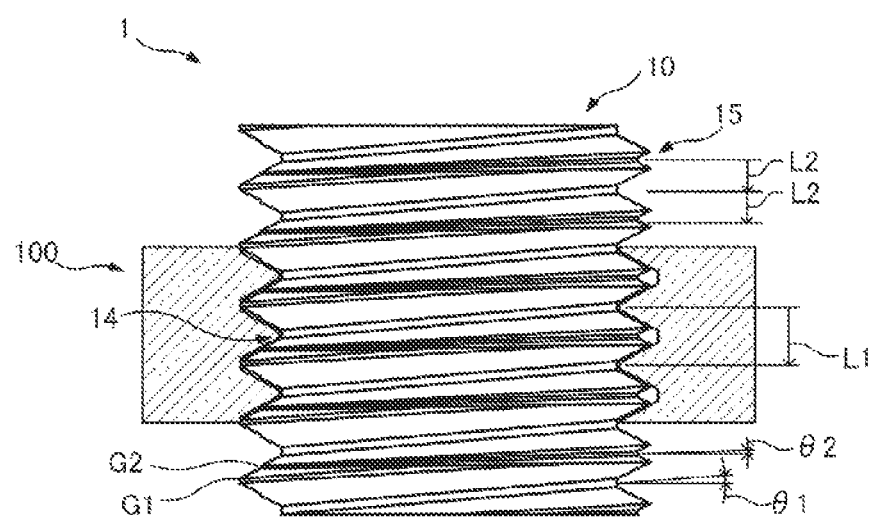
FIG. 27 is a front cross-sectional view according to a variant of a fastening structure of a male screw and a female screw of the present embodiment.

In the above embodiments group, an example where, in the male screw 10, first female screw 100 and second female screw 101, the pair of first spiral groove 14 and the first female threaded spiral thread 114, and the pair of the second spiral groove 15 and the second female threaded spiral thread 115 have an opposite threading direction relationship (the same lead angle and opposite lead direction) is illustrated. The present disclosure is not limited thereto. For example, as shown in FIG. 27, a pair of the first spiral groove 14 and the first female threaded spiral thread 114, and a pair of the second spiral groove 15 and the second female threaded spiral thread 115 having the same lead directions L1 and L2 but different lead angles may be employed. In this case, the spiral groove having a different lead angle is overlapped with respect to the first spiral groove 14. Thus, the first spiral groove 14 having a lead L1 (lead angle α1) and the second spiral groove 15 having a lead L2 (lead angle α2) may be formed such that thread directions thereof may be parallel to each other. In this case, a first thread G1 of the first spiral groove 14 and a second thread G2 of the second spiral groove 15 are not common but are separate.

Further, in the embodiments group, an example of the so-called double nut structure in which the first female screw 100 and the second female screw 101 are screw-engaged with respect to the common male screw 10 is set forth. The present disclosure is not limited thereto. For example, as shown in (A) of FIG. 28, an example in which a counterpart-side member to the second female screw 101 is the fastening target member H may be included in the present disclosure. In this case, the relative-rotation prevention structure 30 is formed between the second female screw 101 and the fastening target member H.

Specifically, the annular protrusion 150 may be formed on the outer transverse face of the fastening target member H, instead of the first female screw. The first (counterpart-side) displacement section 40 may be formed on the annular protrusion 150. Further, the counterpart-side member to the second female screw 101 is not limited to the fastening target member H and may be a seated body such as a washer, a head of or a shaft section of the male screw, etc.

Figure 28:
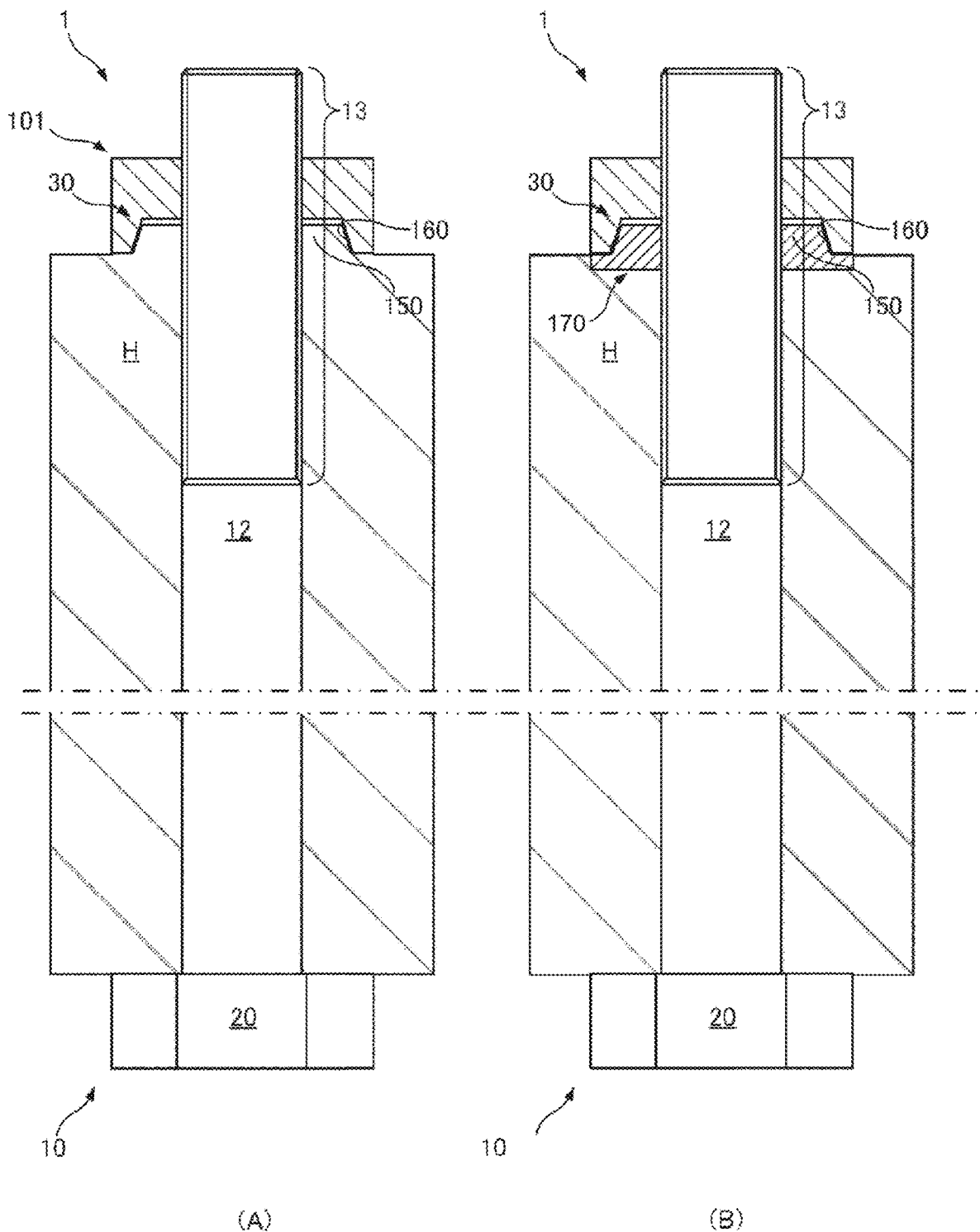
FIG. 28 is front cross-sectional views (A and B) according to a variant of a relative-rotation prevention structure of the present embodiment.

For example, as shown in (B) of FIG. 28, a case where the counterpart-side member to the second female screw 101 is a seated body 170 such as a washer may be included in the present disclosure. The relative-rotation prevention structure 30 is formed between the second female screw 101 and the seated body 170. In this case, although not particularly shown, a shape of the outer circumference of the seated body 170 has a non-full-circle (for example, hexagonal), an eccentric circle, etc. When accommodating the seated body 170 in a recess formed in the fastening target member H, this may mechanically prevent the relative rotation between the seated body 170 and the fastening target member H.

Figure 29:
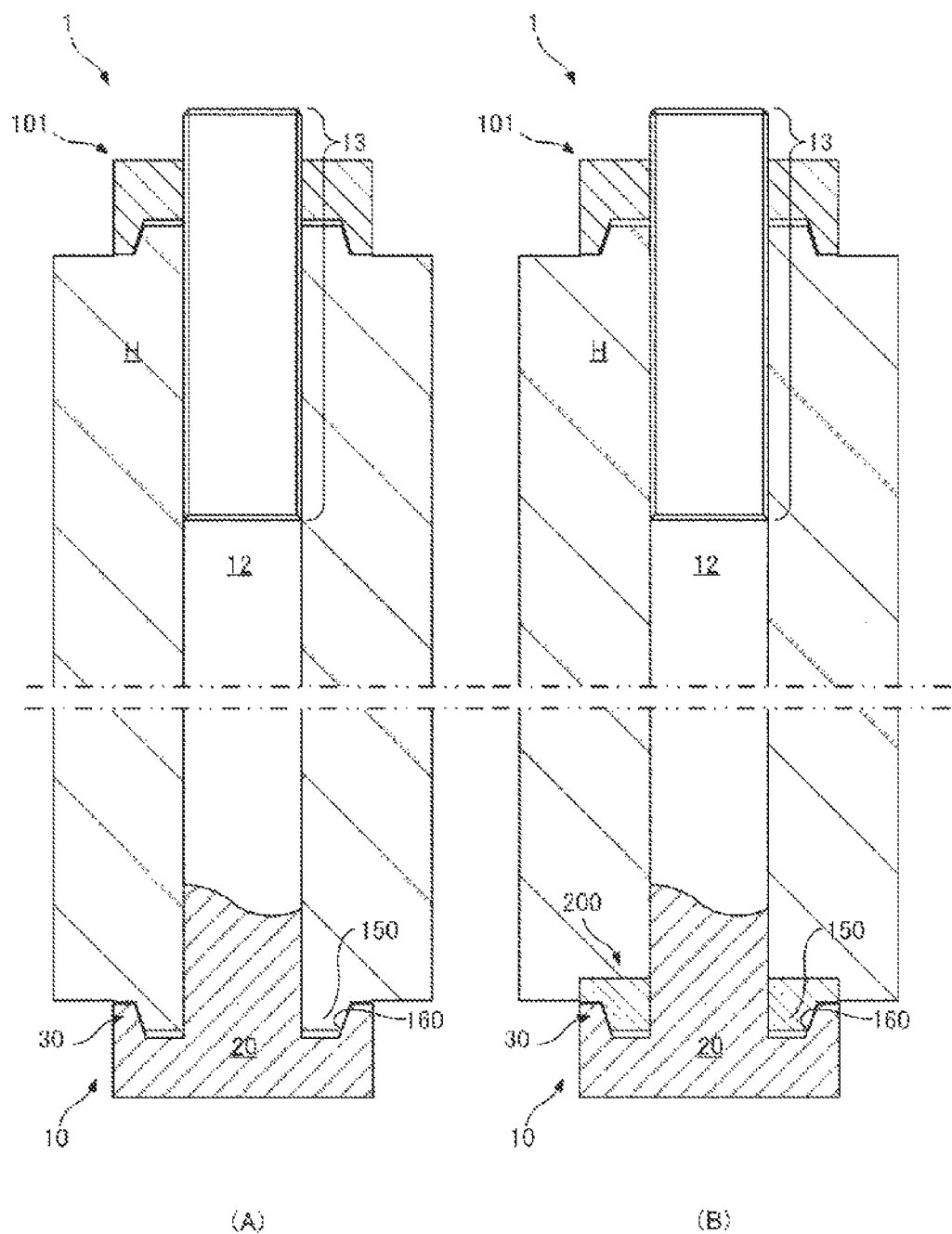
FIG. 29 is front cross-sectional views (A and B) according to a variant of a relative-rotation prevention structure of the present embodiment.

In the embodiments group, a case of forming the relative-rotation prevention structure 30 on the female screw is illustrated. The present disclosure is not limited thereto. As shown in (A) FIG. 29, the relative-rotation prevention structure 30 may be formed between a head 20 of the male screw 10 and the counterpart member (fastening target member H). Further, for example, as shown in (B) of FIG. 29, the relative-rotation prevention structure 30 may be formed between the first female screw 100 and the seated body 170.

Figure 30:
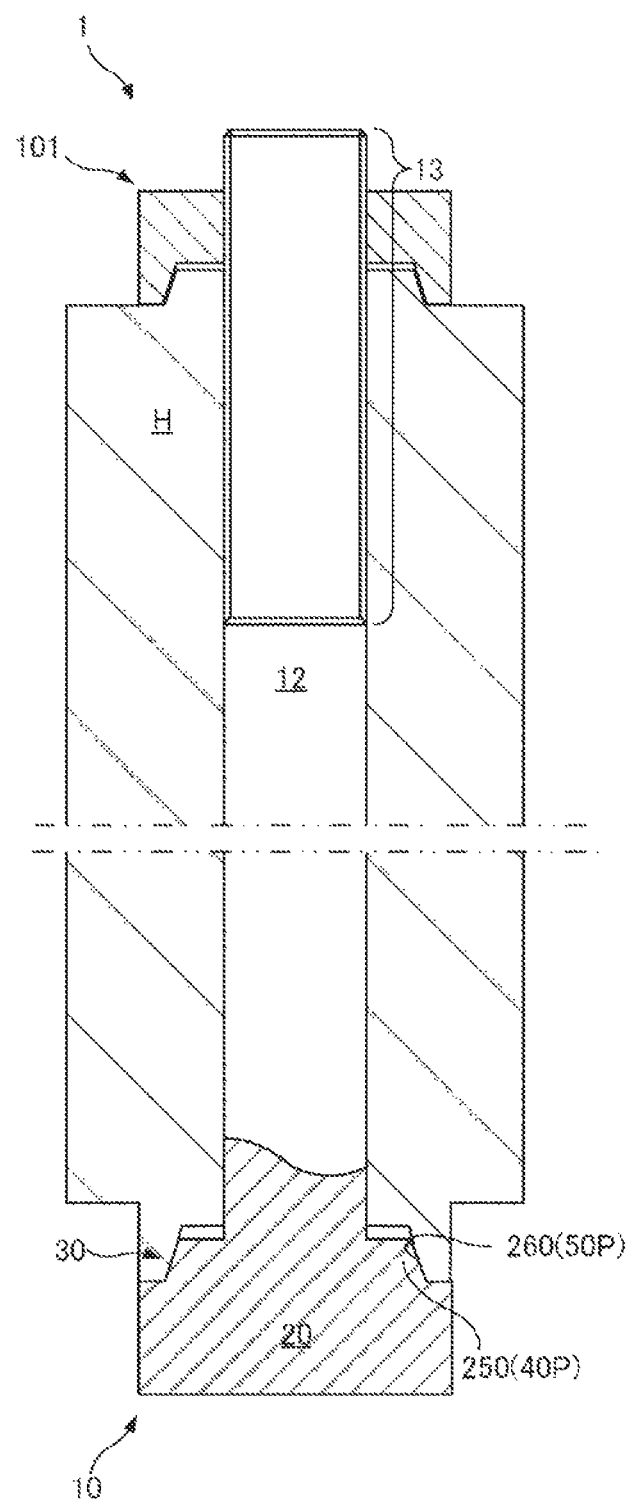
FIG. 30 is a front cross-sectional view according to a variant of a relative-rotation prevention structure of the present embodiment.

Further, in the embodiments group, a case of forming the screw-side deformation-capable section that receives therein and deforms the counterpart-side displacement section on the screw (male screw and/or female screw) is set forth. The present disclosure is not limited thereto. This relationship may be reversed. For example, the screw-side displacement section, which is displaced in the axial direction or the radial direction may be formed on the screw (male screw and/or female screw). Further, the counterpart-side deformation-capable section may be produced on the counterpart-side member (e.g., the fastening target member H or seated body). The counterpart-side deformation-capable section may be pressed against the screw-side displacement section and thus may be deformed and may displace in the radial direction or an axial direction. Specifically, as shown in FIG. 30, an annular protrusion 250 as a convex portion on the fastening target member H may be formed on the head 20 of the male screw 10. An annular second row protrusion 260 may be formed on the fastening target member H. A screw-side displacement section 40P that is displaced in the axial direction or the radial direction as it moves in the circumferential direction may be formed on the outer circumferential face of the annular first row protrusion 250 of the male screw 10. A shape and structure of the screw-side displacement section 40P may be equivalent to the counterpart-side displacement section 40 as described in the embodiments group. Further, a counterpart-side deformation-capable section 50P is formed on the inner circumferential face of the annular second row protrusion 260 on the fastening target member H. A structure of the counterpart-side deformation-capable section 50P may be equivalent to the screw-side deformation-capable section 50 as described in the embodiments group.

A case where the relative rotation (movement) prevention structure of the first and second embodiments prevents the relative rotation of the screw has been illustrated. The present disclosure is not limited thereto. For example, the first and second members other than the screw may be engaged with each other. The relative rotation (movement) prevention structure may prevent relative movement (including relative rotation) therebetween.

Figure 31:
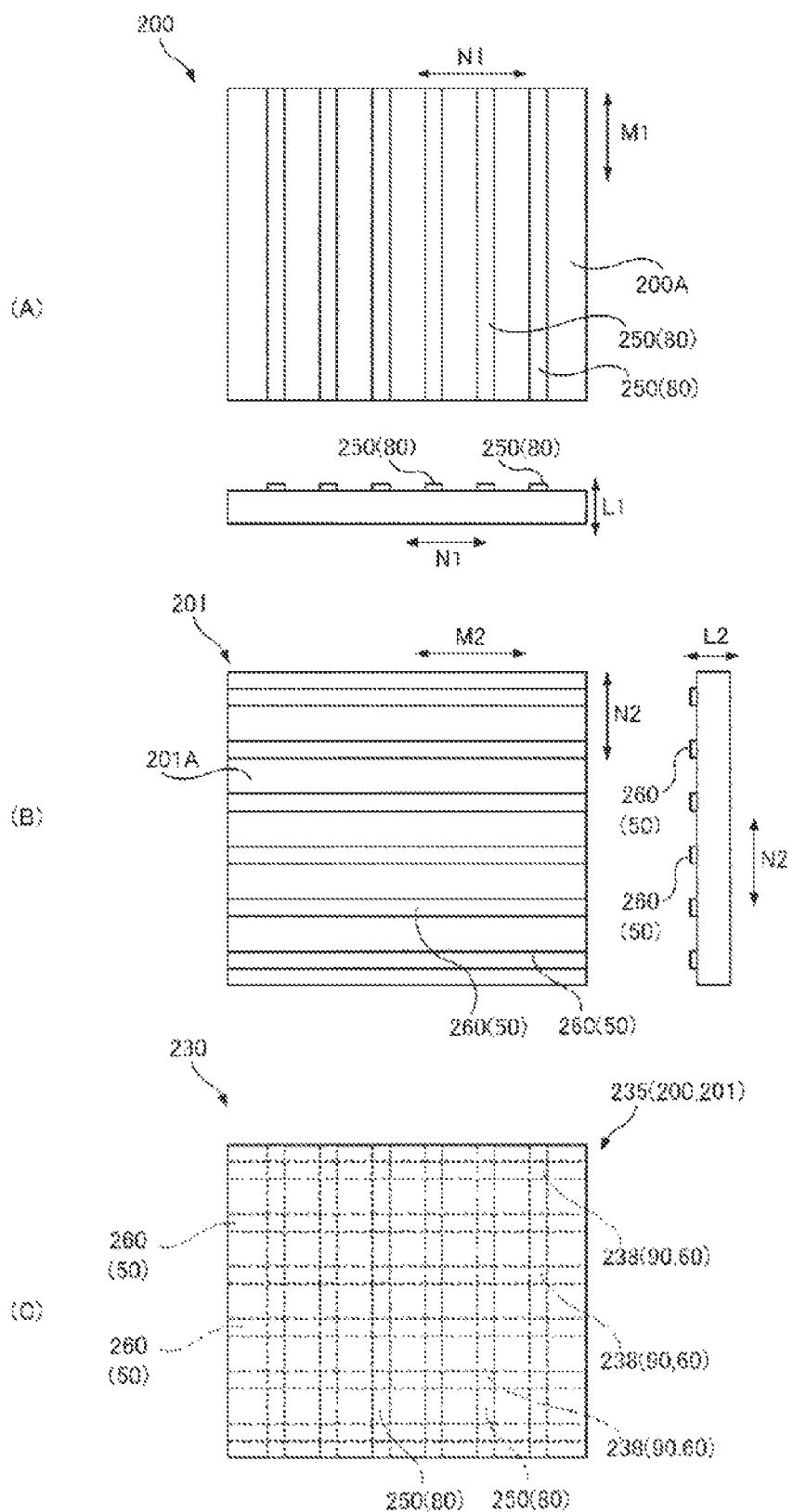
FIG. 31 is a front view and side view (A) of a first member, a front view and side view (B) of a second member, and a front view showing an engaged state of the first and second members in a relative-movement prevention structure according to a third embodiment.

In FIG. 31, there is shown an engagement mechanism 235 to which a relative-movement prevention structure 230 of a third embodiment is applied. This engagement mechanism 235 includes a first member 200 and a second member 201. In this embodiment, a first face 200A is formed on the first member 200, while a second face 201A is formed on the second member 201. When the two faces are brought into contact with each other and pressed against each other, the relative-movement prevention structure 230 is produced such that relative movement in the plane direction between the first member 200 and the second member 201 is prevented. Therefore, the engagement mechanism may be used for a so-called anti-slip, a brake, a positioning mechanism, etc. Further, in this embodiment, the first face 200A and the second face 201A become flat. The present disclosure is not limited thereto. The faces may be a curved face, a bent face, or an uneven surface.

The relative-movement prevention structure 230 includes a first row protrusion 250 as a first thread formed on the first face 200A of the first member 200, and a second row protrusion 260 as a second thread formed on the second face 201A of the second member 201.

The first row protrusion 250 is displaced in a plane-perpendicular direction L1 as it moves in a first reference face direction N1, which becomes a specific plane direction of the first face 200A. The first row protrusion 250 may press and deform the second row protrusion 260 serving as a counterpart-side member thereto. The first row protrusion 250 is embodied as a rod-shaped protrusion extending in a plane direction (in this example, referred to as a first thread extending direction M1) perpendicular to the first reference face direction N1. A plurality of first row protrusions 250 are arranged in a parallel state at an equal spacing along the first reference face direction N1.

The second row protrusion 260 is displaced in the plane-perpendicular direction L2 as it moves in a second reference face direction N2, which becomes a specific plane direction of the second face 201A. The second row protrusion 260 may press and deform the first row protrusion 250 as the counterpart-side member to the second row protrusion 260. The second row protrusion 260 is embodied as a rod-shaped protrusion extending in a plane direction perpendicular to the second reference face direction N2 (in this example, referred to as a second thread extension direction M2) perpendicular to the second reference face direction N2. A plurality of second row protrusions 260 are arranged in parallel at an equal spacing along the second reference face direction N2.

Further, when the first member 200 and the second member 201 is in contact with each other, the first thread extending direction M1 of the first row protrusion 250 and the second thread extending direction M2 of the second row protrusion 260 are angled to each other. In this example, the angle is set to 90°. Therefore, in a plan view, peaks of the first row protrusion 250 and the second row protrusion 260 intersect each other to form an intersection portion 238.

All or some of the first row protrusions 250 serve as a first deformation-capable section 80 that is depressed by itself by being depressed by the second row protrusion 260. Specifically, at the intersection portion 238 with the second row protrusion 260, the first deformation-capable section 80 is deformed by itself to be depressed in the plane-perpendicular direction L1, as shown in (A) of FIG. 32. This deformation produces a first displacement section 90. Therefore, the first deformation-capable section 80 is formed along a longitudinal direction of at least a distal end (a ridge face) of the first row protrusion 250.

The intersection portion 238 is formed as an intersection portion between the first row protrusion 250 and the second row protrusion 260 in a lattice shape. Therefore, the plurality of intersection portions 238 are distributed on a plane in a regular manner. Specifically, as shown in (C) of FIG. 31, the plurality of intersections 238 has an arrangement satisfying both a first regularity at which the plurality of first row protrusions 250 are arranged and a second regularity at which the plurality of second row protrusions 260 are arranged. Further, in (A) of FIG. 31, the first displacement section 40 is not produced because FIG. 31 shows the state before engagement.

The first deformation-capable section 80 may be made of a flexible material, for example, compared with the second row protrusion 260 of the second member 201. In this manner, the first deformation-capable section 80 that interferes with the second row protrusion 260 may be actively depressed by itself to actively produce the first displacement section 90. Further, the first deformation-capable section 80 may be constructed to have low rigidity compared to the second row protrusion 260. In this manner, the first deformation-capable section 80 that interferes with the second row protrusion 260 may actively elastically and/or plastically deform. For example, the entire second member 201 may be made of a high strength material compared with the first member 200. In this connection, the second member 201 may employ a material having increased strength secured by adding an additive to iron or by performing heat treatment.

Further, although not particularly shown, a width of a distal end surface of the second row protrusion 260 (i.e., a width of the row protrusion) may be larger than that of the first row protrusion 250. In this manner, the rigidity of the second row protrusion 260 is higher than that of the first row protrusion 250, such that the first row protrusion 250 may be actively depressed.

Figure 32:
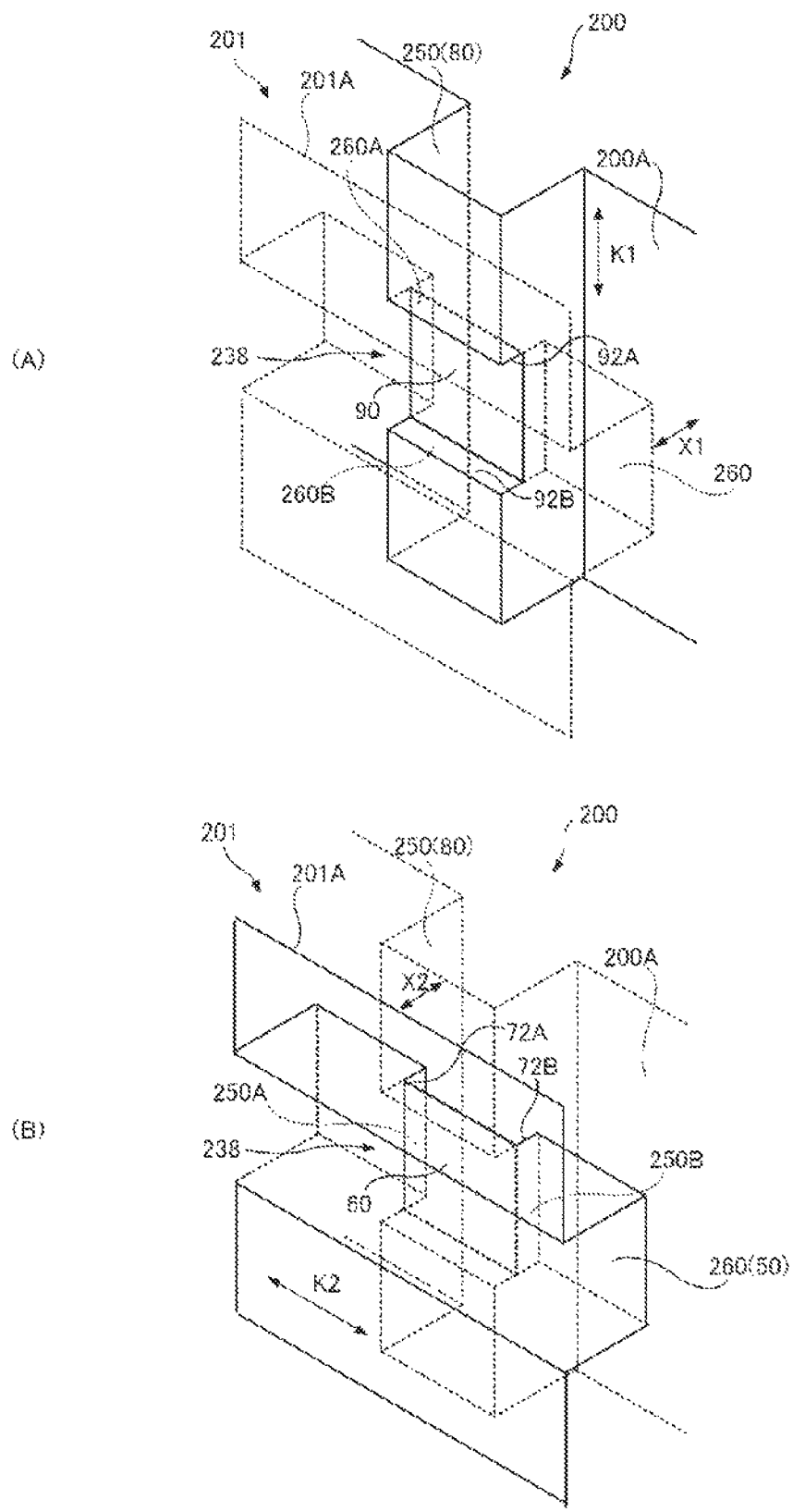
FIG. 32 is partially enlarged perspective views (A and B) of the relative-movement prevention structure.

Further, FIG. 32 is a partial enlarged view of a single row protrusion. This shows an example where the first deformation-capable section 80 as the single (strip-shaped) protrusion intersects a single second row protrusion 260 to produce a single depression (first displacement section 90). In practice, however, the first deformation-capable section 80 intersects a plurality of second row protrusions 260, such that a plurality of first displacement sections 90 are produced and arranged at a spacing along the longitudinal direction of the first deformation-capable section 80.

Further, as shown in (C) of FIG. 31, a plurality of first displacement sections 90 (intersection portions 238) are widened in a planar manner and distributed on the first face 200A. Therefore, even when relative positions of the first member 200 and the second member 201 mismatch each other, the relative movement prevention effect may be exhibited at all times as long as a direction in which the first row protrusion 250 extends and a direction in which the second row protrusion 260 extends are different from each other. Further, even when the spacings between the plurality of first displacement sections 90 are random, the relative movement restricting effect may always be achieved stably when the number thereof is large.

As shown in (A) of FIG. 32, the opposite first produced faces 92A and 92B that determine the depression shape of the first displacement section 90 are faces, which are enlarged (displace) in height and width directions of the first row protrusion 250. In other words, the first produced faces 92A and 92B become planes that coincide with or parallel to a direction in which a side of the second row protrusion 260 extends.

Further, the first produced faces 92A and 92B are engaged with the sides of the second row protrusion 260, so that the relative movement in the plane direction between the second member 201 and the first member 200 in this engagement direction K1 is restricted. This engagement direction K1 (restricting direction of relative movement) becomes a direction having an angle with respect to the first produced faces 92A and 92B. Specifically, the direction K1 becomes a plane-perpendicular direction with respect to the first produced faces 92A and 92B.

In one example, the second row protrusion 260 as the counterpart-side member to the first displacement section 90 has a pair of second deformation-inducing faces 260A and 260B on both sides thereof, respectively.

The first deformation-capable section 80 is depressed by being pressed against the second deformation-inducing faces 260A and 260B, so that first produced faces 92A and 92B are produced. In other words, one second deformation-inducing face 260A and one first produced face 92A abut each other, while the other second deformation-inducing face 260B and the other first produced face 92B abut each other.

Figure 33:
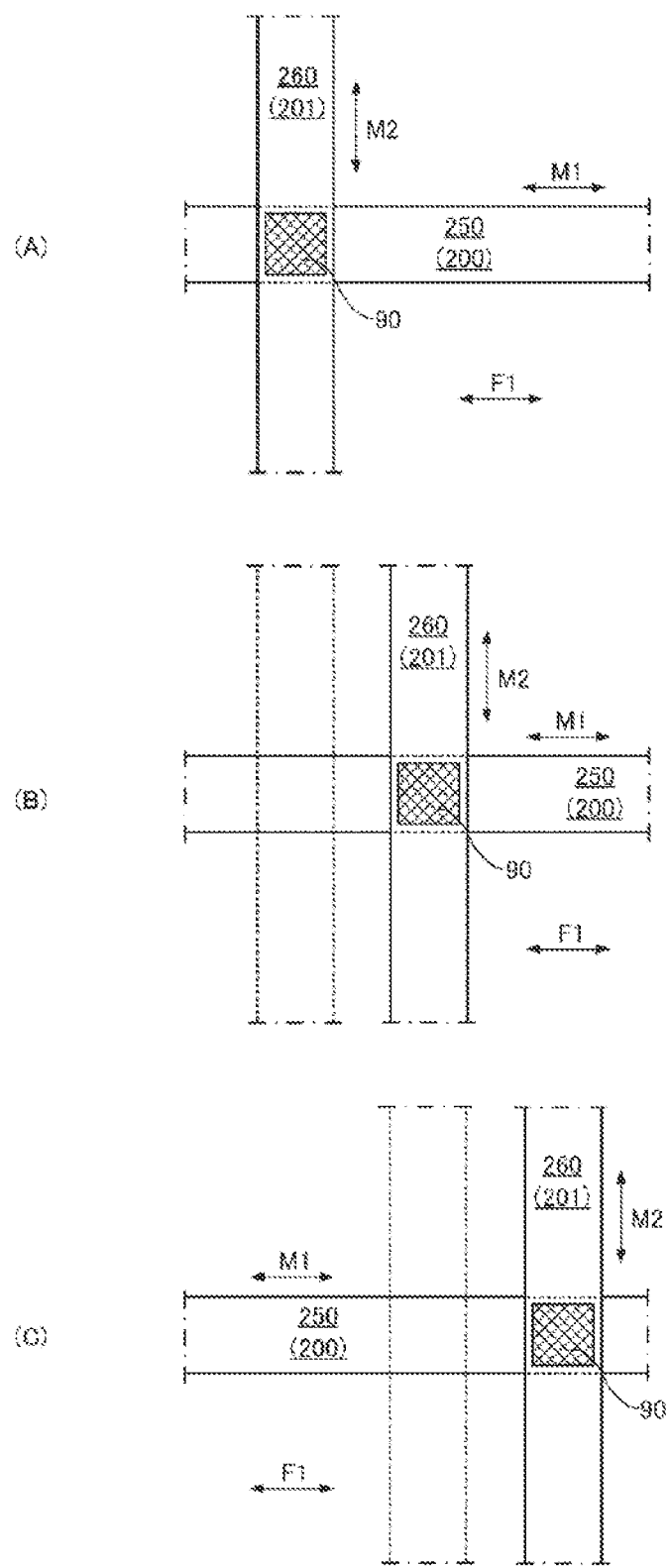
FIG. 33 is partial enlarged views (A to C) to explain a transition state of an intersection of the relative-movement prevention structure.

Next, referring to FIG. 33, the effect of the movement of the first displacement section 90 will be described. Further, in this example, the first displacement section 90 is shown in a plan view. As shown in a transition from (A) to (C) in FIG. 33, it is assumed that the first displacement section 90 and the second row protrusion 260 are engaged with each other and thus resist against each other, and the first member 200 and the second member 201 forcibly move relative to each other in a direction F1 different from the second thread extending direction M2 where the second row protrusion 260 extends. In this connection, the first displacement section 90 formed at the intersection region between the first row protrusion 250 and the second row protrusion 260 moves relative to the first member 200. Specifically, the first displacement section 90 (depression) moves along the longitudinal direction (first thread extending direction M1) of the distal end of the first row protrusion 250.

More specifically, the depression formed in the first row protrusion 250 moves in the longitudinal direction while the elastic deformation or plastic deformation is repeated. Deformation resistance in the elastic deformation or plastic deformation may act as a restricting force of the relative movement between the first member 200 and the second member 201.

In other words, in order to move the first member 200 and the second member 201 relative to each other in a F1 direction, it is necessary to deform the first deformation-capable section 80 to move the first displacement section 90. Thus, a corresponding external force (energy) is required. Therefore, the resistance at the deformation prevents the relative movement. In another example, when a corresponding external force (energy) increases, the movement of the first displacement section 90 may be allowed, thereby to allow the relative movement when necessary.

In addition, when the relative movement direction F1 between the first member 200 and the second member 201 coincides with the second thread extending direction M2, the first displacement section 90 may not restrict the relative movement. Therefore, in the relative movement along the second thread extending direction M2, the second displacement section 60 to be described later may act as restricting means.

In this embodiment, as shown in (B) of FIG. 32, the first displacement section 90 is produced with respect to the first deformation-capable section 80, while the second displacement section 60 as depressed in a height direction of the protrusion is produced on the second row protrusion 260 at the common intersection portion 238. That is, all or some of the second row protrusions 260 of the second member 201 act as the second deformation-capable section 50, and is pressed against the first row protrusion 250 as a counterpart-side member thereto, and thus is partially deformed to be depressed inwardly in the radial direction. This deformation produces the second displacement section 60.

The first row protrusion 250 as the counterpart-side member to the second displacement section 60 has, on both sides thereof, a pair of first deformation-inducing faces 250A and 250B, respectively.

In one example, the second deformation-capable section 50 is depressed by being pressed against the first deformation-inducing faces 250A and 250B to produce second produced faces 72A and 72B. In other words, one first deformation-inducing face 250A and one second produced face 72A abut each other, while the other second deformation-inducing face 250B and the other second produced face 72B abut each other. As a result, the relative movement in the plane direction between the first member 200 and the second member 201 in the engagement direction K2 is restricted.

Figure 34:
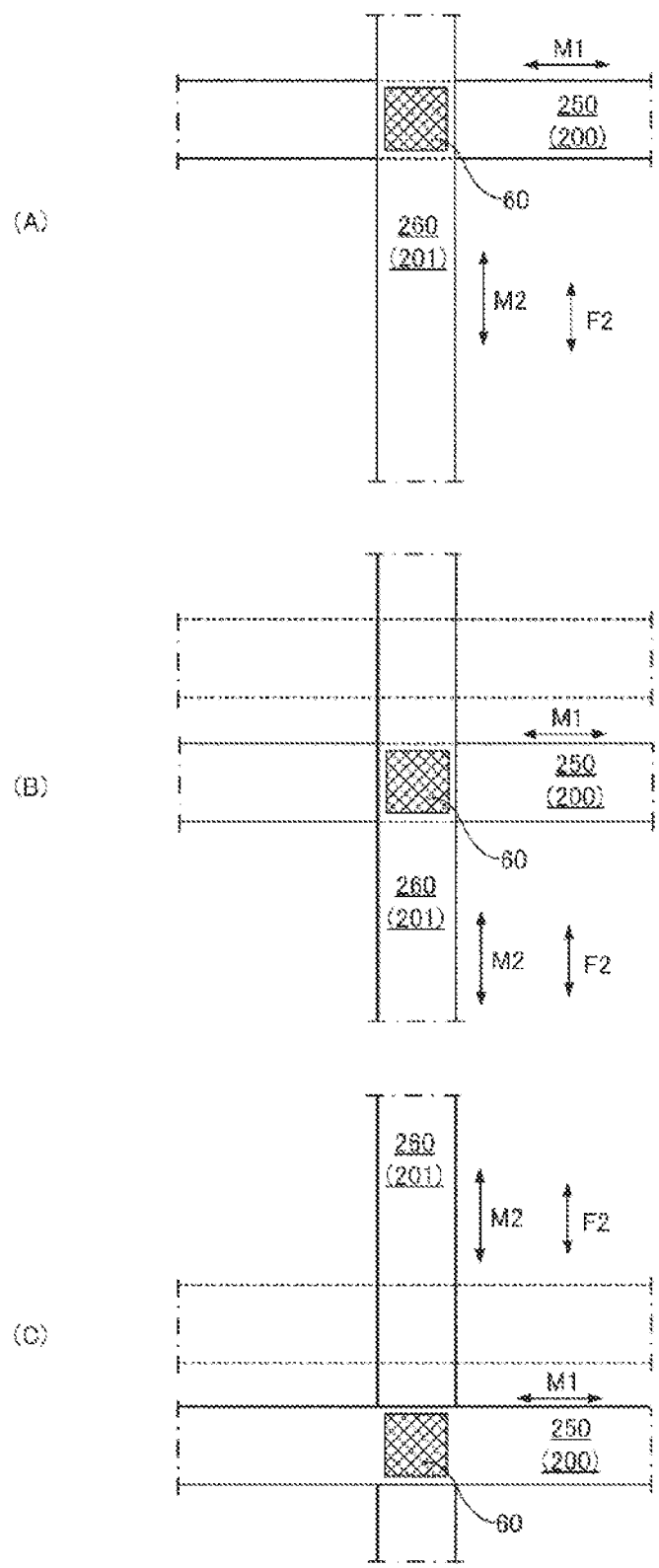
FIG. 34 is partial enlarged views (A to C) to explain a transition state of an intersection of the relative-movement prevention structure.

Next, with reference to FIG. 34, the effect of the movement of the second displacement section 60 will be described. Further, in this example, the second displacement section 60 is shown in a plan view. As shown in a transition from (A) to (C) in FIG. 34, it is assumed that the second displacement section 90 and the first row protrusion 250 are engaged with each other and thus resist against each other, and the first member 200 and the second member 201 forcibly move relative to each other in a direction F2 different from the first thread extending direction M1. In this connection, the second displacement section 60 formed at the intersection region between the first row protrusion 250 and the second row protrusion 260 moves relative to the second member 201. Specifically, the second displacement section 60 (depression) moves along the longitudinal direction of the distal end of the second row protrusion 260.

More specifically, the depression formed in the second row protrusion 260 moves in the longitudinal direction while the elastic deformation or plastic deformation is repeated. Deformation resistance in the elastic deformation or plastic deformation may act as a restricting force of the relative movement between the first member 200 and the second member 201.

In other words, in order to move the first member 200 and the second member 201 relative to each other in a F2 direction, it is necessary to deform the second deformation-capable section 50 to move the second displacement section 60. Thus, a corresponding external force (energy) is required. Therefore, the resistance at the deformation prevents the relative movement. In another example, when a corresponding external force (energy) increases, the movement of the second displacement section 60 may be allowed, thereby to allow the relative movement when necessary.

In addition, when the relative movement direction F2 between the first member 200 and the second member 201 coincides with the first thread extending direction M1, the second displacement section 60 may not restrict the relative movement. Therefore, in the relative movement along the first thread extending direction M1, the first displacement section 90 as described above may act as restricting means.

As described above, the relative movement in the F1 direction (see FIG. 33) between the first member 200 and the second member 201 is restricted by the engagement between the first displacement section 90 and the second row protrusion 260. The engagement between the second displacement section 60 and the first row protrusion 250 restricts the relative movement in the F2 direction (see FIG. 34) between the first member 200 and the second member 201. This synergistic effect may prevent the first member 200 and the second member 201 from performing the relative movement in all plane directions.

Further, as shown in (A) of FIG. 32, while the first member 200 and the second member 201 are engaged with each other, a clearance gap X1 may be formed between a distal end edge of the second row protrusion 260 and the first face 200A of the first member 200 (defined as a base face of the first row protrusion 250). Further, a depth of the first displacement section 90 produced in the first row protrusion 250 is smaller than a height of the first row protrusion 250. In this manner, an elastically deformed region whose a surrounding is open can be formed at the intersection portion 238 of the first row protrusion 250 and at the proximal end of the first row protrusion 250. When releasing the pressed state between the first member 200 and the second member 201 from each other, it is easy to restore an entirety or a portion of the produced first displacement section 90 to its original state before the production thereof.

As shown in (B) of FIG. 32, while the first member 200 and the second member 201 are engaged with each other, a clearance gap X2 may be formed between a distal end edge of the first row protrusion 250 and the second face 201A of the second member 201 (defined as a base face of the second row protrusion 260). Further, a depth of the second displacement section 60 produced in the second row protrusion 260 is smaller than a height of the second row protrusion 260. In this manner, an elastically deformed region whose a surrounding is open can be formed at the intersection portion 238 of the second row protrusion 260 and at the proximal end of the second row protrusion 260. When releasing the pressed state between the first member 200 and the second member 201 from each other, it is easy to restore an entirety or a portion of the produced second displacement section 60 to an original state thereof before the production.

Figure 35:
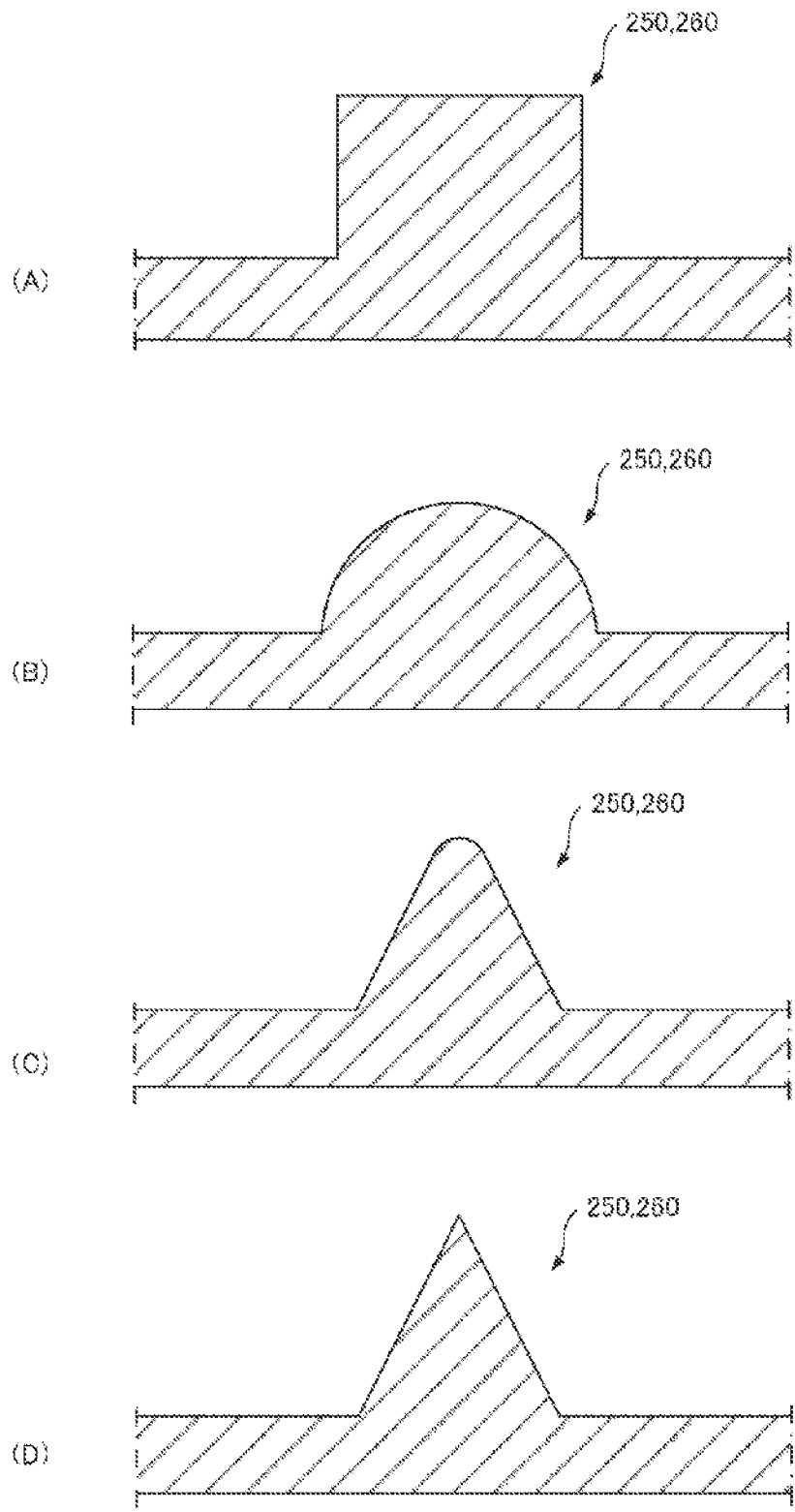
FIG. 35 is enlarged cross-sectional views (A to D) showing an example of a cross-sectional shape of a linear protrusion of the relative-movement prevention structure.

Further, in the embodiment, as shown in (A) of FIG. 35, an example where a cross-sectional shape orthogonal to the longitudinal direction of each of the first and second row protrusions 250 and 260 is rectangular is illustrated. The present disclosure is not limited thereto. For example, it may suffice that the cross sectional shape may be substantially trapezoid. Thus, making the distal end of the protrusion into a relatively wide plane may allow the surface pressure to be uniformly dispersed. This increases the elastic deformation amount and reduces the plastic deformation amount. The first member 200 and the second member 201 are repeatedly used. In one example, as shown in (B) of FIG. 35, it may suffice that the cross-sectional shape of the distal end may be arcuate. As shown in (C) of FIG. 35, it may suffice that the cross-sectional shape of the distal end may be a triangle with a round peak. Further, as shown in (D) of FIG. 35, it may suffice that the cross-sectional shape of the distal end is made into a triangle with a sharp peak (a saw blade shape). In this case, receiving the surface pressure unevenly may allow increasing an unbalanced weight of the distal end to amplify the deformation amount. This actively plastically deform the tip end.

Figure 36:
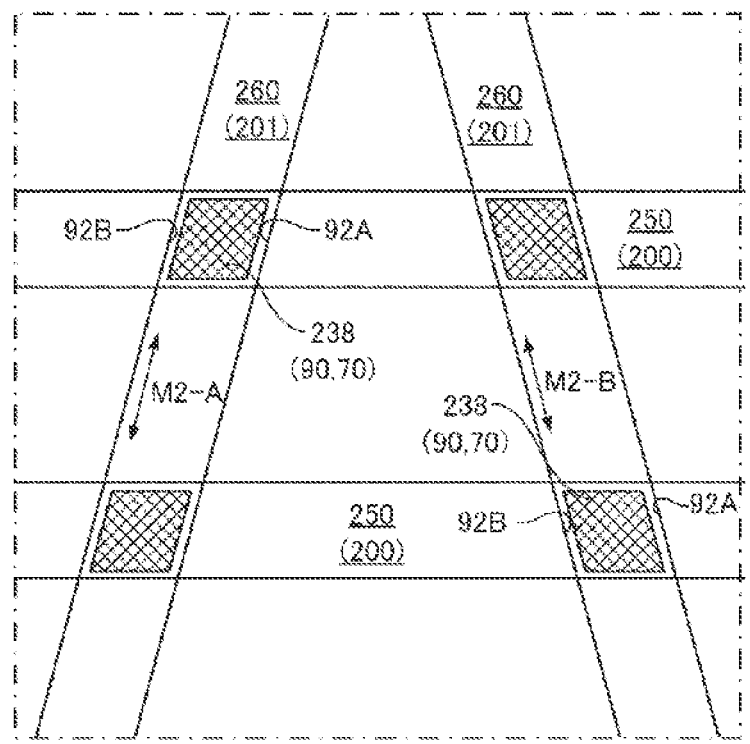
FIG. 36 is plan views (A to D) showing a variant of the relative-movement prevention structure.
Figure 36:
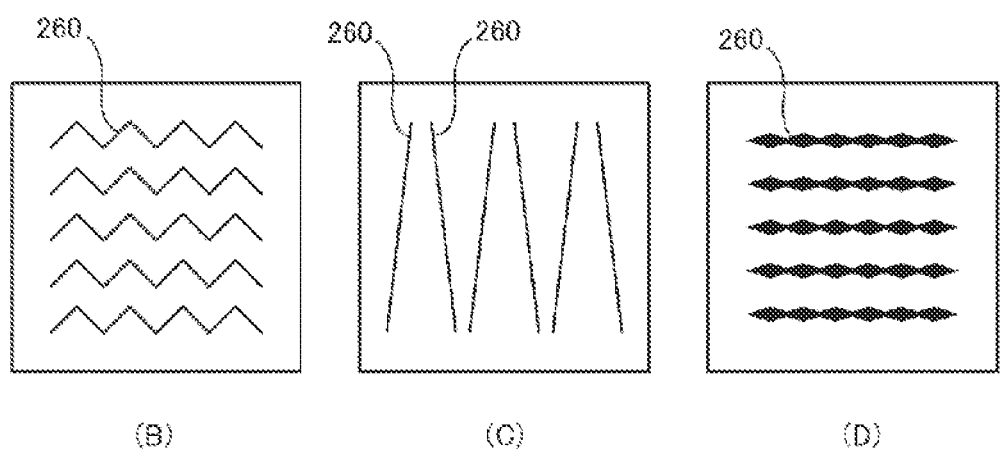

Further, in the embodiment, an example where all of the first produced faces 92A and 92B formed on the plurality of first displacement sections 90 extend in the same direction is set forth. The present disclosure is not limited thereto. For example, as shown in FIG. 36, it is preferable that a side of the second row protrusion 260 as the second thread extends in a plurality of different directions. Specifically, as shown in (A) of FIG. 36, a plurality of types of extending directions M2-A and M2-B of the plurality of second row protrusions 260 may be different from each other. In this manner, the plurality of first produced faces 92A and 92B produced on the first row protrusion 250 via the pressing force of the second row protrusion 260 extend in different directions. As a result, when attempting to move the first member 200 and the second member 201 relative to each other along one extending direction M2-A of the second row protrusion 260, the first produced faces 92A and 92B extending in the other extending direction M2-B are engaged with the second row protrusion 260, thereby to restrict the relative movement. Further, when attempting to move the first member 200 and the second member 201 relative to each other along the other extending direction M2-B of the second row protrusion 260, the first produced faces 92A and 92B extending in one extending direction M2-A are engaged with the second row protrusion 260, thereby to restrict the relative movement. Therefore, even when the second row protrusion 260 is not actively deformed to produce the second displacement section 60, it is possible to restrict the relative movement in all directions between the first member 200 and the second member 201.

Further, in this case, as shown in (B) of FIG. 36, a single or multiple second row protrusions 260 may extend in a zig zag manner. As shown in (C) of FIG. 36, the extending directions of the plurality of second row protrusions 260 may be different from each other. As shown in (D) of FIG. 36, a width of the strip of each of the single or plural second row protrusions 260 may be expanded or reduced in the extending direction so that the side faces thereof extend in different directions.

Next, with reference to FIG. 37, a variant of the engagement mechanism 235 of the third embodiment will be described. In this example, for convenience of description, only a ridge line (extending direction) of the first row protrusion 250 formed on the first member 200 and a ridge line (extending direction) of the second row protrusion 260 formed on the second member 201 are shown. Further, the engagement mechanism 235 is shown such that the first member 200 is shown in a front view as seen from the first face 200A and the second member 201 is shown in a rear view as seen from an opposite face to the second face 201A. Therefore, overlapping the first member 200 and the second member 201 as they are may define the engagement mechanism 235.

Figure 37:
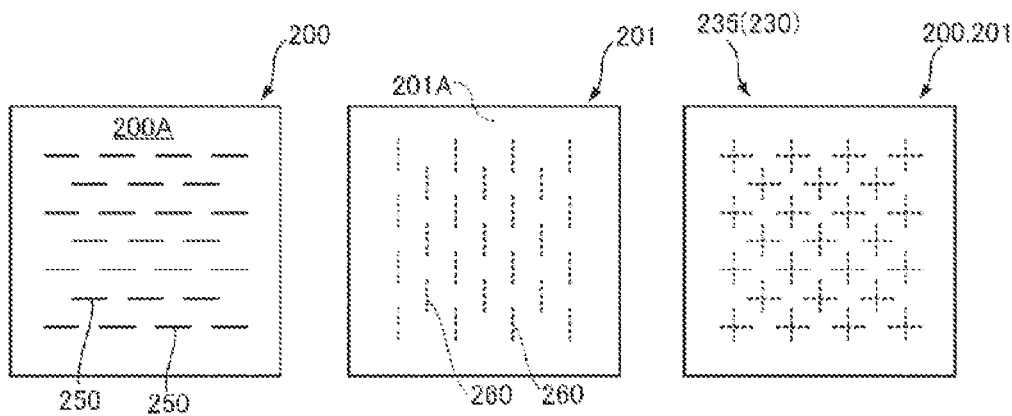
FIG. 37 is plan views (A to C) showing a variant of the relative-movement prevention structure.
Figure 37:
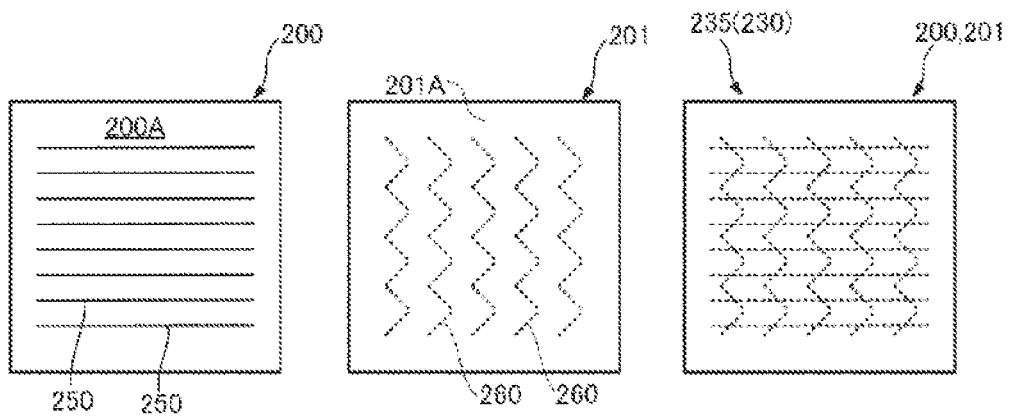
Figure 37:
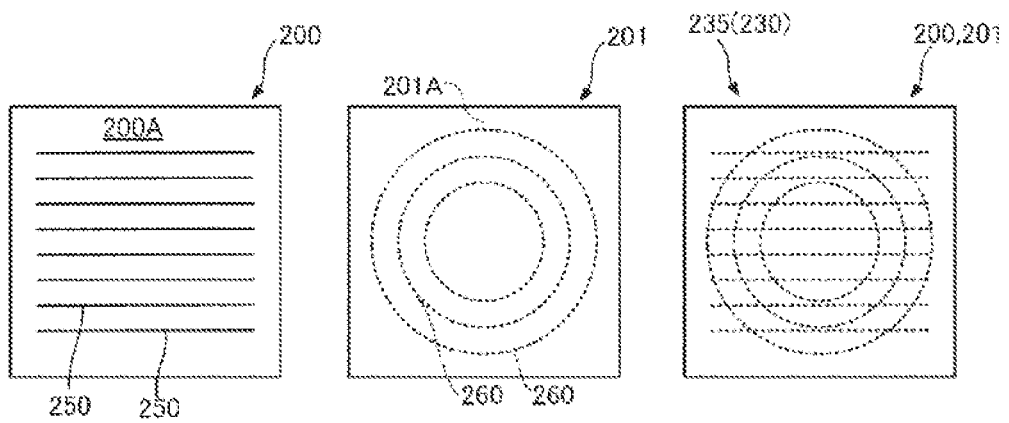

The first member 200 of the engagement mechanism 235 shown in (A) FIG. 37 has a plurality of first row protrusions 250 arranged in series at a desired spacing in the longitudinal direction. Further, the plurality of first row protrusions 250 are arranged in parallel in a width direction. In a similar manner, the second member 201 has a plurality of second row protrusions 260 arranged in series at a desired spacing in the longitudinal direction. Further, the plurality of second row protrusions 260 are arranged in parallel in a width direction.

The extending direction of the first row protrusion 250 of the first member 200 and the extending direction of the second row protrusion 260 of the second member 201 have a relative difference of 90°. Further, rotating the first member 200 by 90°, the first member 200 may become the second member 201 itself. Thus, the same base material may be used therebetween. In this engagement mechanism 235, a first displacement section and a second displacement section are formed at an intersection portion of the first row protrusion 250 and the second row protrusion 260 to restrict the relative movement therebetween.

The first member 200 of the engagement mechanism 235 shown in (B) of FIG. 37 has a plurality of first row protrusions 250 arranged in parallel at a desired spacing in the width direction. Each first row protrusion 250 extends in a straight line shape. The second member 201 has a plurality of second row protrusions 260 arranged in parallel at a desired spacing in the width direction. Each second row protrusion 260 extends in a zigzag manner (meandering manner).

The extending direction of the first row protrusion 250 of the first member 200 and the extending direction of the second row protrusion 260 of the second member 201 have a desired relative difference. In this engagement mechanism 235, a first displacement section and a second displacement section are formed at the intersection portion of the first row protrusion 250 and the second row protrusion 260 to restrict the relative movement therebetween. Further, because the second row protrusion 260 extends in the zigzag manner (meandering manner), a shape of the first displacement section has a plurality of types.

The first member 200 of the engagement mechanism 235 illustrated in (C) of FIG. 37 has a plurality of first row protrusions 250 arranged in parallel at a desired spacing in the width direction. Each first row protrusion 250 extends in a straight line shape. The second member 201 has the second row protrusion 260 extending in a full-circle annular manner. The plurality of second row protrusions 260 are different in diameter from each other and are arranged concentrically.

The extending direction of the first row protrusion 250 of the first member 200 and the extending direction of the second row protrusion 260 of the second member 201 have various relative differences. In this engagement mechanism 235, a first displacement section and a second displacement section are formed at the intersection portion of the first row protrusion 250 and the second row protrusion 260 to restrict the relative movement therebetween. As the second row protrusion 260 extends annularly, there are a plurality of types of shapes of the first displacement section.

Figure 38:
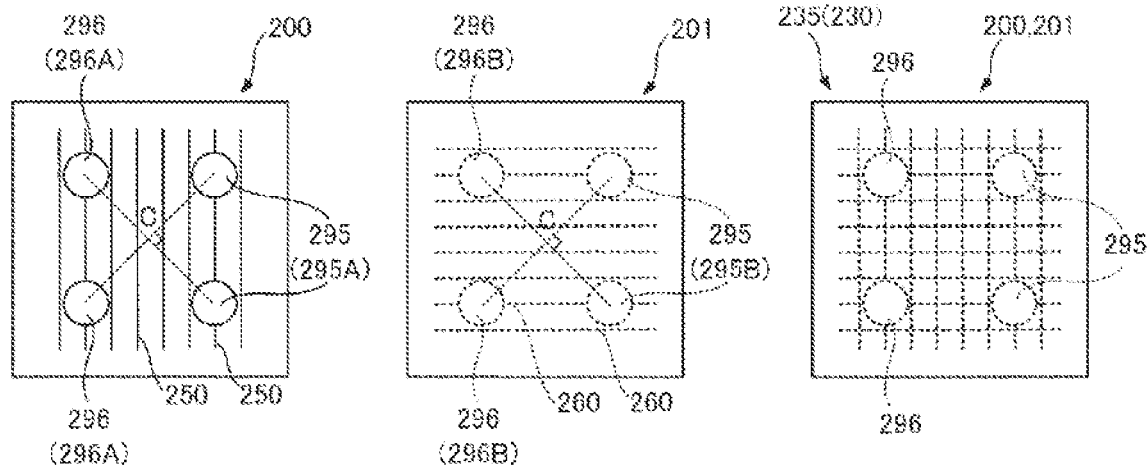
FIG. 38 is plan views (A and B) showing a variant of the relative-movement prevention structure.
Figure 38:
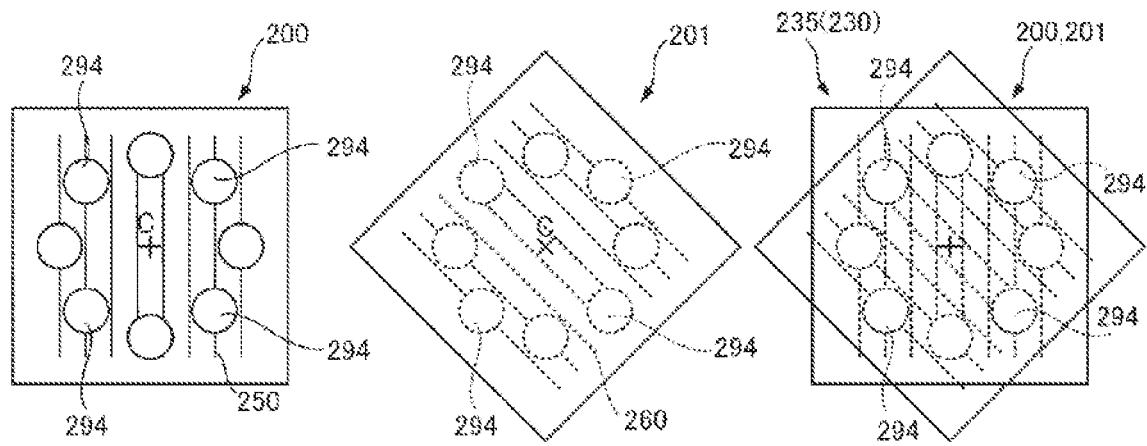

Referring to FIG. 38, another variant of the relative-movement prevention structure 230 of the third embodiment will be described. As shown in (A) of FIG. 38, the relative-movement prevention structure 230 has a stopper section (first and second stoppers 295 and 296) to limit an interference distance W (overlapping amount) between the first thread (first row protrusion 250) of the first member 200 and the second thread (second row protrusion 260) of the second member 201.

Figure 39:
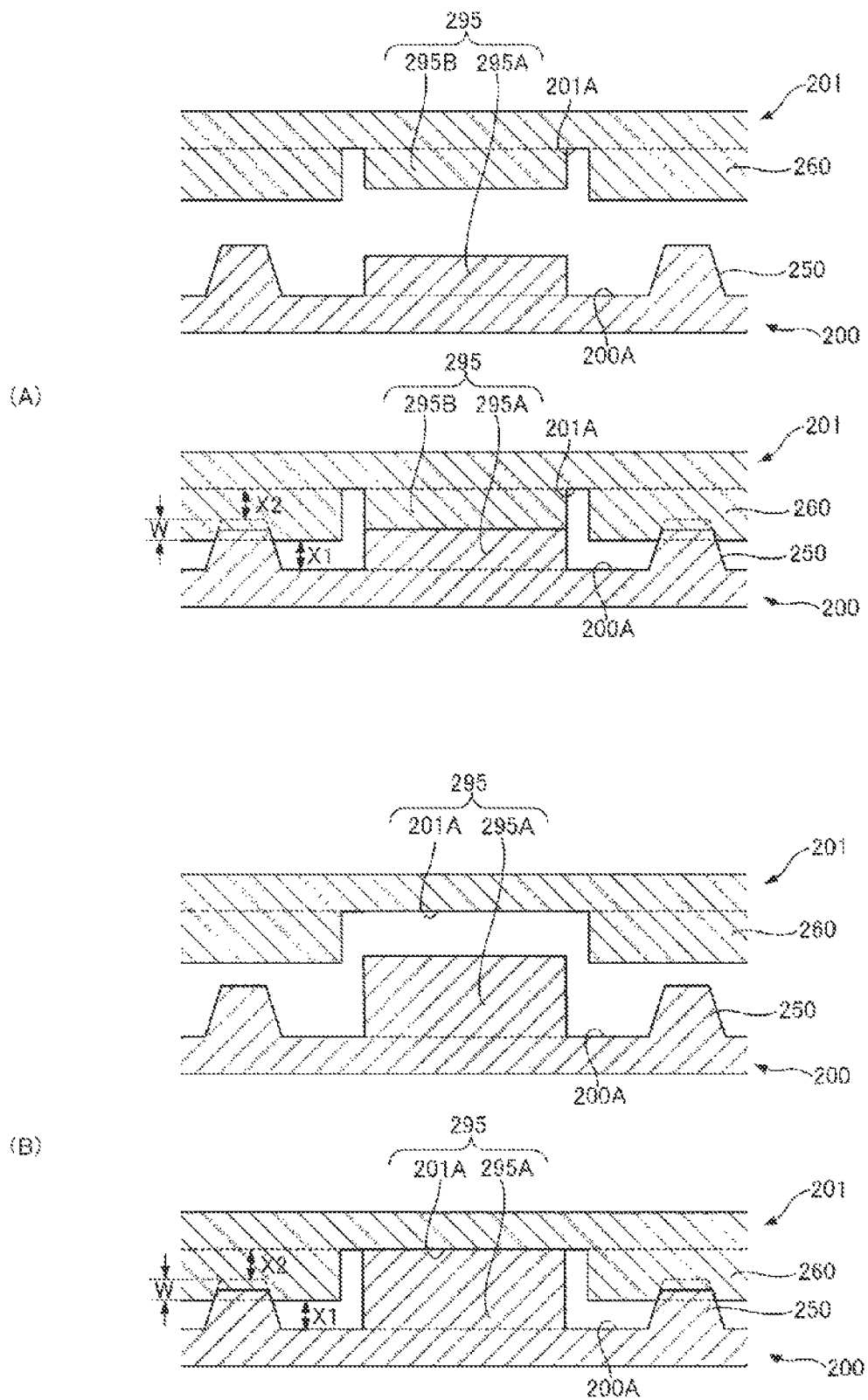
FIG. 39 is cross-sectional views (A and B) showing an operation and a variant of a stopper section of the relative-movement prevention structure.

As shown in (A) of FIG. 39, the first stopper 295 is a member interposed between the first face 200A of the first member 200 and the second face 201A of the second member 201. When approaching the first member 200 and the second member 201 with each other, the first stopper 295 becomes an interruption member. While respectively ensuring clearance gaps X1 between the first face 200A and a distal end face of the second row protrusion 260 and between the second face 201A and a distal end face of the first row protrusion 250, the interference distance W may be established. Further, a structure of the second stopper 296 is exactly the same as that of the first stopper.

More specifically, the first stopper 295 includes a stopper piece 295A formed on the first member 200 and a stopper piece 295B formed on the second member 201. In this example, the piece becomes a disk-shaped protrusion or a column-shaped protrusion. Therefore, the interference distance W is restricted by bringing the pair of stopper pieces 295A and 295B of the first stopper 295 into contact with each other.

Referring back to (A) of FIG. 38, the second stopper 296 includes a stopper piece 296A formed on the first member 200 and a stopper piece 296B formed on the second member 201. In this example, the piece becomes a disk- or column-shaped protrusion. The interference distance W is determined by bringing the pair of stopper pieces 296A and 296B of the second stopper 296 into contact with each other.

When the first and second stoppers 295 and 296 have the above configurations, the interference distance W may be kept constant at all times, irrespective of the pressing force acting between the first member 200 and the second member 201. Accordingly, this may stabilize the prevention force of the relative movement by the relative-movement prevention structure 230. Further, it becomes possible to form each of elastic deformation regions (each of clearance gaps X1 and X2) at the proximal end of each protrusion and at the intersection portion of the first row protrusion 250 and the second row protrusion 260. When releasing the pressed state of the first member 200 and the second member 201 from each other, it is possible to restore an entirety or a portion of each of the produced first and second displacement sections to an original state thereof before the production.

Referring back to (A) of FIG. 38, two first stoppers 295 are formed at the same distance from a virtual point C and are formed to have a phase difference of 90° around the virtual point C therebetween. Two second stoppers 296 are formed at the same distance from the virtual point C and are formed to have a phase difference of 90° around the virtual point C therebetween. Further, the second stopper 296 is located at a position that has a rotation symmetry relationship with that of the first stopper 295 with respect to the virtual point C. In this example, a phase difference in this rotation symmetry is set to 180 degrees.

Figure 40:
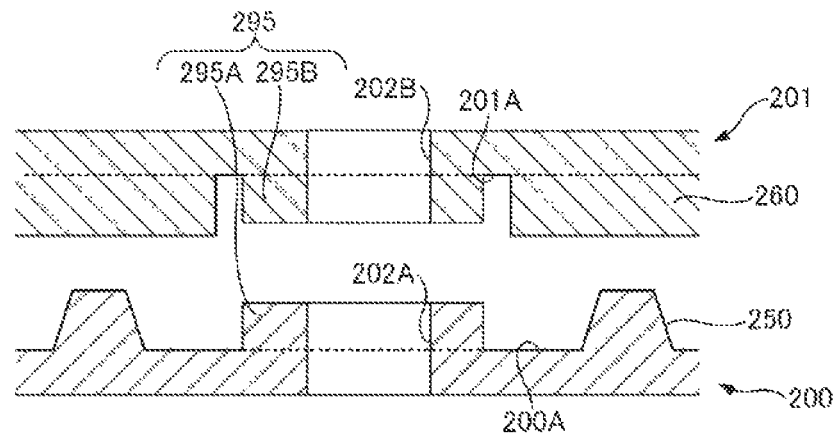
FIG. 40 is a cross-sectional view showing an operation and a variant of a stopper section of the relative-movement prevention structure.
Figure 40:
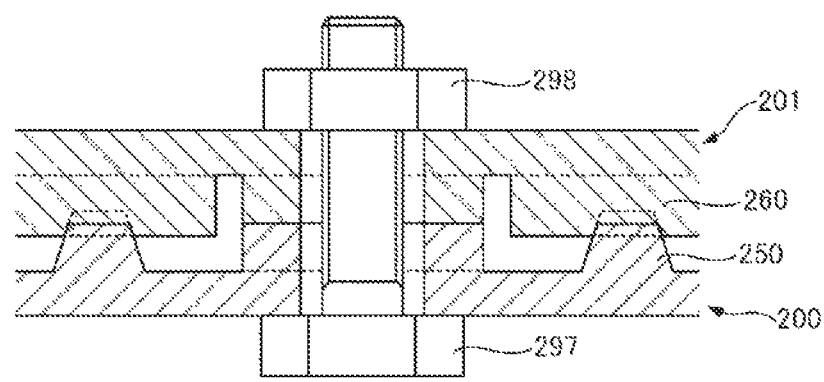

Further, an example where stopper pieces are formed on both of the first member 200 and the second member 201 is illustrated. However, as shown in (B) of FIG. 39, the stopper piece may be formed only on one of the first member 200 and the second member 201, while the other thereof may have a planar state (that is, a state in which no row protrusion exists on the first and second face 200A and 201A). Furthermore, as shown in FIG. 40, through-holes 202A and 202B are formed in both the first member 200 and the second member 201. For example, the first member 200 and the second member 201 may be fastened by a male screw 297 inserted into the through-holes 202A and 202B commonly and a female screw 298 screw-engaging with the male screw 297. According to this structure, the relative-rotation prevention structure allows the relative movement in the plane direction between the first member 200 and the second member 201 to be restricted in advance, such that a shearing force is not applied to the male screw 297. Further, the male screw 297 and female screw 298 may function as an urging mechanism for applying a pressing force to the first member 200 and the second member 201.

In (A) of FIG. 38, an example of placing each stopper section at each of four corners of a virtual square is shown. In this manner, the first member 200 and the second member 201 have the same shape. Thus, the first member 200 and the second member 201 may be made of the same base material. Therefore, a pairs of base materials may be prepared and face with each other such that the row protrusions intersect each other in a grid manner. In this way, the engagement mechanism 235 may be obtained.

Further, the arrangement of the stopper sections is not limited to a square arrangement. For example, as shown in (B) of FIG. 38, 8 stopper sections 294 may be arranged to be equidistant from the virtual point C, and may be respectively arranged in eight positions with a 45° phase difference from each other about the virtual point C. A pair of common base materials may be prepared. In this connection, one acts as the first member 200, while the other acts as the second member 201. Thus, the engagement mechanism 235 may be obtained. In this connection, an angle at which the first row protrusion 250 of the first member 200 and the second row protrusion 260 of the second member 201 intersect with each other may be randomly selected from three kinds of phase differences (45 degrees, 90 degrees, 135 degrees) having a 45° spacing at which the stopper pieces may contact each other.

Figure 41:
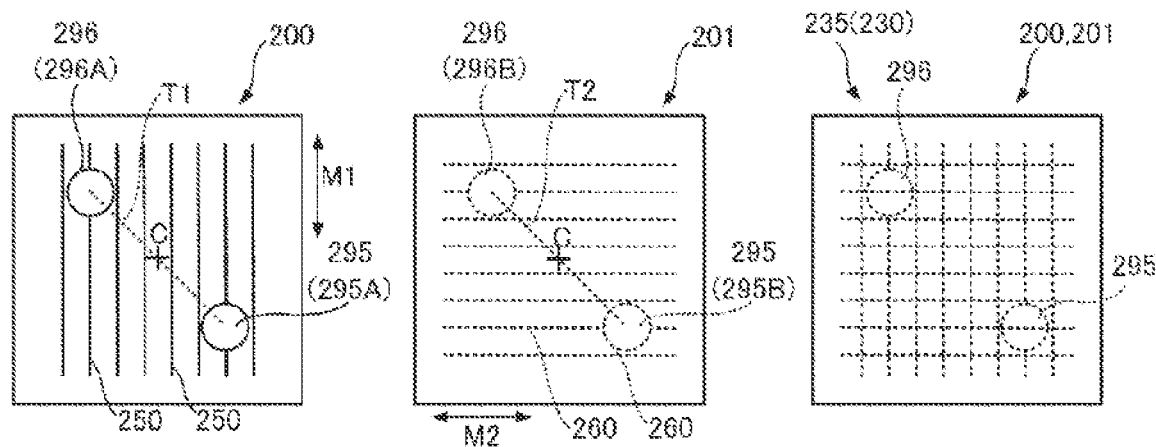
FIG. 41 is plan views (A and B) showing a variant of the relative-movement prevention structure.
Figure 41:
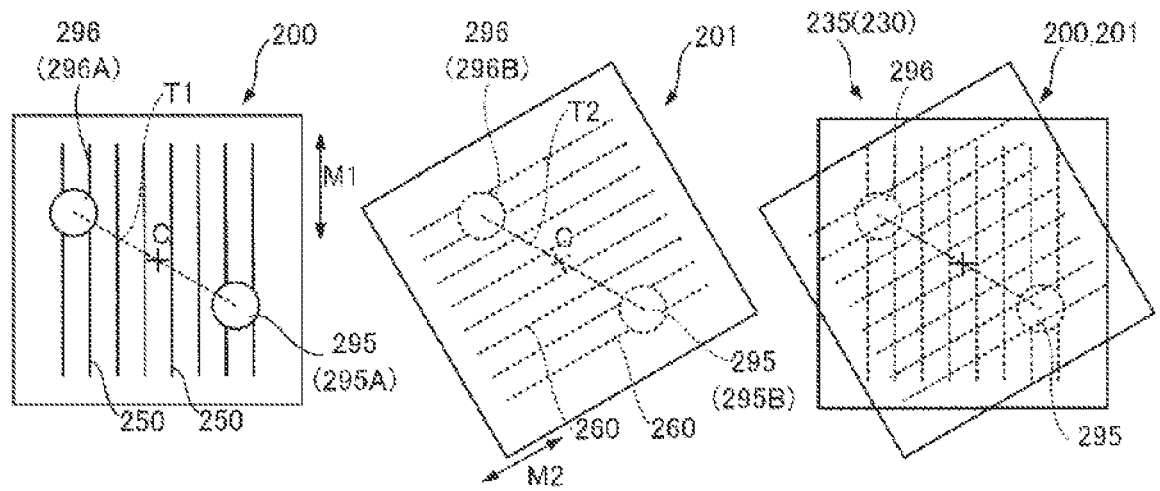

Further, as in the relative-movement prevention structure 230 shown in (A) of FIG. 41, for example, the first stopper 295 (stopper piece 295A) and the second stopper 296 (stopper piece 296A) may be formed on the first member 200 and may be equidistant from the virtual point C, and may be respectively arranged at two positions having a phase difference of 180° from each other about the virtual point C. In this connection, an angular position of each of the first stopper 295 (stopper piece 295A) and the second stopper 296 (stopper piece 296A) may be set to 45° with respect to the extending direction M1 of the first row protrusion 250.

In other words, an angular difference between a virtual line segment T1 connecting the first stopper 295 (stopper piece 295A) and second stopper 296 (stopper piece 296A) with each other and the extending direction M1 of the first row protrusion 250 may be set to 45°.

In this manner, the first stopper 295 (stopper piece 295B) and the second stopper 296 (stopper piece 296B) may be formed on the second member 201 and may be equidistant from the virtual point C, and may be respectively arranged at two positions having a phase difference of 180° from each other about the virtual point C. In this connection, an angular position of each of the first stopper 295 (stopper piece 295B) and the second stopper 296 (stopper piece 296B) may be set to 45° with respect to the extending direction M2 of the second row protrusion 260.

In other words, an angular difference between a virtual line segment T2 connecting the first stopper 295 (stopper piece 295B) and second stopper 296 (stopper piece 296B) with each other and the extending direction M2 of the second row protrusion 260 may be set to 45°.

In this manner, when the first member 200 and the second member 201 face each other while positioning the first stopper 295 and the second stopper 296 in an appropriate manner, an angle defined between the longitudinal direction of the first row protrusion 250 and the longitudinal direction of the second row protrusion 260 necessarily results in an angle of 90°, and they intersects each other in a grid manner. As a result, an installation error of the first member 200 and the second member 201 may be prevented. Further, because it is possible to match the base material of the first member 200 and the base material of the second member 201 with each other, the first and second members 200 and 201 may be prepared only by preparing a pair of base materials. Thus, the relative-movement prevention structure 230 may be easily constructed.

Further, in (A) of FIG. 41, an example where the virtual line segments T1 and T2 connecting the first stopper 295 and the second stopper 296, and the extending directions M1 and M2 of the first and second row protrusions 250 and 260 have the angle difference set to 45° is illustrated. The present disclosure is not limited thereto. Preferably, the angle difference may be set to 20° or greater and 70° or smaller. More preferably, the angle difference may be set to 30° or greater and 60° or smaller. For example, in (B) of FIG. 41, an example where the angle difference is set to 60° is shown. In this case, when the first member 200 and the second member 201 face each other while positioning the first stopper 295 and the second stopper 296 in an appropriate manner, an angle between the longitudinal direction of the first row protrusion 250 and the longitudinal direction of the second row protrusion 260 necessarily results in an angle of 60° and thus they intersect each other in a grid manner. The first member 200 and the second member 201 may employ a common base material.

Figure 42:
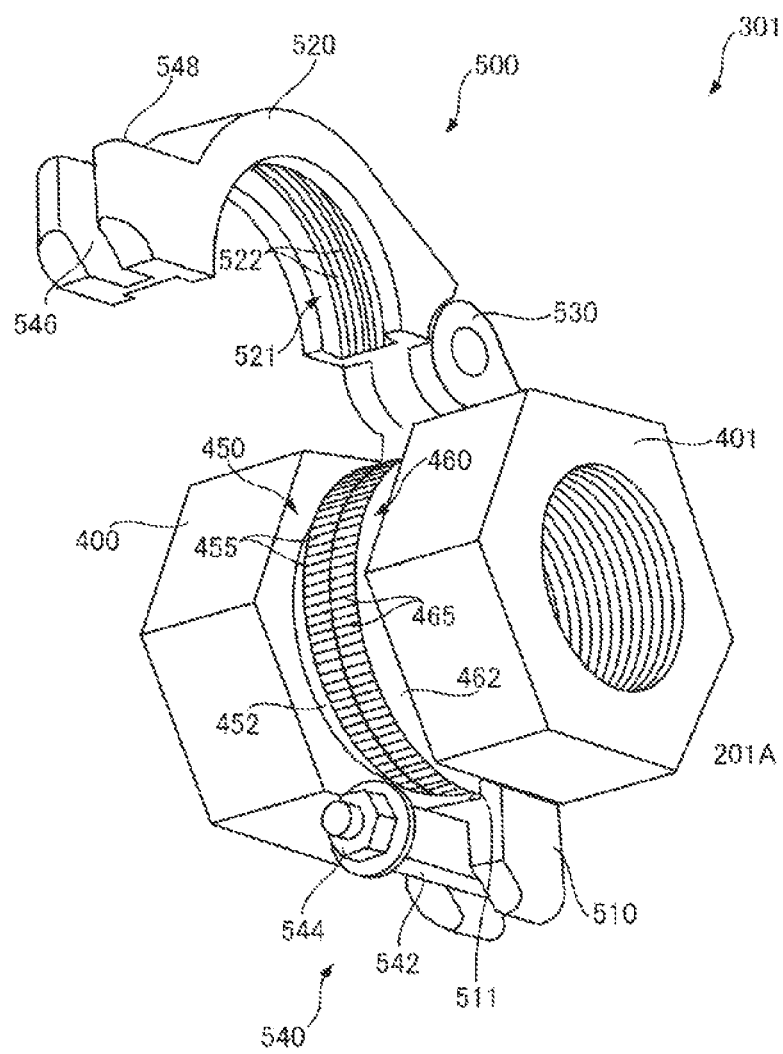
FIG. 42 is a perspective view showing a screw-based fastening mechanism to which a relative-movement prevention structure according to a fourth embodiment is applied.

Next, with reference to FIG. 42 to FIG. 44, a screw-based fastening mechanism 301 according to a fourth embodiment will be described. The screw-based fastening mechanism 301 includes a first female screw 400, a second female screw 401, a male screw 310 (see FIG. 43), and a clamping device 500. Further, a first relative-movement prevention structure 330A is formed between the first female screw 400 and the clamping device 500, while a second relative-movement prevention structure 330B is formed between the second female screw 401 and the clamping device 500. Further, in this embodiment, the first female screw 400 and the second female screw 401 adjacent to an outer side in an axial direction thereof define a so-called double nut structure and are prevented from loosening from each other. Because a basic structure of each of the screws is the same as or similar to that of the first embodiment, descriptions thereof are omitted below. The first and second relative-movement prevention structures 330A and 330B will be described in detail.

A first annular section 450 integrally protrudes from a cross section of the first female screw 400 toward the second female screw. Further, a second annular section 460 integrally protrudes from a cross section of a second female screw 401 toward the first female screw.

On the outer circumferential face of the first annular section 450, a plurality of first row protrusions 455 extending in the axial direction are arranged at an equal spacing in the circumferential direction. Further, in a boundary of the outer circumferential face of the first annular section 450 and the first female screw 400, a first annular groove (first constriction groove) 452 extending in the circumferential direction is formed. On the outer circumferential face of the second annular section 460, a plurality of second row protrusions 465 extending in the axial direction are arranged at an equal spacing in the circumferential direction. Further, in a boundary of the outer circumferential face of the second annular section 460 and the second female screw 401, a second annular groove (second constriction groove) 462 extending in the circumferential direction is formed.

The clamping device 500 has a semi-cylindrical first clamping body 510, and a semi-cylindrical second clamping body 520. One end in the circumferential direction of the first clamping body 510 and the other end in the circumferential direction of the second clamping body 520 are connected to each other via a hinge 530 in an openable manner. Further, an engagement mechanism 540 is disposed at the other end of the circumferential direction of the first clamping body 510 and the other end of the circumferential direction of the second clamping body 520. In another example, the hinge 530 is not required. Any means may be used instead of the hinge 530, as long as the means may press the first and second annular sections inwardly in the radial direction.

Specifically, the engagement mechanism 540 includes a rod-shaped body 542, which is disposed to be openable at the other end of the first clamping body 510, a nut 544 for screw-engaging with a male threaded portion of a tip end of the rod-shaped body 542, a groove 546 formed on the other end of the second clamping body 520 to receive therein a portion of the rod-shaped body 542, and a seated section 548 formed at the other end of the second clamping body 520 and engageable in the axial direction with the nut 544 at the tip end of the rod-shaped body 542 received in the groove 546. Therefore, when the first clamping body 510 and the second clamping body 520 are in a closed state (face each other) to form a full cylindrical body, the first and second annular sections 450 and 460 may be accommodated in the full cylindrical body. When the engagement mechanism 540 connects the other end of the first clamping body 510 and the second clamping body 520 to each other, and when the nut 544 is tightened firmly, the clamping device 500 has mounted on the first and second annular sections 450 and 460. Thereby, the first and second clamping bodies 510 and 520 may press against the first and second annular sections 450 and 460. In other words, the engagement mechanism 540 may function as an urging mechanism that exerts a pressing force.

In one example, when releasing the engagement mechanism 540, and when using the hinge 530 to open the first clamping body 510 and the second clamping body 520, an entirety of the clamping device 500 may be disengaged from the first and second annular sections 450 and 460. In other words, the entire clamping device 500 may be detachable.

Figure 43:
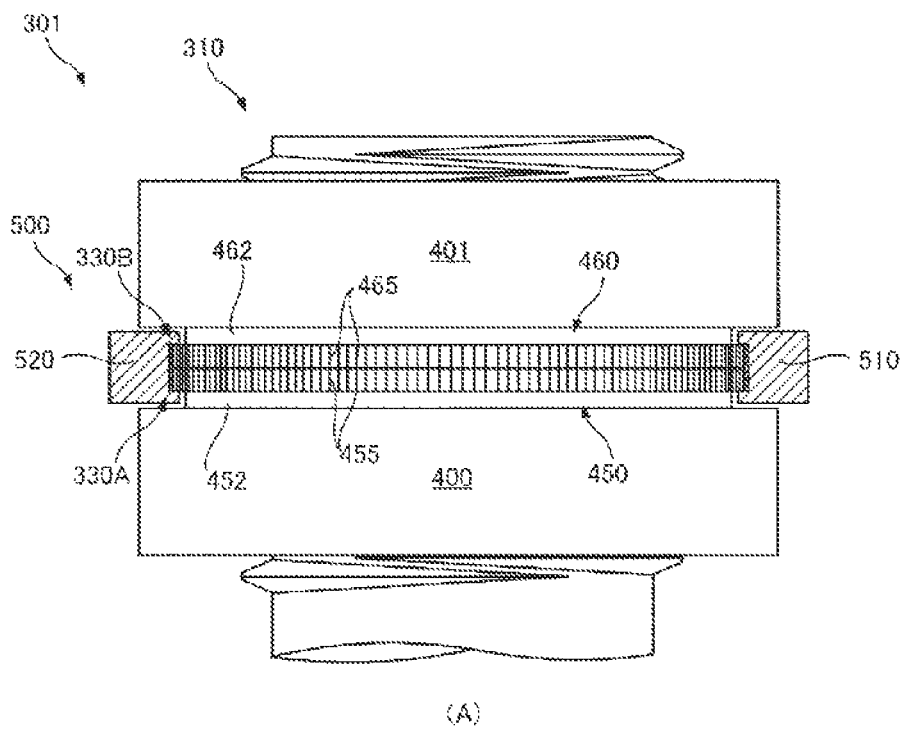
FIG. 43 is a front view (A) showing the screw-based fastening mechanism, and a partially enlarged cross-sectional view (B) showing a relative-movement prevention structure of the screw-based fastening mechanism.
Figure 43:
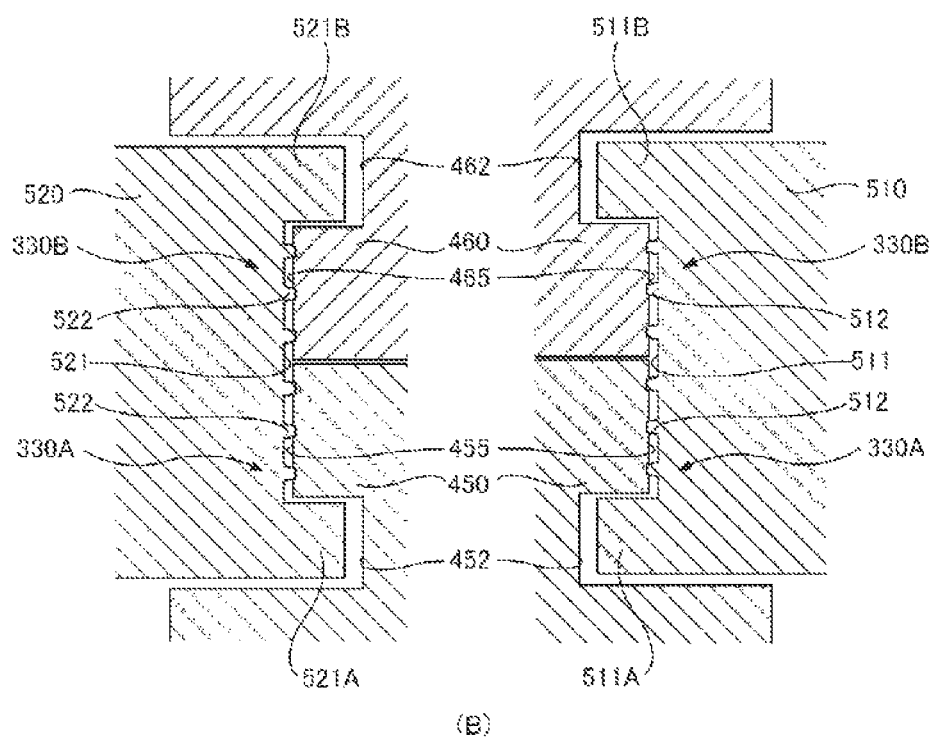
Figure 44:
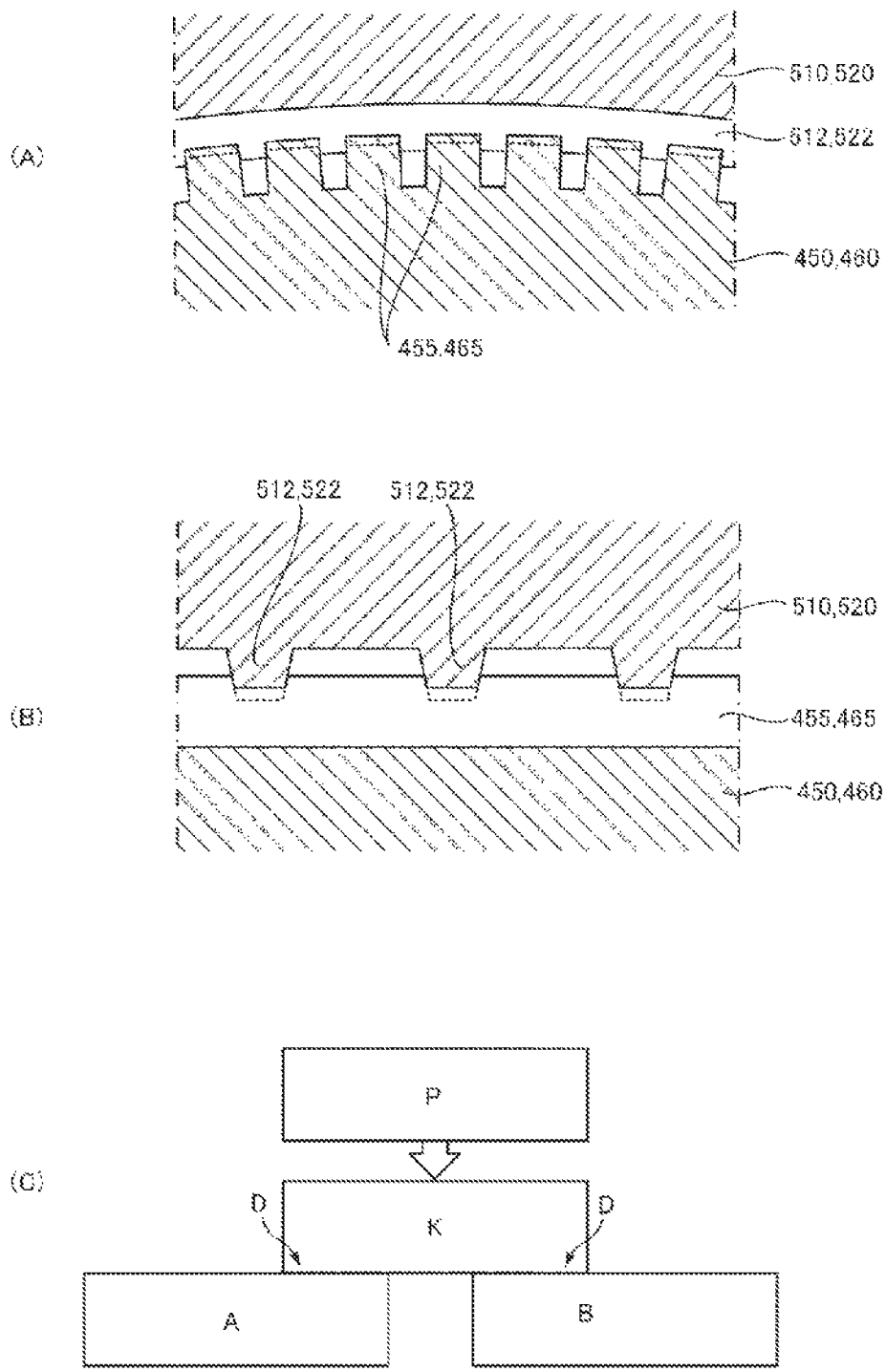
FIG. 44 is partially enlarged cross-sectional views (A and B) showing an engaged state of a linear protrusion of the screw-based fastening mechanism, and a block diagram (C) illustrating a structure of a relative movement prevention assembly.

As shown in (B) of FIG. 43, a first accommodating recess 511 accommodating both of the first and second annular sections 450 and 460 is formed to extend in the circumferential direction on an inner circumferential face of the first clamping body 510. Therefore, a pair of sidewalls 511A and 511B, which are convex inwardly of the radial direction are formed on both sides in the axial direction of the first accommodating recess 511, respectively. One sidewall 511A is inserted into the first annular groove (first constriction groove) 452, while the other sidewall 511B is inserted into the second annular groove (second constriction groove) 462.

Six first clamp-side row protrusions 512 extending in the circumferential direction are arranged at a spacing in the axial direction on the inner circumferential face of the first accommodating recess 511. Three of the 6 protrusions intersect the first row protrusion 455 of the first annular section 450, while the remaining three thereof intersect the second row protrusion 465 of the second annular section 460.

In the same way, a second accommodating recess 521 accommodating both of the first and second annular sections 450 and 460 is formed to extend in the circumferential direction on an inner circumferential face of the second clamping body 520. Therefore, a pair of sidewalls 521A and 521B, which are convex inwardly of the radial direction are formed on both sides in the axial direction of the second accommodation recess 521, respectively. One sidewall 521A is inserted into the first annular groove (first constriction groove) 452, while the other sidewall 521B is inserted into the second annular groove (second constriction groove) 462.

Six second clamp-side row protrusions 522 extending in the circumferential direction are arranged at a spacing in the axial direction on the inner circumferential face of the second accommodating recess 521. Three thereof intersect the first row protrusion 455 of the first annular section 450, while the remaining three thereof intersect the second row protrusion 465 of the second annular section 460.

The first relative-movement prevention structure 330A includes the first row protrusion 455 of the first annular section 450 and three first and three second clamp-side row protrusions 511 and 512 that may intersect the first row protrusion 455. That is, the first row protrusion 455 corresponds to a first thread of the first relative-movement prevention structure 330A, while the first and second clamp-side row protrusions 512 and 522 correspond to the second thread of the first relative-movement prevention structure 330A. Therefore, as shown in (A) and (B) of FIG. 44, at this intersection region, the first thread (first row protrusion 455) is deformed by a pressing force from the clamping device 500 to produce a first displacement section, and the second thread (first and second clamp-side row protrusions 512 and 522) is deformed by the pressing force therefrom to produce a second displacement section. As a result, relative rotation between the clamping device 500 and the first female screw 400 is prevented. Further, because the structure for preventing the relative rotation is already described in detail in the third embodiment and the like, that will be omitted.

The second relative-movement prevention structure 330B includes the second row protrusion 465 of the second annular section 460, and the three first and three second clamp-side row protrusions 512 and 522 that may intersect the second row protrusion 465. That is, the second row protrusion 465 corresponds to the first thread of the second relative-movement prevention structure 330B, while the first and second clamp-side row protrusions 512 and 522 correspond to the second thread of the second relative-movement prevention structure 330B. Therefore, as shown in (A) and (B) of FIG. 44, at this intersection region, the first thread (second row protrusion 465) is deformed by a pressing force from the clamping device 500 to produce a first displacement section, while the second thread (first and second clamp-side row protrusions 512 and 522) is deformed by the pressing force therefrom to produce a second displacement section. As a result, the relative rotation between the clamping device 500 and the second female screw 401 is prevented. Further, because the structure for preventing relative rotation is already described in detail in the third embodiment and the like, this will be omitted.

As described above, in the fourth embodiment, the relative rotation between the first female screw 400 and the second female screw 401 is substantially prevented by interposing the clamping device 500 therebetween. A relative movement prevention assembly to which this structure is applied is conceptualized as shown in (C) FIG. 44. In this connection, when a restricting target member A (first female screw 400) and a restricting target member B (second female screw 401) that is to be prevented from relative movement therebetween are present, an interposed member K (the clamping device 500) may be interposed therebetween. A relative-movement prevention structure D is constructed between the restricting target member A and the interposed member K, while another relative-movement prevention structure D is constructed between the restricting target member B and the interposed member K. In this connection, urging means P such as the engagement mechanism 540 of the clamping device 500 may be installed to apply a pressing force between the interposed member K and the restricting target member A and the restricting target member B. This concept is applicable to the third embodiment.

Further, in the fourth embodiment, an example in which the clamp-side row protrusion of the clamping device 500 extends in an arc in the circumferential direction, and the first and second row protrusions 455 and 465 formed on the first and second annular sections 450 and 460 extend in a straight line in the axial direction is set forth. The present disclosure is not limited thereto. The clamp-side row protrusion may extend straight in the axial direction, while the first and/or second row protrusions 455 and 465 may extend in an arc in the circumferential direction.

Next, with reference to FIG. 45, a screw-based fastening mechanism 301 as a variant of the fourth embodiment will be described. The screw-based fastening mechanism 301 includes the female screw 400, the male screw 310, and the clamping device 500. The first relative-movement prevention structure 330A is formed between the female screw 400 and the clamping device 500. The second relative-movement prevention structure 330B is formed between the male screw 310 and the clamping device 500.

The annular section 450 integrally protrudes from a cross section of the female screw 400. A plurality of row protrusions 455 extending in the axial direction are arrange at an equal spacing in the circumferential direction on the outer circumferential face of the annular section 450. Further, in a boundary between the outer circumferential face of the annular section 450 and the female screw 400, an annular groove (constriction groove) 452 extending in the circumferential direction is formed. In another example, the annular groove 452 is not required.

The clamping device 500 includes a semi-cylindrical first clamping body 510 and a semi-cylindrical second clamping body 520. One end of the circumferential direction of the first clamping body 510 and one end of the circumferential direction of the second clamping body 520 are connected to each other via the hinge 530 in an openable manner. Further, the engagement mechanism 540 is provided at the other end of the circumferential direction of the first clamping body 510 and the other end of the circumferential direction of the second clamping body 520.

Figure 45:
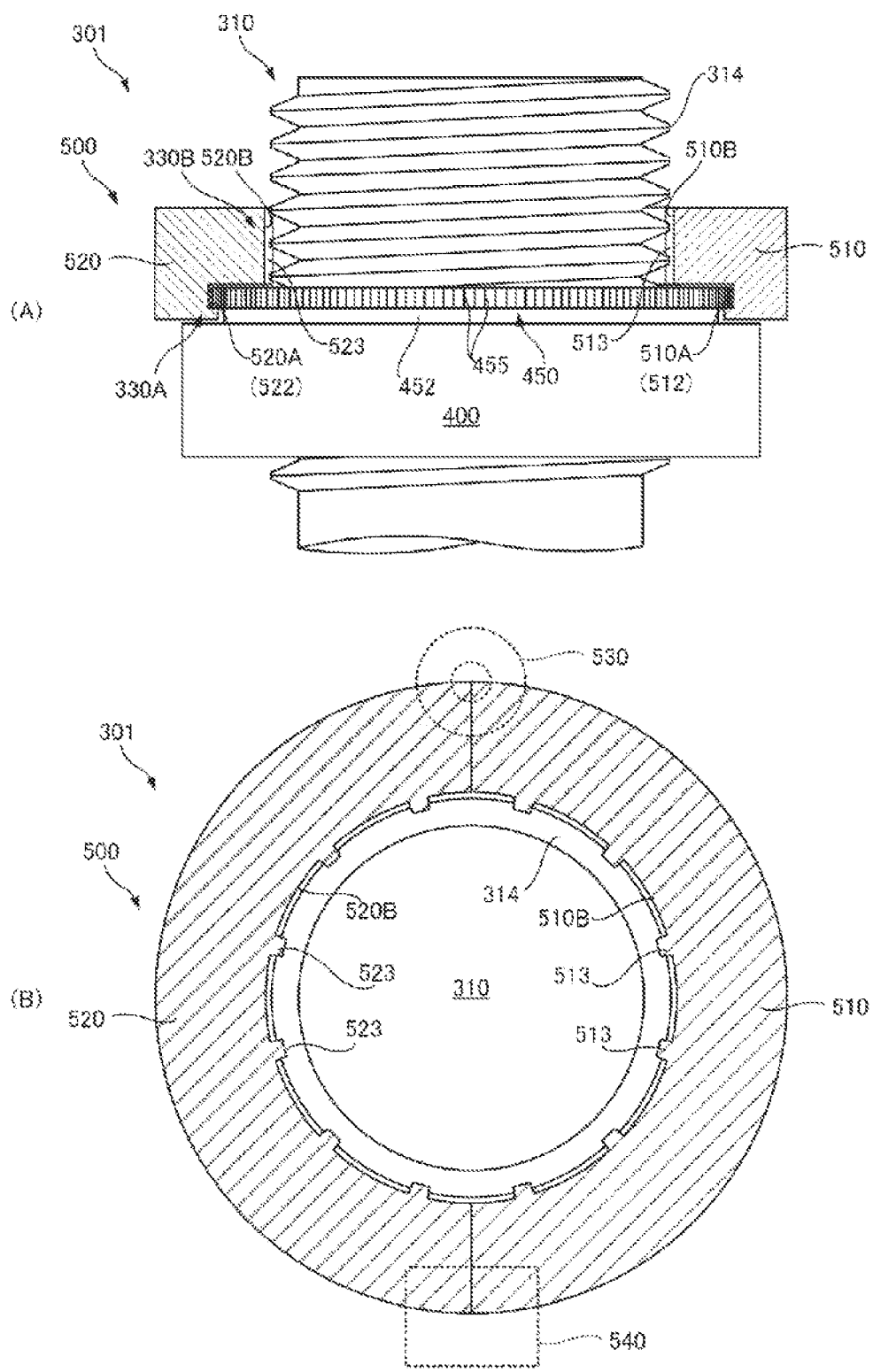
FIG. 45 is a front partial cross-sectional view (A) showing a variant of the screw-based fastening mechanism, and a planar partial sectional view (B) thereof.

As shown in (A) of FIG. 45, an inner circumference of the first clamping body 510 has a first female screw-side inner circumferential face 510A accessible to the outer circumference of the annular section 450 and a first male screw-side inner circumferential face 510B accessible to the outer circumference of the male screw 310. An inner diameter of the first male screw-side inner circumferential face 510B is smaller than an inner diameter of the first female screw-side inner circumferential face 510A.

Three first female screw corresponding row protrusions 512 extending in the circumferential direction are arranged at a spacing in the axial direction on the first female screw-side inner circumferential face 510A. The first female screw corresponding row protrusions 512 intersect the row protrusion 455 of the annular section 450.

In one example, as shown in (B) FIG. 45, a plurality of first male screw corresponding row protrusions 513 extending in the axial direction are arranged at a spacing in the circumferential direction on the first male screw-side inner circumferential face 510B. The first male screw corresponding row protrusions 513 intersect a spiral thread 314 as a thread of the male screw 310.

As shown in (A) of FIG. 45, the inner circumference of the second clamping body 520 has a second female screw-side inner circumferential face 520A accessible to the outer circumference of the annular section 450, and a second male screw-side inner circumferential face 520B accessible to the outer circumference of the male screw 310. An inner diameter of the second male screw-side inner circumferential face 520B is smaller than an inner diameter of the second female screw-side inner circumferential face 520A.

Three second female screw corresponding row protrusions 522 extending in the circumferential direction are arranged at a spacing in the axial direction on the second female screw-side inner circumferential face 520A. The second female screw corresponding row protrusions 522 intersect the row protrusion 455 of the annular protrusion 450.

In one example, as shown in (B) of FIG. 45, a plurality of second male screw corresponding row protrusions 523 extending in the axial direction are arranged at a spacing in the circumferential direction on the second male screw-side inner circumferential face 520B. The second male screw corresponding row protrusions 523 intersect the spiral thread 314 as a thread of the male screw 310.

The first relative-movement prevention structure 330A includes the row protrusion 455 of the annular section 450 and the three female screw corresponding row protrusions 512 and 522 that may intersect the row protrusion 455. That is, the row protrusion 455 corresponds to the first thread of the first relative-movement prevention structure 330A, while the first and second female screw corresponding row protrusions 512 and 522 correspond to the second thread of the first relative-movement prevention structure 330A. Therefore, at this intersection region, the first thread is deformed by the pressing force from the clamping device 500 to produce the first displacement section, while the second thread is deformed by the pressing force therefrom to produce a second displacement section. As a result, relative rotation between the clamping device 500 and the female screw 400 is prevented.

The second relative-movement prevention structure 330B includes a spiral thread (row protrusion) 314 of the male screw 310, and the male screw corresponding row protrusions 513 and 523 that may cross the spiral thread 314. That is, the spiral thread 314 corresponds to the first thread of the second relative-movement prevention structure 330B, while the first and second male screw corresponding row protrusions 513 and 523 correspond to the second thread of the second relative-movement prevention structure 330B. Therefore, at this intersection region, the first thread is deformed by the pressing force from the clamping device 500 to produce the first displacement section, while the second thread is deformed by the pressing force therefrom to produce the second displacement section. As a result, relative rotation between the clamping device 500 and the male screw 310 is prevented.

As described above, in the present variant, the relative rotation between the female screw 400 and the male screw 310 is substantially prevented by interposing the clamping device 500 therebetween.

In the variant, an example where the relative rotation between the male screw 310 and the female screw 400 is prevented by the clamping device 500 is illustrated. The present disclosure is not limited thereto. For example, as shown in (A) of FIG. 46, a male screw corresponding row protrusion 413 extending in the axial direction may be formed directly on the female screw 400. This male screw corresponding row protrusion 413 intersects the spiral thread (row protrusion) 314 of the male screw 310, thereby to create a relative-movement prevention structure. Further, when screw-engaging the male screw 310 and female screw 400 with each other, the male screw 310 and female screw 400 may perform the relative rotation using a force stronger than a prevention force of the relative-movement prevention structure. Thus, they may move while the intersection portion between the male screw corresponding row protrusion 413 and the spiral thread (row protrusion) 314 is elastically deformed.

Figure 46:
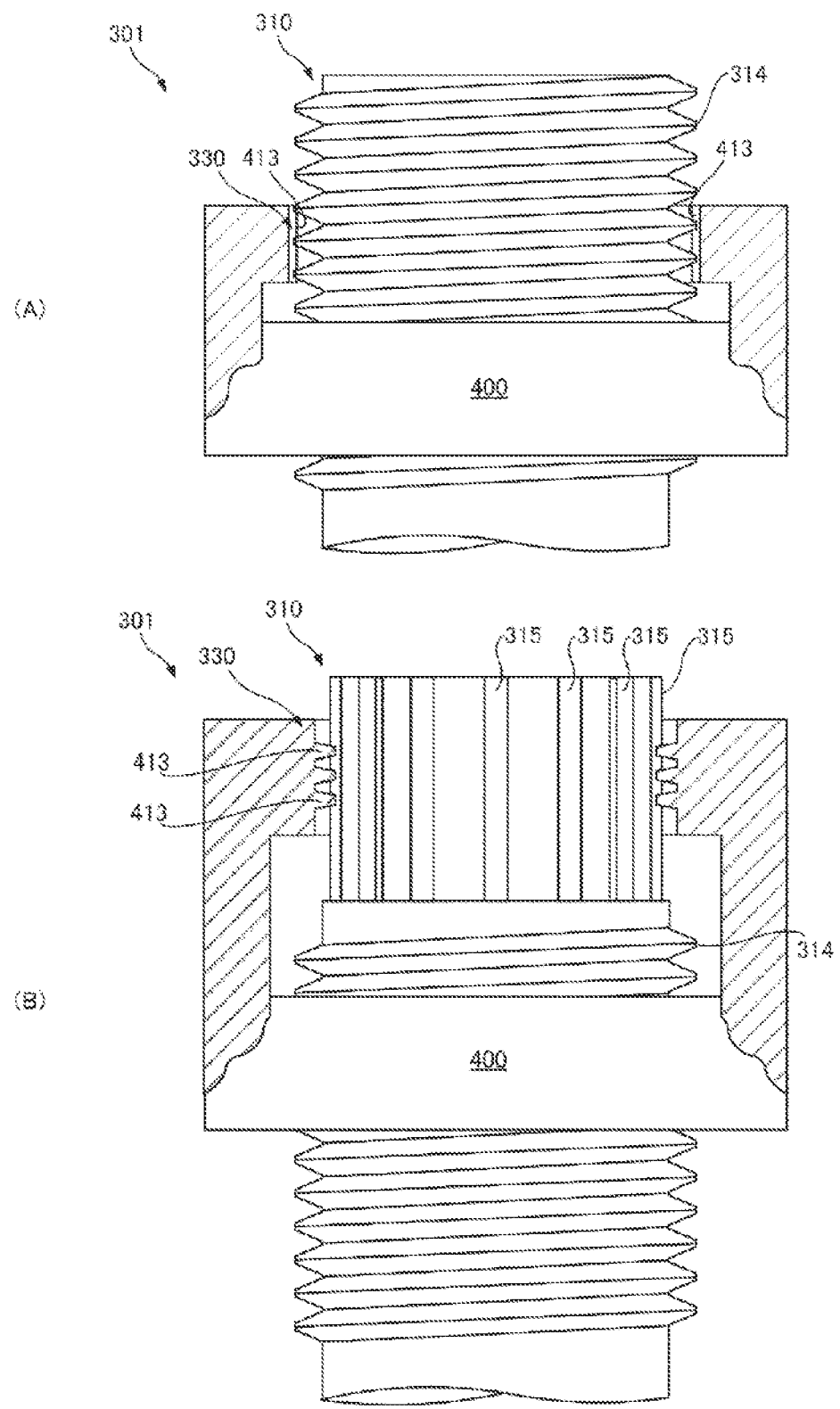
FIG. 46 is front partial cross-sectional views (A and B) showing a variant of the screw-based fastening mechanism.

Further, without using the spiral thread 314 of the male screw 310, as shown in (B) of FIG. 46, a dedicated female screw corresponding row protrusion 315 may be formed on the male screw 310, and may intersect the male screw corresponding row protrusion 413 of the female screw 400. The extension direction of each row protrusion may be set appropriately. For example, the female screw corresponding row protrusion 315 of the male screw 310 may extend in the axial direction, while the male screw corresponding row protrusion 413 of the female screw 400 may extend in the circumferential direction.

Next, a screw-based fastening mechanism 601 to which a relative-rotation prevention structure 730 according to a fifth embodiment is applied will be described with reference to FIG. 47 to FIG. 52. This screw-based fastening mechanism 601 is partially similar to the screw-based fastening mechanism (the variant shown in FIG. 22, FIG. 26, FIG. 28, FIG. 29, etc.) shown in the first embodiment. Therefore, the similar components and similar members therebetween have the same second and third digits of the reference numerals thereof, and descriptions thereof will be omitted.

Figure 47:
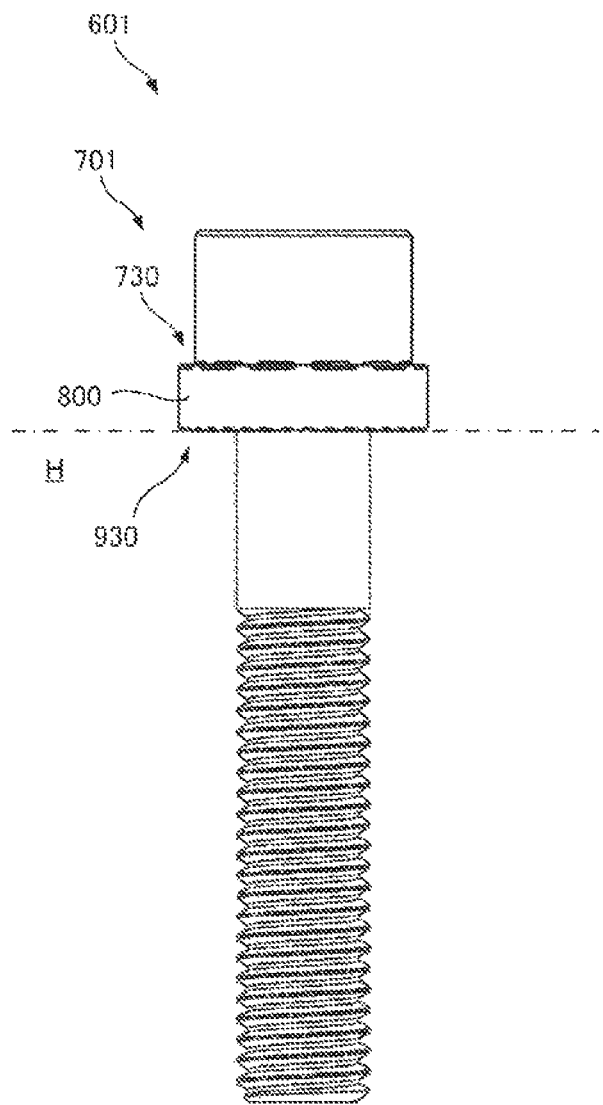
FIG. 47 is a front view showing a screw-based fastening mechanism to which a relative-movement prevention structure according to a fifth embodiment is applied.
Figure 48:
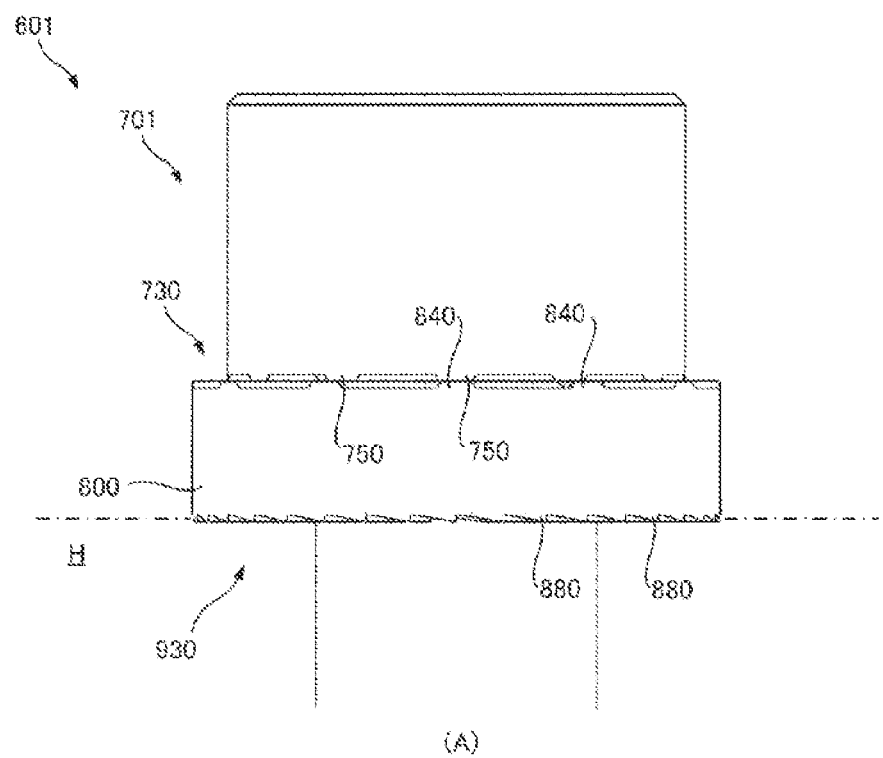
FIG. 48 is a front view (A), and a front cross-sectional view (B) to enlarge the relative-movement prevention structure.
Figure 48:
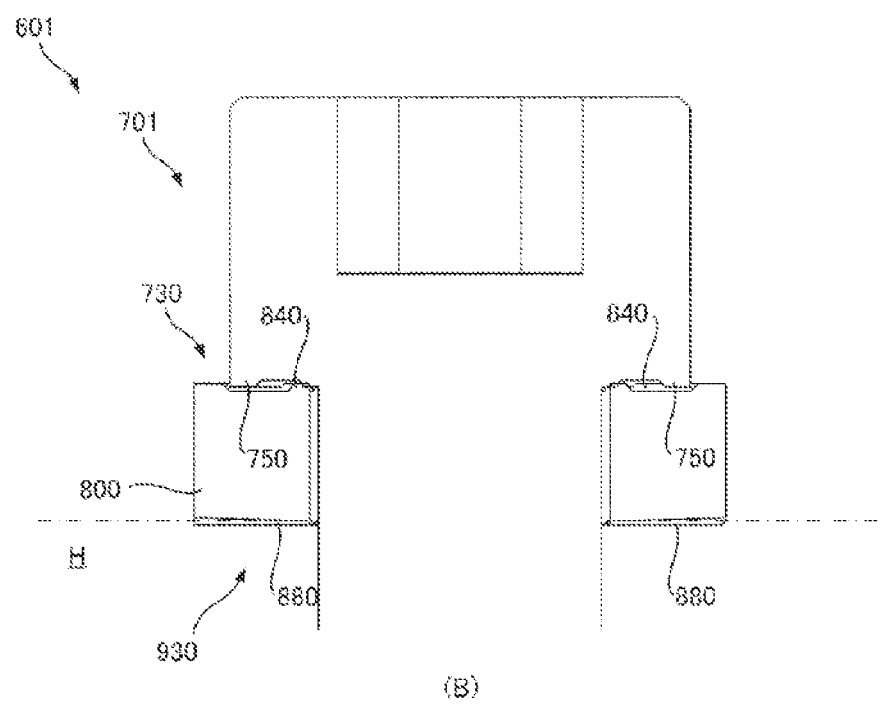

As shown in FIG. 47, the screw-based fastening mechanism 601 includes a male screw 701, and a seated body 800 such as a washer facing a seated face 703A of a head 703 of the male screw 701 and is fastened to a fastening target member H. The counterpart-side member to the male screw 701 becomes the seated body 800. The counterpart-side member to the seated body 800 becomes the male screw 701 and the fastening target member H. The first relative-rotation prevention structure 730 is formed between the male screw 701 and the seated body 800. Further, a second relative-rotation prevention structure 930 is formed between the seated body 800 and the fastening target member H.

Figure 49:
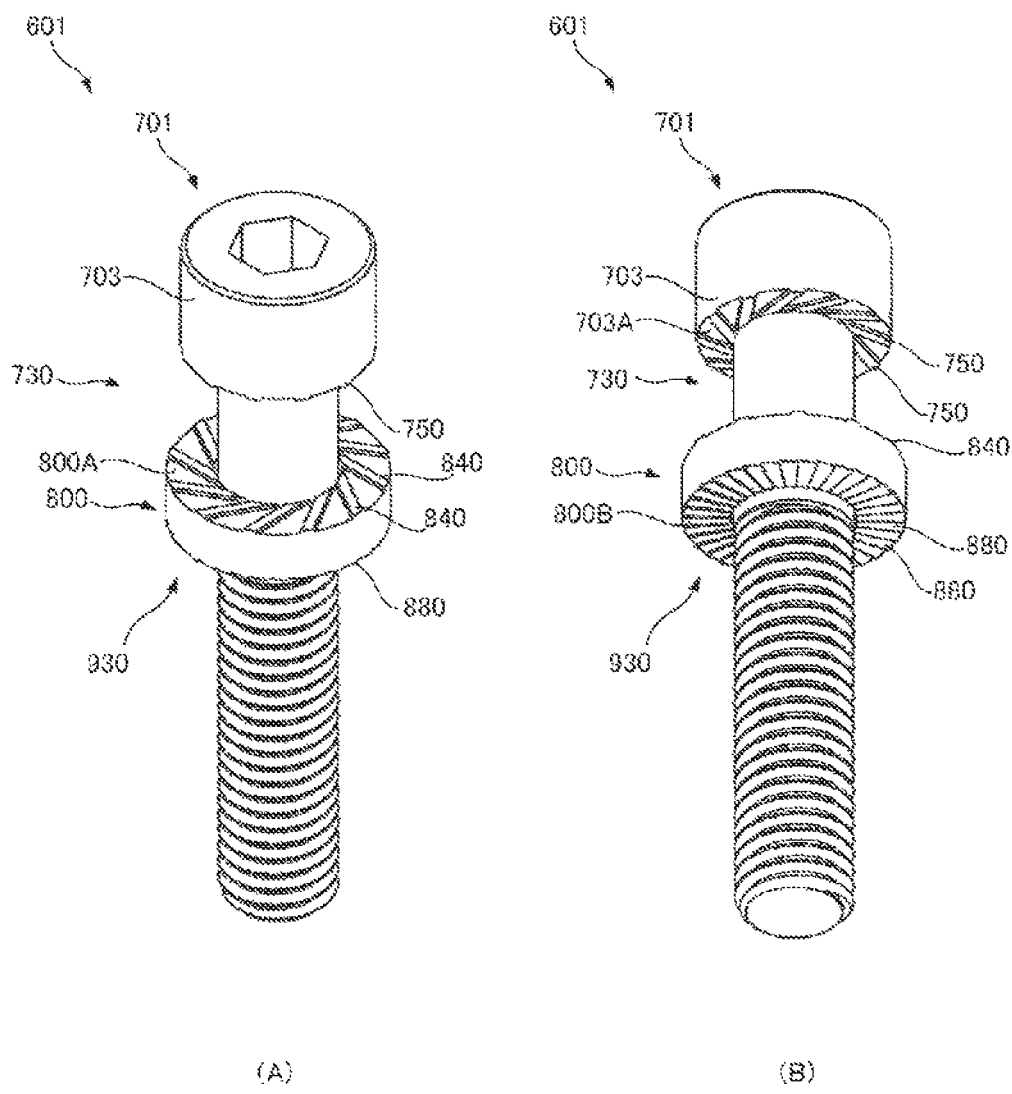
FIG. 49 is a top perspective view (A) and a bottom perspective view (B) of the screw-based fastening mechanism.

As shown in FIG. 49, the first relative-rotation prevention structure 730 includes a seated body-side (counterpart-side) displacement section 840 formed on a screw-side seated face 800A of the seated body 800, and a screw-side deformation-capable section 750 formed on the seated face 703A of the head 703 of the male screw 701.

Figure 51:
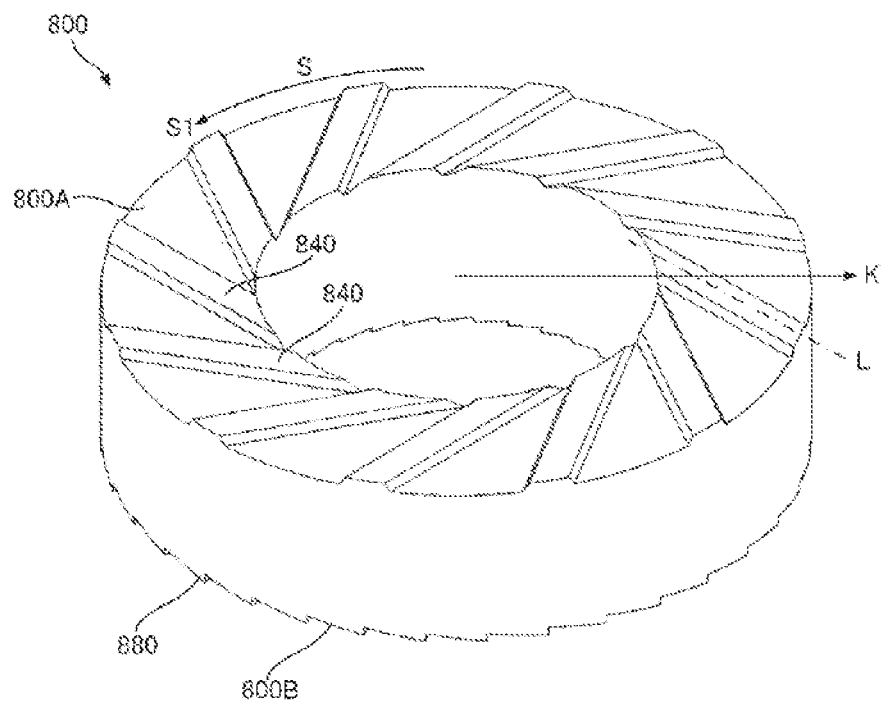
FIG. 51 is a top perspective view (A) and a bottom perspective view (B) of a seated body of the screw-based fastening mechanism.
Figure 51:
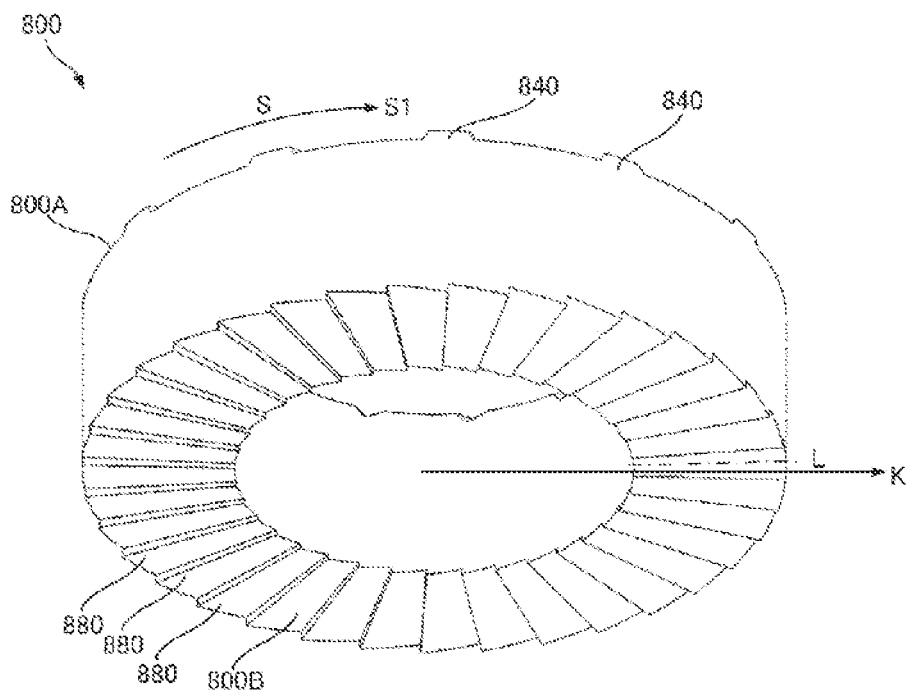

As shown in (A) of FIG. 51, the first relative-rotation prevention structure 730 has a seated body-side (counterpart-side) displacement section 840 formed on the screw-side seated face 800A of the seated body 800. The screw-side seated face 800A becomes a plane perpendicular to the axial direction of the male screw 701, but may be a tapered surface. The seated body-side displacement section 840 may be a strip-shaped protrusion (or groove). A longitudinal direction L of the strip is displaced in the radial direction K as it moves in the circumferential direction S. In particular, in this example, the seated body-side displacement section 840 displaces inwardly in the radial direction K as it moves in the counter rotation direction S1 when fastening during the relative rotation with respect to the head 703 of the male screw 701 in fastening in the circumferential direction S. A plurality of seated body-side displacement sections 840 are arranged at an equal spacing in the circumferential direction. In this example, 12 seated body-side displacement sections 840 are arranged at an equal spacing in the circumferential direction.

Figure 50:
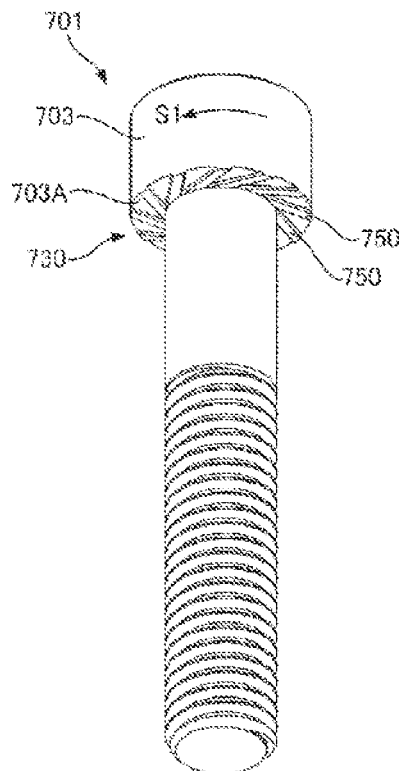
FIG. 50 is a top perspective view (A) and a bottom perspective view (B) of a male screw of the screw-based fastening mechanism.
Figure 50:
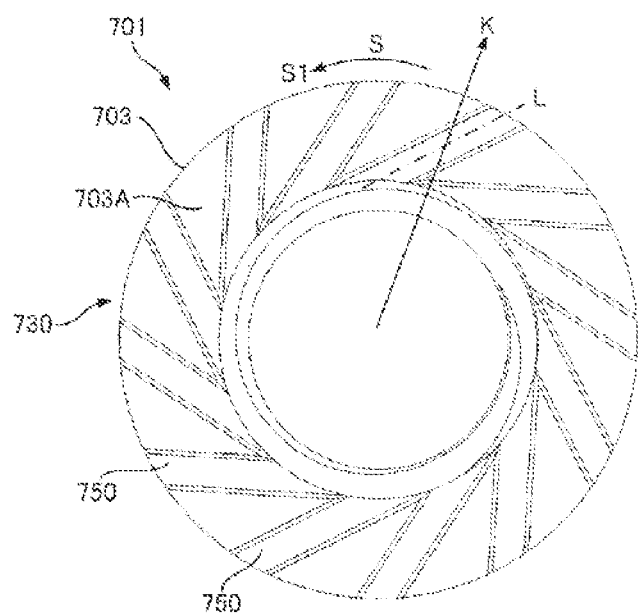

As shown in FIG. 50, the screw-side deformation-capable section 750 is formed on the seated face 703A of the head 703 of the male screw 701. This screw-side deformation-capable section 750 becomes a strip-shaped protrusion (or groove). The longitudinal direction L of the strip of the protrusion is displaced in the radial direction K as it moves in the circumferential direction S. In particular, in this example, the screw-side deformation-capable section 750 displaces inwardly in the radial direction K as it moves in the counter rotation direction Si when fastening during the relative rotation with respect to the seated body 800 in fastening in the circumferential direction S. A plurality of the screw-side deformation-capable sections 750 are arranged at an equal spacing in the circumferential direction. In this example, twelve screw-side deformation-capable sections 750 are arranged at an equal spacing in the circumferential direction.

Figure 52:
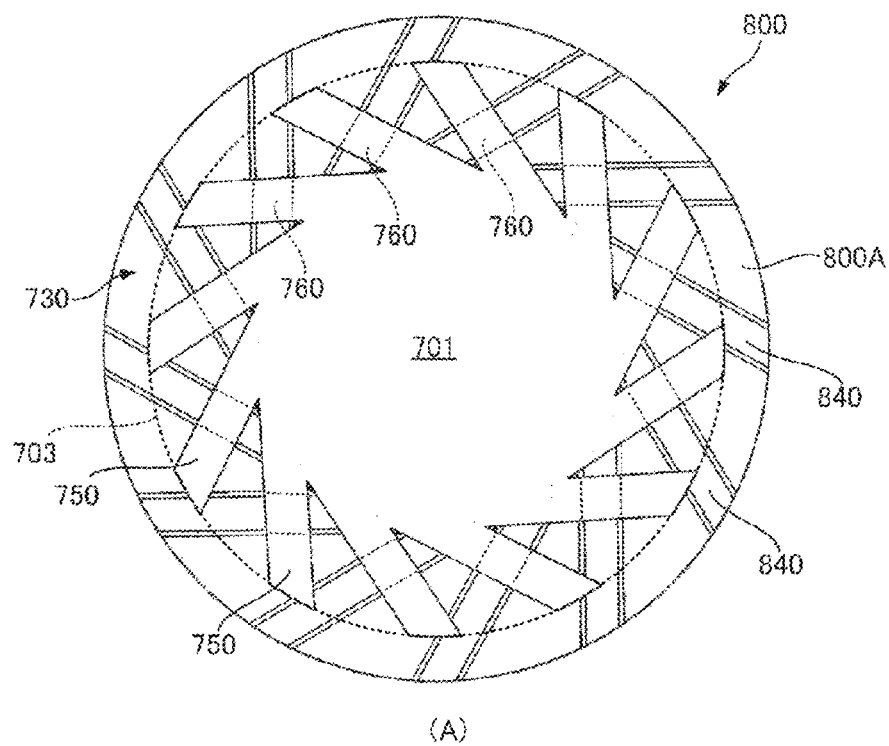
FIG. 52 is a top view (A) of an overlapping state of a screw-side deformation-capable section and a seated body side displacement section when viewing the screw-based fastening mechanism from a head of the male screw toward a shaft end, and a bottom view (B) of an overlapping state of a screw-side deformation-capable section and a seated body side displacement section when viewing the screw-based fastening mechanism from a head of the male screw toward a shaft end.
Figure 52:
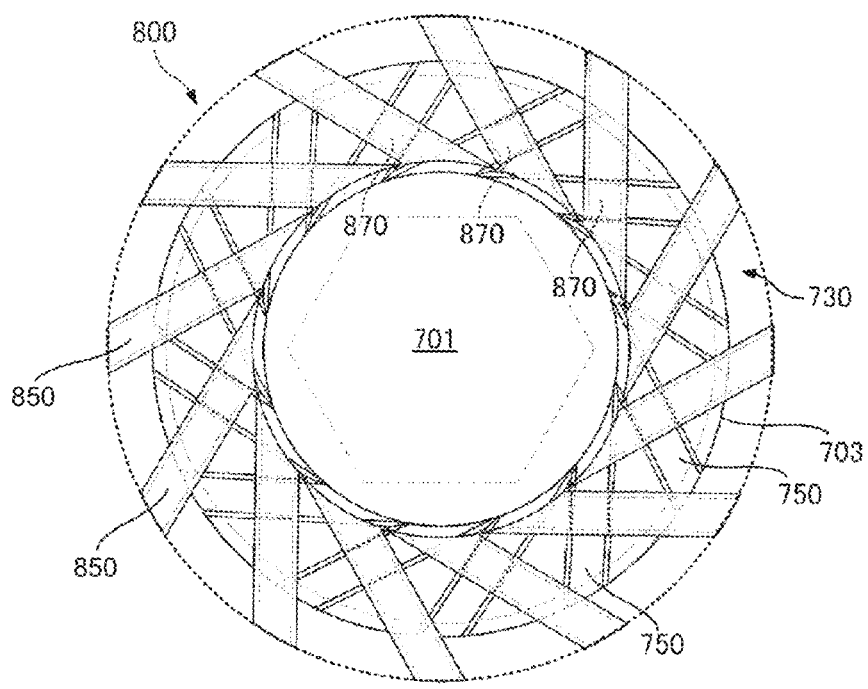

As shown in (A) of FIG. 52, the screw-side deformation-capable section 750 is pressed against the seated body-side displacement section 840 using a fastening force (axial force) thereof. As a result, the section 750 partially deform by itself to be depressed in the axial direction. This deformation produces a screw-side displacement section 760. Further, the screw-side deformation-capable section 750 and the seated body-side displacement section 840 have opposite spiral shapes. Thus, even when the male screw 701 and the seated body 800 rotate relative to each other, they always maintain a contact state therebetween.

The screw-side deformation-capable section 750 is made of a material that is equivalent to or greater flexible than the seated body-side displacement section 840. In this manner, the seated body-side displacement section 840 may actively deform the screw-side deformation-capable section 750. This deformation becomes elastic and/or plastic deformation. Further, this deformation amount is set such that they are not fully pressed by the axial force required in the fastening of the fastening target member H, but are elastically and/or plastically deformed at an appropriate amount (see FIG. 48).

As shown in (B) of FIG. 52, the screw-side deformation-capable section 750 may press a seated body-side deformation-capable section 850 as a counterpart-side member thereto using the fastening force, such that an auxiliary displacement section 870 is produced on the seated body-side deformation-capable section 850. This auxiliary displacement section 870 is axially depressed at a portion thereof in a longitudinal direction of the seated body-side displacement section 840 (a range thereof intersecting with the screw-side deformation-capable section 750).

As shown in (B) of FIG. 51, a second relative-rotation prevention structure 930 formed between the seated body 800 and the fastening target member H has a displacement section 880 for the fastening target member formed on a fastening target member-side seated face 800B of the seated body 800.

The fastening target member-side seated face 800B may be a plane perpendicular to the axial direction of the male screw 701, but may be a tapered surface. The displacement section 880 for the fastening target member has a row protrusion (or row groove) having a cross-section of a mountain or saw shape. The longitudinal direction L of the protrusion extends in the radial direction K.

In particular, in the present embodiment, the saw blade shape of the displacement section 880 for the fastening target member has following effects: when a suppression torque generated during fastening is applied, the seated body 800 compresses the seated face of the fastening target member H along the saw blade shape and elastically deforms and/or plastically deforms the fastening target member H. On the contrary, when the loosening torque is applied to the male screw 701, the seated body 800 easily restricts the relative rotation with the fastening target member H. That is, the restrictive force of the relative rotation may vary based on the rotation direction.

Further, it is preferable that the material of the fastening target member H is flexible (easy to deform) as compared with the material of the seated body 800. For example, the seated body 800 is made of iron or the like, and the fastening target member H is made of aluminum or the like. In this manner, at the stage where the axial force of the initial fastening by the male screw 701 acts between the seated body 800 and the fastening target member H, the displacement section 880 for the fastening target member rapidly enters the fastening target member H, and most of the relative rotation between the seated body 800 and fastening target member H is invalid, and damage to the fastening target member H may be minimized.

Further, a contact area of the seated body 800 where the displacement section 880 for the fastening target member is in contact with the fastening target member H is preferably smaller than a contact area thereof where the seated body-side displacement section 840 is in contact with the screw-side deformation-capable section 750. In this manner, a local surface pressure acting between the displacement section 880 for the fastening target member and the fastening target member H is greater than a local surface pressure acting between the seated body-side displacement section 840 and the screw-side deformation-capable section 750. As a result, the relative rotation restrict effect by the second relative-rotation prevention structure 930 takes precedence over the relative rotation restrict effect by the first relative-rotation prevention structure 730.

Further, in this embodiment, in order to reduce the contact area where the displacement section 880 for the fastening target member is in contact with the fastening target member H, a ridge line width of the distal end edge of the saw blade shape of the displacement section 880 for fastening target member is extremely small, and is approximately linear. In one example, a width of each of the seated body-side displacement section 840 and the screw-side deformation-capable section 750 is set to at least 0.5 mm, preferably, is set in accordance with the material and axial force, and is set such that an area where they are in contact with each other is relatively large.

In this manner, in fastening, the seated body 800 simultaneously contacts both the fastening target member H and the head 703 of the male screw 701. However, in an early to middle fastening phase, the relative rotation between the seated body 800 and the fastening target member H is first restricted by the second relative-rotation prevention structure 930 and at the same time, the relative rotation between the seated body 800 and the male screw 701 is allowed. Thereafter, in a middle to last fastening stage, the relative rotation between the seated body 800 and the male screw 701 is gradually restricted by the first relative-rotation prevention structure 730. As a result, the relative rotation between the male screw 701 and the fastening target member H does not occur by both the second relative-rotation prevention structure 930 and the first relative-rotation prevention structure 730. In addition, damage to the fastening target member H may be greatly reduced.

Further, only regarding the seated body 800 as a washer in the relative-rotation prevention structure 930, the seated body-side displacement section 840 is formed on the screw-side seated face 800A to deform a portion of the male screw 701. At the same time, the displacement section 880 for the fastening target member is formed on the fastening target member side seated face 800B to preferably elastically deform and, in some cases, plastically deform a portion of the fastening target member H. In this connection, it is preferable to exert the relative rotation prevention effect by the displacement section 880 for the fastening target member in favor of the relative rotation prevention effect by the seated body-side displacement section 840. Specifically, the material of the fastening target member H is flexible compared to the male screw 701. Alternatively, the surface pressure acting on the displacement section 880 for the fastening target member is greater than the surface pressure acting on the seated body-side displacement section 840. When using this seated body 800, a minimum of fastening force may exert a full loosening prevention effect, for example, when the fastening target member H is made of a relatively flexible material such as aluminum, and in an environment where too strong fastening force (axial force) may not be applied.

In the above description, the relative-rotation prevention structure in accordance with the present disclosure is not limited to the embodiments described above. Various changes may be made thereto without departing from the scope of the present disclosure.

EXPLANATION OF REFERENCE NUMERALS

- 1 Screw-based fastening mechanism
- 10 Male screw
- 14 First spiral groove
- 15 Second spiral groove
- 20 Head
- 30 Relative-rotation prevention structure
- 40 First (counterpart-side) displacement section
- 40X Virtual boundary
- 42A and 42B First deformation-inducing faces
- 50 Second deformation-capable section
- 52A and 52B Second deformation-inducing faces
- 60 Second (screw-side) displacement section
- 62A and 62B Produced faces
- 70 Auxiliary displacement section
- 72A and 72B Produced faces
- 100 First female screw
- 101 Second female screw
- 150 Annular protrusion
- 150 Annular protrusion
- 160 Annular concave portion

The invention claimed is:

1. A relative-rotation prevention structure for preventing relative-rotation of a screw having a threaded portion with respect to a counterpart member, the structure comprising:
   - a counterpart-side displacement section formed in advance in the counterpart member and defined in an axial direction or a radial direction, the counterpart-side displacement section comprising one or more strip-shaped radial protrusions extending helically at an angle relative to the axial direction; and
   - a screw-side deformation-capable section formed on the screw, wherein the screw-side deformation-capable section is configured to press the counterpart-side displacement section through a fastening force and thus is configured to be deformed by the one or more strip-shaped radial protrusions in both the axial direction and the radial direction, thereby to produce a screw-side displacement section defined in the axial or the radial direction.

2. The structure of claim 1, wherein the counterpart-side displacement section and/or the screw-side displacement section includes a plurality of counterpart-side displacement sections arranged in a circumferential direction.

3. The structure of claim 1, wherein the screw-side displacement section is configured to be elastically deformed and/or plastically deformed.

4. The structure of claim 1, wherein the screw-side displacement section is configured to deform simultaneously both inwardly and outwardly in the radial direction.

5. The structure of claim 1, wherein the structure has an axial stopper section configured to limit an axial approach distance between the screw-side displacement section and the counterpart-side displacement section.

6. The structure of claim 1, wherein a single or a plurality of the screw-side displacement sections are produced in the screw-side deformation-capable section over the axial direction range of 1 pitch or greater of the screw.

7. The structure of claim 1, wherein the counterpart-side displacement section has a deformation-inducing face extending in the radial direction and configured to intersect a circumferential direction,
   - wherein the screw-side deformation-capable section abuts the deformation-inducing face to produce the screw-side displacement section.

8. The structure of claim 7, wherein the deformation-inducing face faces a loosening circumferential direction of the screw.

9. The structure of claim 8, wherein the deformation-inducing face is defined in the axial direction at an angle different from a loosening lead angle of the screw.

10. The structure of claim 7, wherein the deformation-inducing face is defined in the axial direction over a range of 1 pitch or greater of the screw.

11. The structure of claim 1, wherein each of the counterpart-side displacement section and/or the screw-side displacement section is tapered such that a diameter thereof increases or decreases in the radial direction along the axial direction.

12. The structure of claim 1, wherein the screw-side deformation-capable section of the screw is flexible or has low rigidity compared to the counterpart-side displacement section of the counterpart member.

13. The structure of claim 1, wherein the counterpart-side displacement section is a first female screw,
    - wherein the screw is a second female screw,
    - wherein the first female screw has a first spiral groove having a proper lead angle and/or lead direction,
    - wherein the second female screw has a second spiral groove having a lead angle and/or lead direction different from the lead angle and/or lead direction of the first spiral groove.

14. A relative-rotation prevention structure constructed between a screw having a threaded portion and a counterpart member abutting the screw, the relative-rotation prevention structure comprising:
    - a screw-side displacement section formed in advance in the screw and displaced in an axial or radial direction, the screw-side displacement section comprising one or more strip-shaped grooves defined in the axial direction and a circumferential direction; and
    - a counterpart-side deformation-capable section formed on the counterpart member, wherein the counterpart-side deformation-capable section is configured to press the screw-side displacement section through a fastening force and thus is configured to deform in both an axial direction and a radial direction, thereby to produce a counterpart-side displacement section defined in the axial direction and the radial direction.

* * * * *